US012702146B2

(12) United States Patent
Cowieson et al.

(10) Patent No.: US 12,702,146 B2
(45) Date of Patent: Aug. 11, 2026

(54) ANIMAL FEED COMPOSITIONS

(71) Applicants: DSM IP ASSETS B.V., Heerlen (NL); NOVOZYMES A/S, Bagsvaerd (DK)

(72) Inventors: Aaron Cowieson, Kaiseraugst (CH); Jose-Otavio Sorbara, Kaiseraugst (CH); Levy Do Vale Teixeira, Kaiseraugst (CH); Carrie Walk, Kaiseraugst (CH)

(73) Assignee: DSM IP ASSETS B.V., Heerlen (NL)

( * ) Notice: Subject to any disclaimer, the term of this patent is extended or adjusted under 35 U.S.C. 154(b) by 616 days.

(21) Appl. No.: 17/925,779

(22) PCT Filed: May 18, 2021

(86) PCT No.: PCT/EP2021/063186
§ 371 (c)(1),
(2) Date: Nov. 16, 2022

(87) PCT Pub. No.: WO2021/233936
PCT Pub. Date: Nov. 25, 2021

(65) Prior Publication Data
US 2023/0276828 A1 Sep. 7, 2023

(30) Foreign Application Priority Data
May 18, 2020 (EP) .................................... 20175233

(51) Int. Cl.
*A23K 20/189* (2016.01)
*G06Q 50/02* (2012.01)

(52) U.S. Cl.
CPC ........... *A23K 20/189* (2016.05); *G06Q 50/02* (2013.01)

(58) Field of Classification Search
CPC .... A23K 20/189; A23K 50/60; A23K 20/158; A23K 50/30; A23K 50/75; A23K 10/14; A23K 10/30; A23K 20/147; C12N 9/2465; C12N 9/2482; C12N 9/2402; C12Y 302/01008; C12Y 302/01022
See application file for complete search history.

(56) References Cited

U.S. PATENT DOCUMENTS

2016/0158326 A1 6/2016 De Beer et al.

OTHER PUBLICATIONS

International Search Report and Written Opinion of the ISA for PCT/EP2021/063186, mailed Aug. 18, 2021, 20 pages.
Groot Wassink et al., "Fractionation of Crude Pentosanase (Arabinoxylanase) for Improvement of the Nutritional Value of Rye Diets for Broiler Chickens", Journal of the Science of Food and Agriculture , vol. 46, 1989, pp. 289-300.
Pedersen et al., "Xylanase and protease increase solubilization of non-starch polysaccharides and nutrient release of corn and wheat distillers dried grains with solubles", Biochemical Engineering Journal, 2015, pp. 99-106.
Tiwari al., "Supplemental effect of xylanase and mannanase on nutrient digestibility and gut health of nursery pigs studied using both in vivo and in vitro models", Animal Feed Science and Technology, 2018, pp. 77-90.

*Primary Examiner* — David W Berke-Schlessel
*Assistant Examiner* — Susan E. Fernandez
(74) *Attorney, Agent, or Firm* — Nixon & Vanderhye, PC

(57) ABSTRACT

The present invention relates to uses of at least one carbohydrase in combination with an animal feed with a defined A/X fiber fraction, to an animal feed with a defined A/X fiber fraction and comprising at least one carbohydrase in an amount determined suitable to the A/X fiber fraction of the feed and methods of making thereof.

2 Claims, 6 Drawing Sheets

Figure 1:
Figure 1:
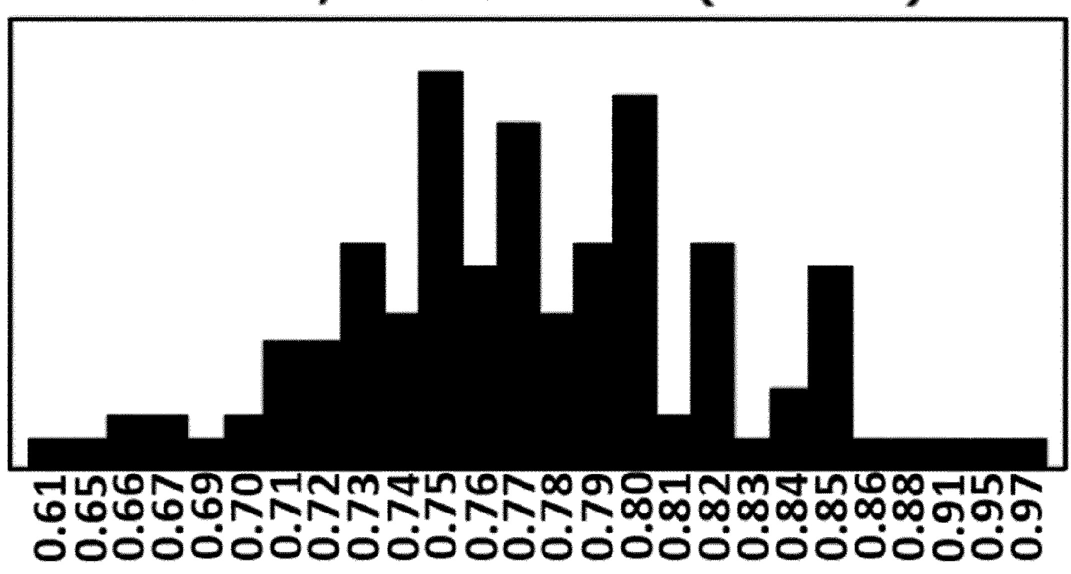

Specification includes a Sequence Listing.

ANIMAL FEED COMPOSITIONS

This application is the U.S. national phase of International Application No. PCT/EP2021/063186 filed May 18, 2021, which designated the U.S. and claims priority to EP patent application No. 20175233.4 filed May 18, 2020, the entire contents of each of which are hereby incorporated by reference.

REFERENCE TO A SEQUENCE LISTING

This application contains a Sequence Listing (Name: 4662-4992_Sequence_listing.txt; Size: 61,092 bytes; and Date of Creation: Nov. 16, 2022) which is hereby incorporated by reference in its entirety.

BACKGROUND OF THE INVENTION

Field of the Invention

The present invention relates to uses of at least one carbohydrase in combination with an animal feed with a defined A/X fiber fraction, to an animal feed with a defined A/X fiber fraction and comprising at least one enzyme having carbohydrase activity in an amount determined suitable to the A/X fiber fraction of the feed and methods of making thereof.

Description of the Related Art

Improving the growth performance of farm animals is needed in a world with a growing population eating more animal protein, and it is the object of the present invention to devise solutions which helps meet this challenge.

Xylans are hemicelluloses found in all land plants (Popper and Tuohy, Plant Physiology, 2010, 153:373-383). They are especially abundant in secondary cell walls and xylem cells. In grasses, with type II cell walls, glucurono arabinoxylans are the main hemicellulose and are present as soluble or insoluble dietary fiber in many grass based food and feed products.

Plant xylans have a β-1,4-linked xylopyranose backbone that can be substituted at the O2 or O3 position with arabinose, glucuronic acid and acetic acid in a species and tissue specific manner. The starch-rich seeds of the sub-family Panicoideae with economically important species such as corn, sorghum, rice and millet have special types of highly substituted xylans in their cell walls. Compared to wheat flour, wherein over 60% of the xylosyl units in the arabinoxylan backbone are unsubstituted. In corn kernel xylan, the corresponding percentage of unsubstituted backbone xylosyls is 20-30%, and in sorghum it is 35-40% (Huismann et al., 2000, Carbohydrate Polymers 42:269-279). Furthermore, in corn and sorghum the xylan side chains can be longer than a single arabinose or glucuronic acid substitution which is common in other xylans. This added side chain complexity is often due to L- and D-galactose and D-xylose sugars bound to the side chain arabinose or glucuronic acid. About every tenth arabinose in corn kernel xylan is also esterified with a ferulic acid and about every fourth xylose carries an acetylation (Agger et al., 2010*, J. Agric. Food Chem.* 58:6141-6148). All of these factors combined make the highly substituted xylans in corn and sorghum resistant to degradation by traditional xylanases.

Corn is used around the world in animal feed and fiber is an effective dietary component in ruminant diets as they are nature's ready-made cellulosic processing factories. For monogastrics, however, corn fiber has historically not been a key source of energy. However, polypeptides having xylanase activity that are capable of breaking down the highly branched xylan backbone in the cell wall in order to release more xylose and other nutrients which are trapped inside the cell wall as disclosed in WO 2003/106654 and WO 2017/103159 have been developed.

Enzyme supplementation of broilers may lead to significant increases in digestible energy (Table 2; Jasek et al., 2018. Impact of a multicarbohydrase containing α-galactosidase and xylanase on ileal digestible energy, crude protein digestibility, and ileal amino acid digestibility in broiler chickens. Poultry Science 97:3149-3155.), whereas no improvement in weight gain or FCR was observed (Table 3; Jasek et al., 2018). Furter, increases in the total tract digestibility of soluble dietary fiber (SDF, Table 7; Abelilla and Stein, 2019. Degradation of dietary fiber in the stomach, small intestine, and large intestine of growing pigs fed corn- or wheat-based diets without or with microbial xylanase. J. Anim. Sci. 2019.97:338-352.) resulted in significant decreases in digestible and metabolizable energy in corn-based diets fed to pigs (Abelilla and Stein, 2019).

Surprisingly and quite counter-intuitively, it has been recently discovered that some factors, such as high A/X corn fiber fractions, the ratio of the mass of arabinoxylans in corn to the total mass of xylose in the corn, lead to different levels of activity of the added feed enzymes, such as carbohydrases, preferably xylanases. The present invention provides an animal feed with a defined A/X corn ratio and comprising polypeptides having carbohydrase activity in an amount determined suitable based on the A/X corn ratio of the feed and uses and methods of making thereof.

SUMMARY OF THE INVENTION

The present invention relates to uses of at least one carbohydrase in combination with an animal feed with a defined A/X fiber fraction for improving the nutritional value of an animal feed.

The present invention further relates to uses of at least one carbohydrase in combination with an animal feed with a defined A/X fiber fraction for increasing digestibility of an animal feed.

The present invention further relates to uses of at least one carbohydrase in combination with an animal feed with a defined A/X fiber fraction for improving one or more performance parameters in an animal.

The present invention also relates to an animal feed with a defined A/X fiber fraction and comprising polypeptides having carbohydrase activity in an amount determined suitable to the A/X fiber fraction of the feed.

The present invention further relates to a method of composing an animal feed comprising at least one carbohydrase, and comprising the step of adjusting the amount of the one or more polypeptides in the animal feed depending on the A/X fiber fraction of the feed.

FIGURES

FIG. 1: Range of fibre fractions in corn (A/X corn ratio) in total of 130 corn samples collected globally. A/X corn ratios range from 0.61 to 0.97

Figure 2:
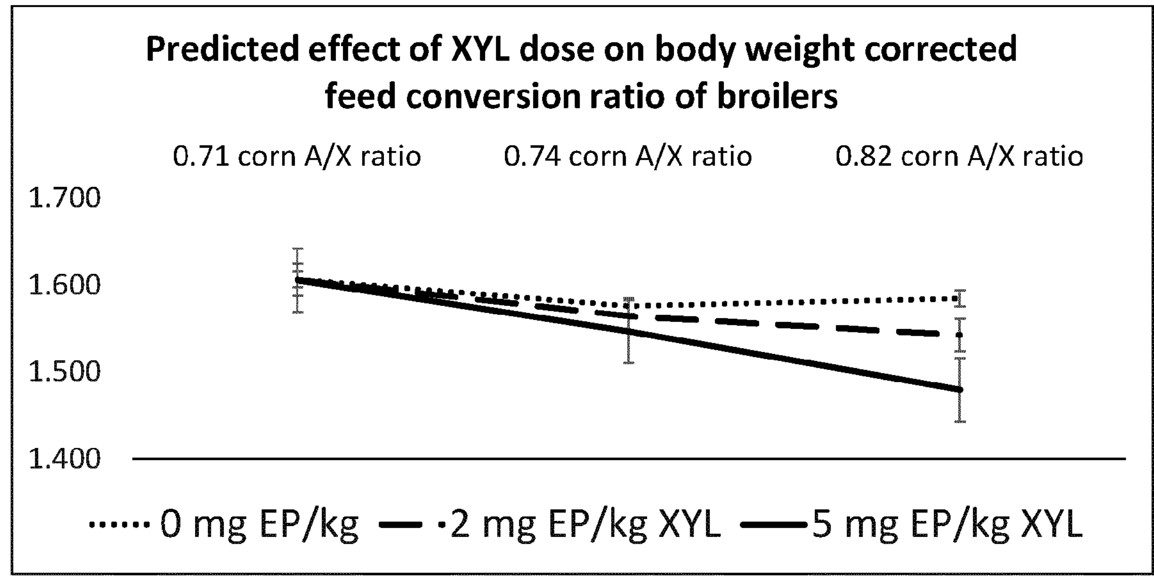

FIG. 2: The predicted body weight corrected feed conversion ratio (BWcFCR), in relation to corn fiber fraction and added amount of carbohydrase.

Figure 3:
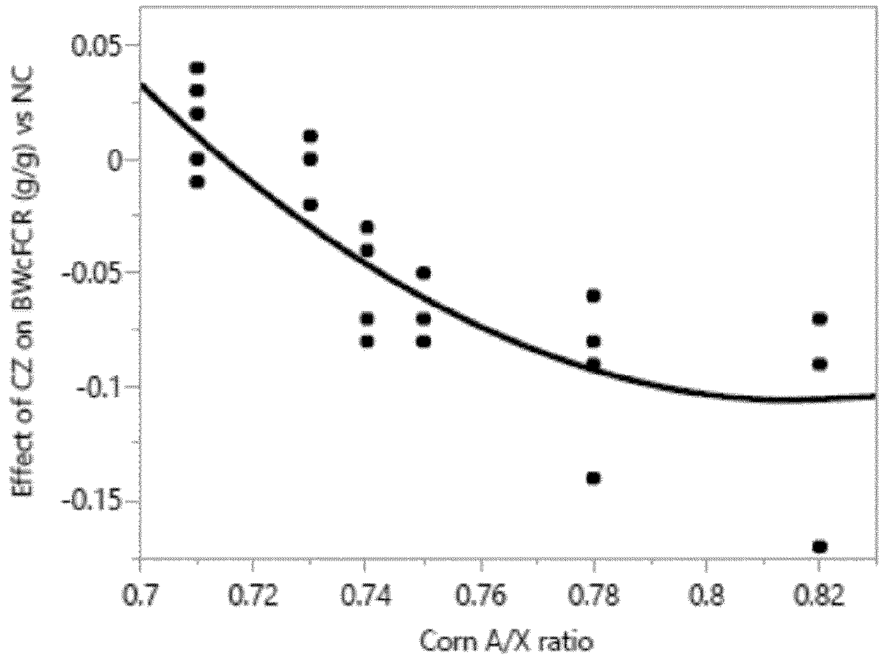

FIG. 3: Relationship between fibre fractions in corn (A/X corn ratio) and the enzyme efficacy of the xylanase of the present invention on body weight corrected feed conversion ratio.

Figure 4:
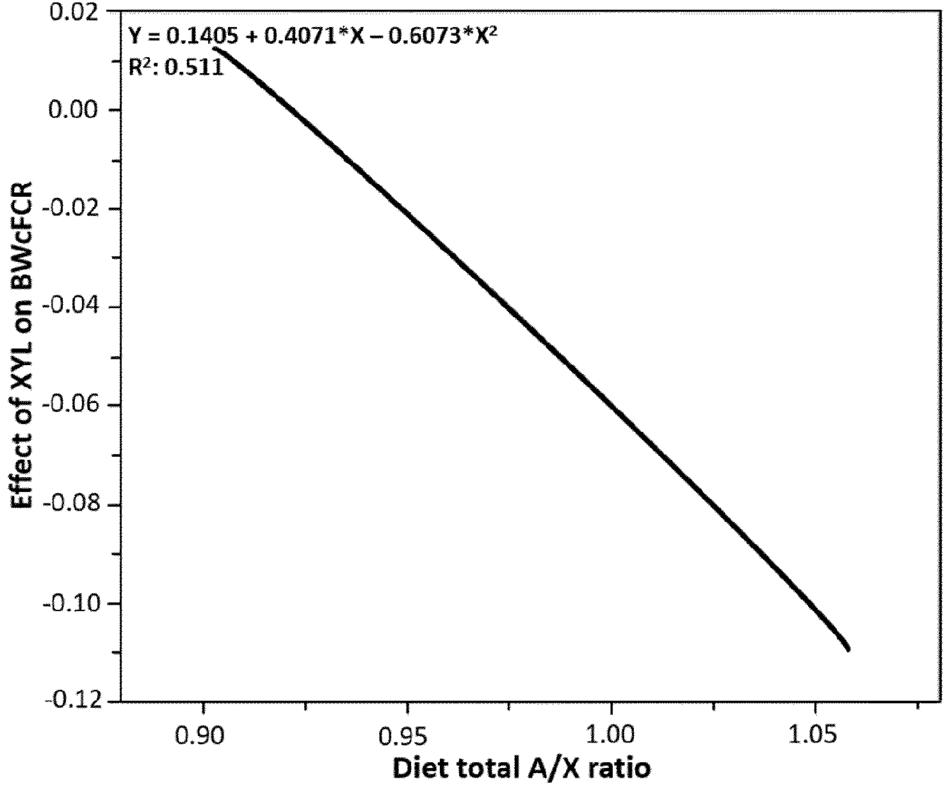

FIG. 4: Relationship between A/X total feed ratio and the enzyme efficacy of the xylanase of the present invention on body weight corrected feed conversion ratio.

Figure 5:
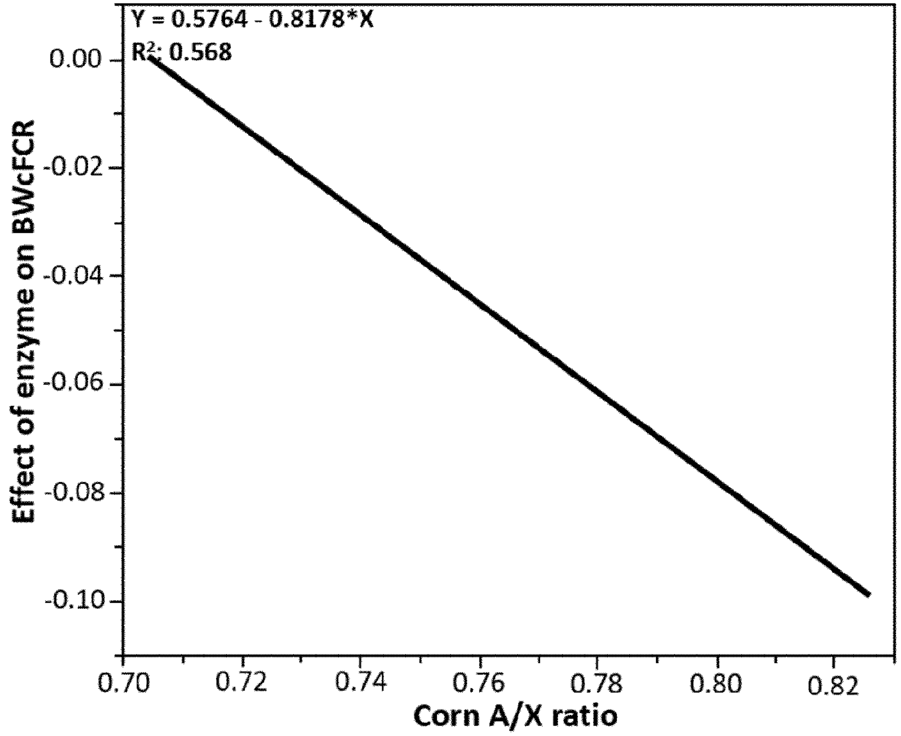

FIG. 5: Relationship between fibre fractions in corn (A/X corn ratio) and the enzyme efficacy of the multi-carbohydrase (RVB) of the present invention on body weight corrected feed conversion ratio.

Figure 6:
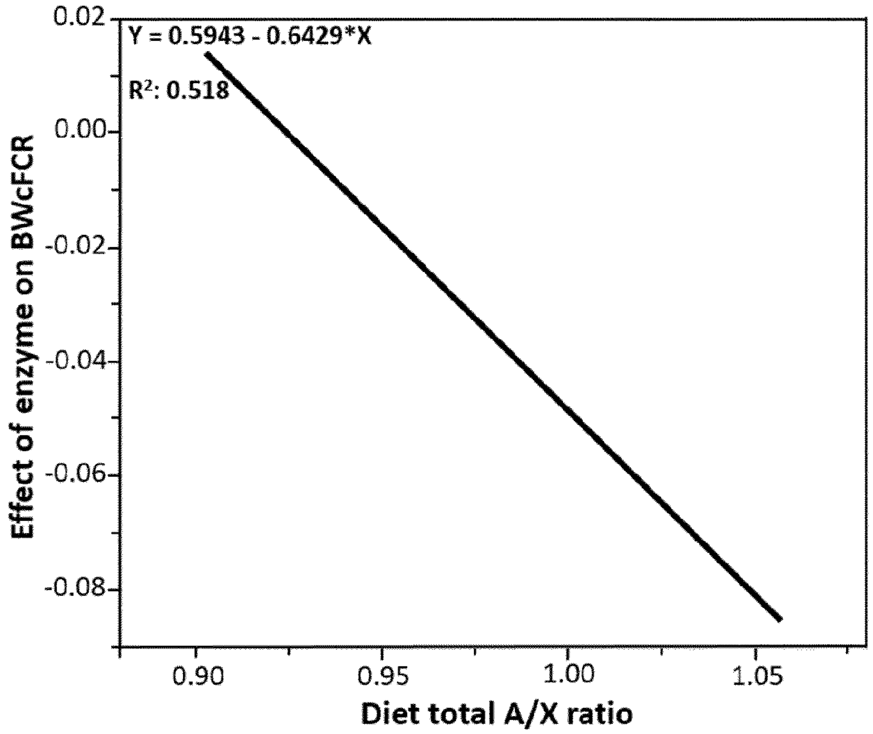

FIG. 6: Relationship between A/X total feed ratio and the enzyme efficacy of the multi-carbohydrase (RVB) of the present invention on body weight corrected feed conversion ratio.

Figure 7:
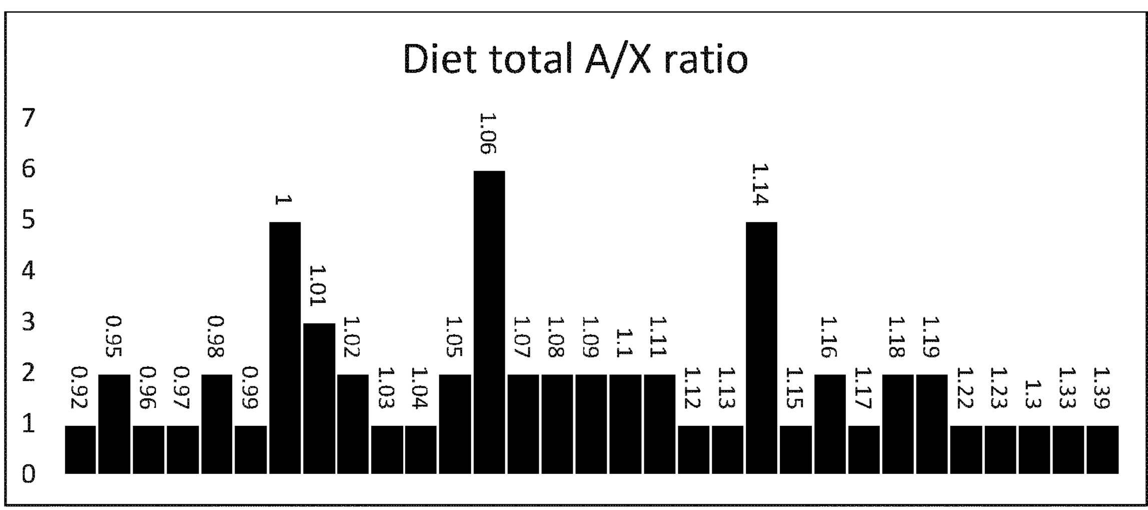

FIG. 7: Distribution of fibre fractions in the total diet (A/X total feed ratio).

Figure 8:
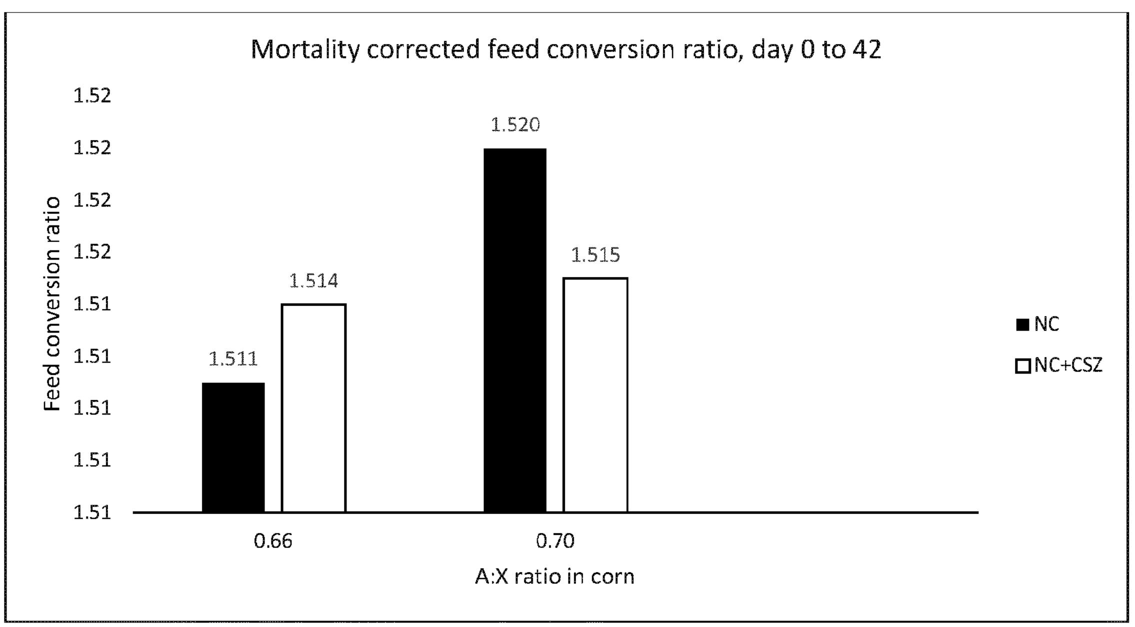

FIG. 8: Results of example 4, Mortality corrected feed conversion ratio, day 0 to 42

Figure 9:
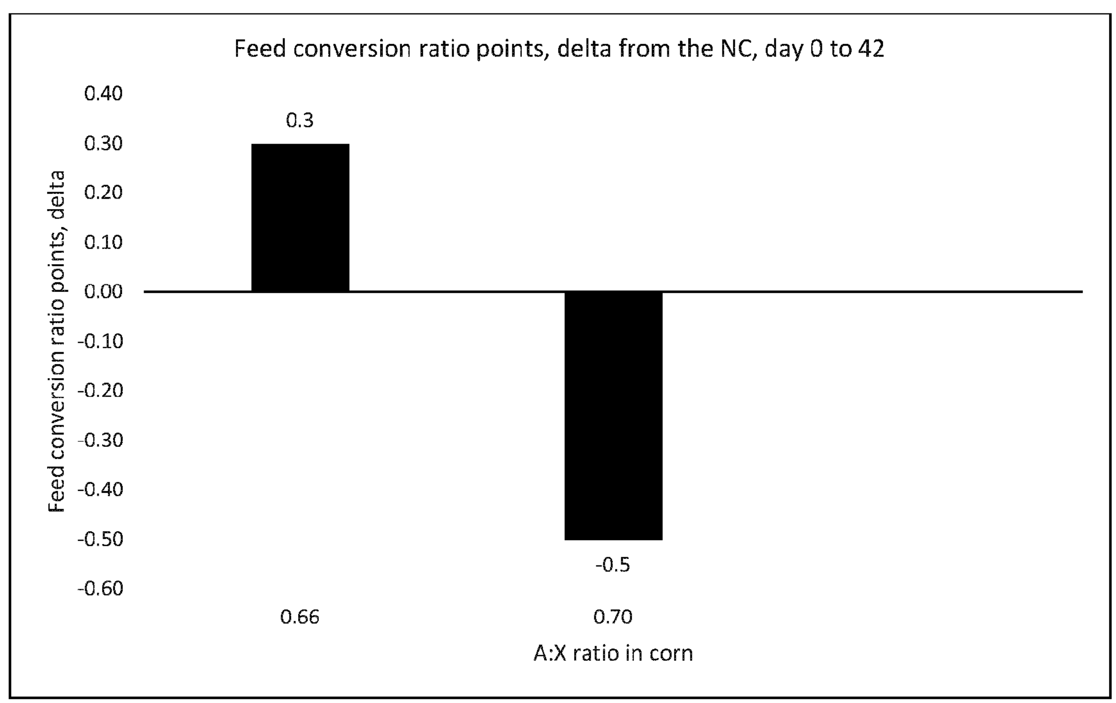

FIG. 9: Results of example 4, Feed conversion ratio points, delta from the NC, day 0 to 42

Figure 10:
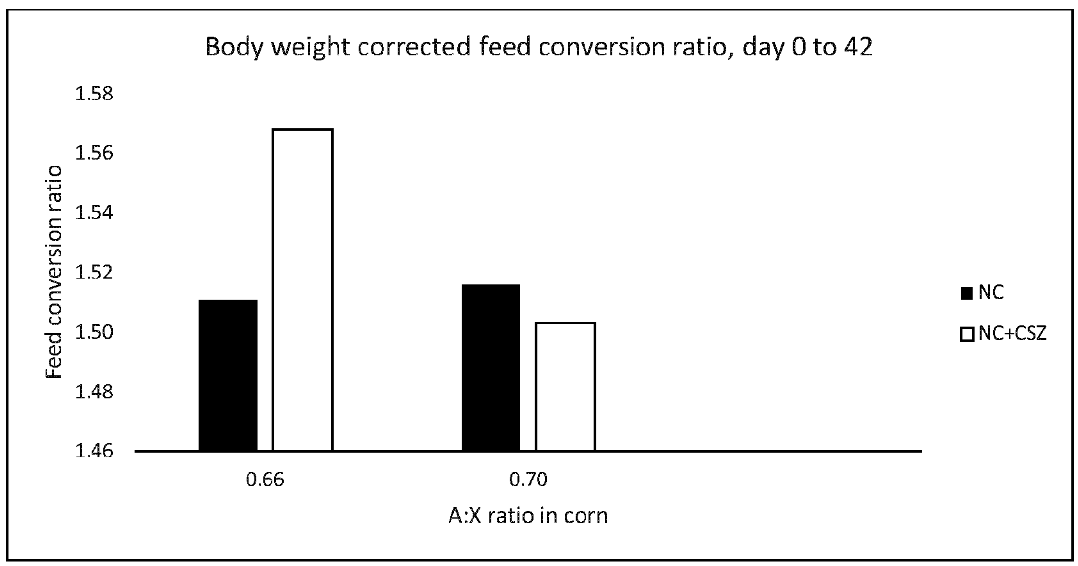

FIG. 10: Results of example 4, Body weight corrected feed conversion ratio, day 0 to 42

Figure 11:
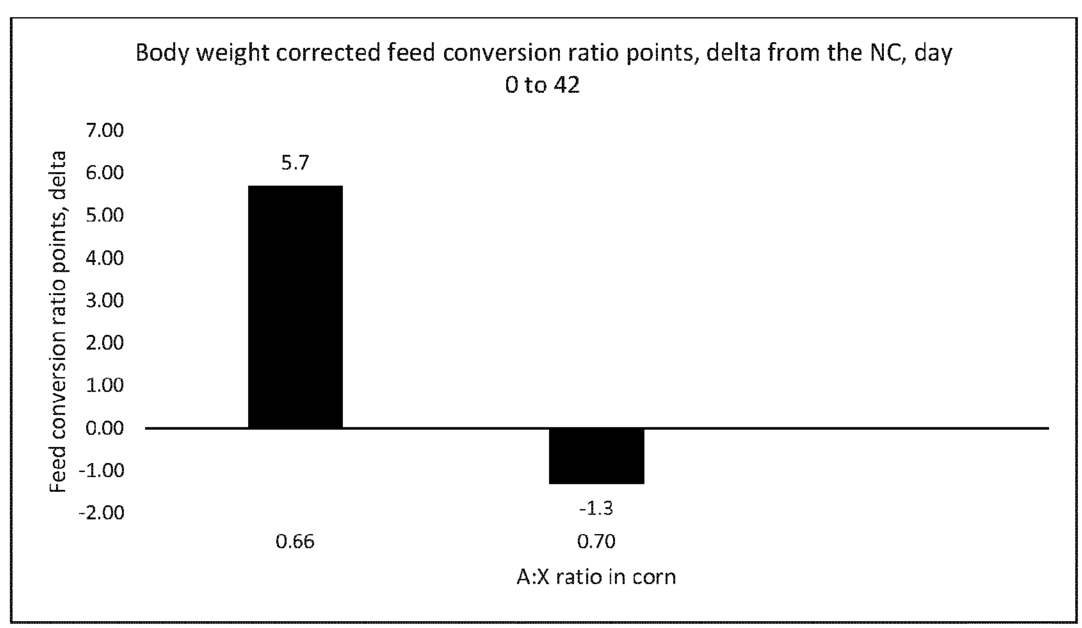

FIG. 11: Results of example 4, Body weight corrected feed conversion ratio points, delta from the NC, day 0 to 42

DEFINITIONS

Alpha-galactosidase: The term "alpha-galactosidase", also called o-D-galactoside galactohydrolase (EC. 3.2.1.22), means an enzyme that catalyses the hydrolysis of terminal, non-reducing cx-D-galactose residues in or-D-galactosides, such as galactose oligosaccharides, galactomannans and galactolipids. Alpha-galactosidase activity can be determined using 4-nitrophenyl cx-D-galactopyranoside (available from Megazyme International, Bray, Co. Wicklow, Ireland) as substrate in 100 mM MES (Sigma) buffer pH 7.0 1 0.05 at room temperature. The enzyme is diluted in 2-fold dilutions and then the 4-nitrophenyl cx-D-galactopyranoside substrate is dissolved in the solution containing the enzyme. The alpha-galactosidase activity is followed directly in the buffer by measuring the absorbance of released pNP at 405 nm as function of time. A detailed assay can be found in the alpha-galactosidase assay as described herein.

Animal: The term "animal" refers to any animal except humans. Examples of animals are monogastric animals, including but not limited to pigs or swine (including, but not limited to, piglets, growing pigs, and sows); poultry such as turkeys, ducks, quail, guinea fowl, geese, pigeons (including squabs) and chicken (including but not limited to broiler chickens (referred to herein as broilers), chicks, layer hens (referred to herein as layers)); pets such as cats and dogs; horses.

Animal feed: The term "animal feed" refers to any compound, preparation, or mixture suitable for, or intended for intake by an animal. Animal feed for a monogastric animal typically comprises concentrates as well as vitamins, minerals, enzymes, direct fed microbial, amino acids and/or other feed ingredients (such as in a premix) whereas animal feed for ruminants generally comprises forage (including roughage and silage) and may further comprise concentrates as well as vitamins, minerals, enzymes direct fed microbial, amino acid and/or other feed ingredients (such as in a premix).

Apparent metabolizable energy (AME): The term "Apparent metabolizable energy (AME)" is the gross energy of the feed consumed minus the gross energy contained in the feces, urine, and gaseous products of digestion.

Arabinoxylan-containing material: The term "Arabinoxylan-containing material" means any material containing arabinoxylan. Arabinoxylan is a hemicellulose found in both the primary and secondary cell walls of plants, including woods and cereal grains, consisting of copolymers of two pentose sugars, arabinose and xylose. The arabinoxylan chain contains a large number of 1,4-linked xylose units. Many xylose units are substituted with 2-, 3- or 2,3-substituted arabinose residues.

Examples of arabinoxylan-containing material are forage, roughage, seeds and grains (either whole or prepared by crushing, milling, etc from, e.g., corn, oats, rye, barley, wheat), trees or hard woods (such as poplar, willow, *eucalyptus*, palm, maple, birch), bamboo, herbaceous and/or woody energy crops, agricultural food and feed crops, animal feed products, cassava peels, cocoa pods, sugar cane, sugar beet, locust bean pulp, vegetable or fruit pomaces, wood waste, bark, shavings, sawdust, wood pulp, pulping liquor, waste paper, cardboard, construction and demolition wood waste, industrial or municipal waste water solids or sludge, manure, by-product from brewing and/or fermentation processes, wet distillers grain, dried distillers grain, spent grain, vinasse and bagasse.

Forage as defined herein also includes roughage. Forage is fresh plant material such as hay and silage from forage plants, grass and other forage plants, grass and other forage plants, seaweed, sprouted grains and legumes, or any combination thereof. Examples of forage plants are Alfalfa (Lucerne), birdsfoot trefoil, *brassica* (e.g., kale, rapeseed (canola), rutabaga (swede), turnip), clover (e.g., alsike clover, red clover, subterranean clover, white clover), grass (e.g., Bermuda grass, brome, false oat grass, fescue, heath grass, meadow grasses, *miscanthus*, orchard grass, ryegrass, switchgrass, Timothy-grass), corn (maize), hemp, millet, barley, oats, rye, sorghum, soybeans and wheat and vegetables such as beets. Crops suitable for ensilage are the ordinary grasses, clovers, alfalfa, vetches, oats, rye and maize. Forage further includes crop residues from grain production (such as corn stover; straw from wheat, barley, oat, rye and other grains); residues from vegetables like beet tops; residues from oilseed production like stems and leaves form soy beans, rapeseed and other legumes; and fractions from the refining of grains for animal or human consumption or from fuel production or other industries.

Preferred sources of arabinoxylan-containing materials are forage, roughage, seeds and grains, sugar cane, sugar beet and wood pulp.

Body Weight Gain: The term "body weight gain" means an increase in live weight of an animal during a given period of time, e.g., the increase in weight from day 1 to day 21.

Carbohydrase: In the present context, a carbohydrase is an enzyme that catalyzes the breakdown of carbohydrates into simple sugars.

Examples of carbohydrases include, but are not limited to, glucanases, xylanase, pectinase, galactosidases, cellulose, mannanases, debranching enzymes and amylases.

Primary targets of carbohydrases are cellulose, arabinoxylans and mixed linked glucans from cereals and pectin polysaccharides and oligosaccharides from plant protein sources. For example, xylanase degrades the linear polysaccharide beta-1,4-xylan into xylose. It helps to breakdown cell wall and thus exposing starch and augmenting digestion.

Preferred carbohydrases according to the present invention are xylanses (as defined in more detail below) and α-galactosidases. α-galactosidase (α-GAL, also known as α-GAL A; E.C. 3.2.1.22) is a glycoside hydrolase enzyme that hydrolyses the terminal alpha-galactosyl moieties from glycolipids and glycoproteins.

Examples of carbohydrases useful in the present context are carbohydrases from *Thermomyces lanuginosus* or *Trichderma reeseibeta*-glucanases produced by fermentation of genetically modified micro-organisms as for example *Aspergillus oryzae* or *Bacillus amyloliquefaciens.*

The carbohydrase for use according to the invention is stable in the presence of protease. The protease stability may be determined by incubating 0.5 mg purified carbohydrase enzyme protein/ml in a buffer at a desired pH (e.g. pH 3, 4, or 5), for the desired time (e.g. 30, 45, 60, 90, or 120 minutes) in the presence of protease (e.g. pepsin, 70 mg/l), and then raising pH to the desired pH (e.g. pH 4, 5, 6, or 7) and measuring residual activity. The residual carbohydrase activity is preferably at least 20%, preferably at least 30, 40, 50, 60, 70, 80, or at least 90% relative to the control (a non-protease-treated sample).

In the use according to the invention the carbohydrases can be fed to the animal before, after, or simultaneously with the diet of the animal. The latter is preferred.

In a particular embodiment, the carbohydrases, in the form in which they are added to the feed, or when being included in a feed additive, are well-defined. Well-defined means, that the enyzme preparation is at least 50% pure on a protein-basis. In other particular embodiments the enzyme preparation is at least 60, 70, 80, 85, 88, 90, 92, 94, or at least 95% pure. Purity may be determined by any method known in the art, e.g. by SDS-PAGE, or by Size-exclusion chromatography (see Example 12 of WO 01/58275).

Concentrates: The term "concentrates" means feed with high protein and energy concentrations, such as fish meal, molasses, oligosaccharides, sorghum, seeds and grains (either whole or prepared by crushing, milling, etc. from e.g. corn, oats, rye, barley, wheat), oilseed press cake (e.g. from cottonseed, safflower, sunflower, soybean (such as soybean meal), rapeseed/canola, peanut or groundnut), palm kernel cake, yeast derived material and distillers grains (such as wet distillers grains (WDS) and dried distillers grains with solubles (DDGS).

Corn protein solubility: Solubility is one of the most important functional properties of proteins, but corn proteins exhibit limited solubility due to their high hydrophobicity and the presence of disulphide bonds (Esen, 1986). The term "Corn protein solubility" is also referred to as "salt soluble protein (SSP)" or "promatest" and Measured in mg using the procedure NF V03-741 recommended by AFNOR (2008) and presented as equivalent mg of albumin or mg proteins/100 ml. Brief methods are described by Janas et al., 2010

Dietary Fiber: The term dietary fiber generally refers to the coarse, indigestible plant matter, composed primarily of polysaccharides such as cellulose, that when eaten by humans stimulates intestinal peristalsis. For example, dietary fiber can include cell wall materials such as cellulose, hemicelluloses, lignin, and pectins, along with gums and mucilages that are not digested by the body. Dietary fiber includes polysaccharides, oligosaccharides, lignin, and associated plant substances. Soluble and insoluble fibres make up the two basic categories of dietary fibre. Cellulose, hemicellulose and lignin—are not soluble in water whereas pectins, gums and mucilages-become gummy in water. Sources of dietary fiber suitable for use in products and quantification in accordance with the disclosure include, but are not limited to, cereal brans, barley, *psyllium*, legumes, insulin, fructo-oligosaccharides, polydextrose, vegetable sources, fruit sources, grain sources, nuts, and flax seeds.

The amount of dietary fiber in a sample can be quantified by standard methods. These methods include, without being limited to, dissoluting the sample to produce a: dietary fiber solution and then centrifuging the dietary fiber solution to produce a pellet and a supernatant liquid. After separating the supernatant liquid from the pellet, the pellet can be analyzed to determine a content of non-dietary fiber components in the pellet. The dietary fiber content in the pellet can be determined from the content of the non-dietary fiber components in the pellet. By using centrifugation to help isolate the dietary fiber in the sample, fiber loss may be minimized, leading to a more accurate determination of the content of dietary fiber in the sample Effect of carbohydrase on BWcFCR vs NC: The term "Effect of carbohydrase on BWcFCR vs NC" refers to the change in FCR when fed a diet with addition of carbohydrases vs. the same diet without carbohydrases. This effect is not expressed in units, but in a difference in units (points). For example the difference in FCR is one point from 1.57 to 1.56.

Feed Conversion Ratio: The term "feed conversion ratio" the amount of feed fed to an animal to increase the weight of the animal by a specified amount. An improved feed conversion ratio means a lower feed conversion ratio. By "lower feed conversion ratio" or "improved feed conversion ratio" it is meant that the use of a feed additive composition in feed results in a lower amount of feed being required to be fed to an animal to increase the weight of the animal by a specified amount compared to the amount of feed required to increase the weight of the animal by the same amount when the feed does not comprise said feed additive composition. To be able to compare different groups, flocks, houses or diets, we assume all animals are of same weight, and the FCR is corrected for weight differences and becomes the body weight corrected feed conversion ratio (BWcFCR): For the purpose of the present invention, for birds, body weight correction is done by subtracting 1 point in FCR per each 30 g of extra body weight, e.g. from 1.57 to 1.56.

To be able to compare different groups, flocks or trials, the feed intake per pen is adjusted for the total number of days the birds in the pen are on the trial and called mortality corrected FCR (mFCR). The relationship is as follows:

Total bird days=(#birds per pen×days on trial)+day bird died.

mortality adjusted feed intake per bird=(pen intake/total bird days)×total trial days Mortality corrected FCR=mortality adjusted feed intake per bird/body weight gain per bird Feed efficiency: The term "feed efficiency" means the amount of weight gain per unit of feed when the animal is fed ad-libitum or a specified amount of food during a period of time. By "increased feed efficiency" it is meant that the use of a feed additive composition according to the present invention in feed results in an increased weight gain per unit of feed intake compared with an animal fed without said feed additive composition being present.

Fiber Fraction: The term "fiber fraction" or "dietary fiber fraction" for the purpose of this invention refers to the mass fraction (weight fraction), the ratio of the mass of a fiber component of a feed or food to the mass of another fiber component of the feed or food.

Specifically, this invention relates to the A/X ratio, or A/X fiber fraction, which is the ratio of the mass of arabinose (A) in a feed or food to the mass of xylose (X) in the feed or food.

A/X total feed ratios, the A/X ratio in the total diet, were calculated from the measured A/X corn ratio and the measured A/X soy bean meal ratio by using the ((percent corn in the diet×measured mass of arabinose in corn)+ (percent soybean meal in diet×measured mass of arabinose in soybean meal))/((percent corn in diet×measured mass of xylose in corn)+ (percent soybean meal in diet×measured mass of xylose in soybean meal)). A/X ratios in the total diet can range from 0.91 to 1.42 with a distribution as shown in FIG. 7.

For the purpose of illustrating the calculation of the A/X ratio in a total diet an example is given as follows: A broiler diet contains 57.43% corn and 37.6% soybean meal. The measured content of arabinose in corn was 1.72 g per 100 g corn and the measured content of xylose in corn was 2.41 g per 100 g corn. The measured content of arabinose in soybean meal was 2.42 g per 100 g soybean meal and the measured content of xylose in soybean meal was 1.25 g per 100 g soybean meal. Therefore, the calculated arabinose to xylose ratio in the total diet is 1.02=((57.43/100)*1.72)+ ((37.6/100)*2.42)/((57.43/100)*2.41)+ ((37.6/100)*1.25).

A/X corn ratio: The term "A/X corn fiber fraction" or "A/X corn ratio" for the purpose of this invention refers to the ratio of the mass of arabinoxylans in a sample of corn to the the mass of xylose in the same sample of corn. A/X ratios in corn typically range from 0.61 to 0.97, as shown in FIG. 1 for a total of 130 corn samples collected globally.

Insoluble A/X ratio: The term "Insoluble A/X ratio" or "Corn insoluble A/X ratio" is determined as the water non-extractable arabinose (insoluble arabinose) over the water non-extractable xylose (insoluble xylose) content in corn, indicative of the structural features of corn arabinoxylan.

soluble A/X ratio: The term "soluble A/X ratio" or "Corn soluble A/X ratio" is determined as the water extractable arabinose (soluble arabinose) over the water extractable xylose (soluble xylose) content in corn. The water extractable arabinose (soluble Arabinose) is calculated by subtracting the insoluble Arabinose from the total arabinose. The water extractable xylose (soluble xylose) is calculated by subtracting the insoluble xylose from the total xylose.

A/X soy bean meal ratio: The term "A/X soy bean meal fiber fraction" or "A/X soy bean meal ratio" for the purpose of this invention refers to the ratio of the mass of arabinoxylans in a sample of soy bean meal to the mass of xylose in the same sample of soybean meal.

Mature polypeptide: The term "mature polypeptide" means a polypeptide in its final form following translation and any post-translational modifications, such as N-terminal processing, C-terminal truncation, glycosylation, phosphorylation, etc.

In the present invention, the mature polypeptide may be amino acids 1 to 208 of SEQ ID NO: 1 as disclosed in EP 16178681.9.

Near-Infrared Spectroscopy: As used herein, the term "near-infrared spectroscopy (NIRS)" refers to a spectroscopic method that uses the near-infrared region of the electromagnetic spectrum (from about 700 nm to 2500 nm).

Non-starch polysaccharide (NSP): The term "non-starch polysaccharide (NSP)" refers to those polysaccharides (complex carbohydrates), other than starches, found in foods. They are the major part of dietary fibre and can be measured more precisely than total dietary fibre; include cellulose, pectins, glucans, gums, mucilages, inulin, and chitin (and exclude lignin). NSP fractions, include soluble and insoluble NSPs and constituent sugars.

Nutrient Digestibility: The term "nutrient digestibility" means the fraction of a nutrient that disappears from the gastro-intestinal tract or a specified segment of the gastro-intestinal tract, e.g., the small intestine. Nutrient digestibility may be measured as the difference between what is administered to the subject and what. comes out in the faeces of the subject, or between what is administered to the subject and what remains in the digesta on a specified segment of the gastrointestinal tract, e.g., the ileum.

Nutrient digestibility as used herein may be measured by the difference between the intake of a nutrient and the excreted nutrient by means of the total collection of excreta during a period of time; or with the use of an inert marker that is not absorbed by the animal, and allows the researcher calculating the amount of nutrient that disappeared in the entire gastro-intestinal tract or a segment of the gastro-intestinal tract. Such an inert marker may be titanium dioxide, chromic oxide or acid insoluble ash. Digestibility may be expressed as a percentage of the nutrient in the feed, or as mass units of digestible nutrient per mass units of nutrient in the feed. Nutrient digestibility as used herein encompasses starch digestibility, fat digestibility, protein digestibility, and amino acid digestibility.

Energy digestibility as used herein means the gross energy of the feed consumed minus the gross energy of the faeces or the gross energy of the feed consumed minus the gross energy of the remaining digesta on a specified segment of the gastro-intestinal tract of the animal, e.g., the ileum. Metabolizable energy as used herein refers to apparent metabolizable energy and means the gross energy of the feed consumed minus the gross energy contained in the faeces, urine, and gaseous products of digestion. Energy digestibility and metabolizable energy may be measured as the difference between the intake of gross energy and the gross energy excreted in the faeces or the digesta present in specified segment of the gastro-intestinal tract using the same methods to measure the digestibility of nutrients, with appropriate corrections for nitrogen excretion to calculate metabolizable energy of feed.

Parent or parent xylanase: The term "parent" or "parent xylanase" means a xylanase to which a substitution is made to produce the xylanase variants used in the present invention. The parent may be a naturally occurring (wild-type) polypeptide or a variant or fragment thereof.

Pooled SEM: The term "pooled SEM" refers to the treatment averaged standard error of the mean.

Roughage: The term "roughage" means dry plant material with high levels of fiber, such as fiber, bran, husks from seeds and grains and crop residues (such as stover, copra, straw, chaff, sugar beet waste).

Sequence identity: The relatedness between two amino acid sequences or between two nucleotide sequences is described by the parameter "sequence identity".

For purposes of the present invention, the sequence identity between two amino acid sequences is determined using the Needleman-Wunsch algorithm (Needleman and Wunsch, 1970, *J. Mol. Biol.* 48:443-453) as implemented in the Needle program of the EMBOSS package (EMBOSS: The European Molecular Biology Open Software Suite, Rice et al., 2000, *Trends Genet.* 16:276-277), e.g., version 5.0.0 or later. The parameters used are gap open penalty of 10, gap extension penalty of 0.5, and the EBLOSUM62 (EMBOSS version of BLOSUM62) substitution matrix. The output of Needle labeled "longest identity" (obtained using the-no-brief option) is used as the percent identity and is calculated as follows:

(Identical Residues×100)/(Length of Alignment−Total Number of Gaps in Alignment)

For purposes of the present invention, the sequence identity between two deoxyribonucleotide sequences is determined using the Needleman-Wunsch algorithm (Needleman and Wunsch, 1970, supra) as implemented in the Needle program of the EMBOSS package (EMBOSS: The European Molecular Biology Open Software Suite, Rice et al., 2000, supra), e.g., version 5.0.0 or later. The parameters used are gap open penalty of 10, gap extension penalty of 0.5, and the EDNAFULL (EMBOSS version of NCBI NUC4.4) substitution matrix. The output of Needle labeled "longest identity" (obtained using the -nobrief option) is used as the percent identity and is calculated as follows:

(Identical Deoxyribonucleotides×100)/(Length of Alignment−Total Number of Gaps in Alignment)

Rapidly digested starch: The term "Rapidly digested starch" refers to starch that is rapidly digested after 20 minutes and measured using an in vitro assay developed by Englyst et al. (1999).

Resistant starch: The term "Resistant starch" refers to starch that is resistant to digestion by endogenous or exogenous enzymes. Measured using an in vitro assay developed by Englyst et al., (1999) or calculated as the starch remaining after rapidly digested starch and slowly digested starch are subtracted from the total starch.

Salt-soluble protein: Solubility of proteins relates to surface hydrophobic (protein-protein) and hydrophilic (protein-solvent) interaction; in food case, such solvent is the water, and therefore the protein solubility is classified as a hydrophilic property. The term "Salt-soluble protein" or "protein solubility" provides an indication of the susceptibility of the protein and starch granules in corn to enzymatic attack. Protein solubility of corn can be influenced by moisture content at harvest and drying time and temperature (Odjo et al., 2012). Salt-soluble protein is measured using the procedure NF V03-741 recommended by AFNOR (2008) and presented as equivalent mg of albumin or mg proteins/100 ml. Brief methods are described by Janas et al., 2010

Slowly digested starch: The term "Slowly digested starch" refers to starch that is slowly digested after 120 minutes and measured using an in vitro assay developed by Englyst et al. (1999) which includes the measurement of total starch, rapidly digested starch and resistant starch.

Total starch: The term "total starch" refers to a natural vegetable polymer consisting of long linear unbranched chains of alpha-1,4-linked D-glucose units (amylose) and or long alpha-1,6-branched glucose units (amylopectin). The methods to evaluate total starch include the measurement of glucose released through the use of alpha-amylases and amyloglucosidases that are specifically active on the alpha (1-4) and alpha (1-6) linkages. Total starch can be measured by multiple methods, not limited to those described by Englyst et al. (1999), Hall (2015) or McCleary et al. (2018).

Variant: The term "variant" means a polypeptide having xylanase activity comprising an alteration, i.e., a substitution, insertion, and/or deletion, at one or more (e.g., several) positions. A substitution means replacement of the amino acid occupying a position with a different amino acid; a deletion means removal of the amino acid occupying a position; and an insertion means adding an amino acid adjacent to and immediately following the amino acid occupying a position. The variants of the present invention have at least 20%, e.g., at least 40%, at least 50%, at least 60%, at least 70%, at least 80%, at least 90%, at least 95%, or at least 100% of the xylanase activity of the polypeptide of SEQ ID NO: 1 as disclosed in EP 16178681.9.

Vitreousness: The term "vitreousness" is also described as rendement brut en semoule [%] by the analytical lab (Germ Services, France), which is the method used to determine Corn vitreousness for the purpose of the present invention. It is an important factor to determine grain texture, usually determined by the ratio of vitreous to floury endosperm-based on appearance with the vitreous region appearing glass-like and translucent whereas the floury endosperm is white, mealy and nontranslucent (Zhang and Xu, 2019). Another method to semi-quantitatively define the starch and protein matrix in corn is to determine the percent vitreousness. High vitreousness is linked to greater protein (prolamin) and starch encapsulation and reduced starch digestibility (in vitro), especially as vitreousness increased above 60% (Blasel et al., 2006).

Wild-type xylanase: The term "wild-type" xylanase means a xylanase expressed by a naturally occurring microorganism, such as a bacterium, yeast, or filamentous fungus found in nature.

Xylanase: In the present context, a xylanase is an enzyme that degrades the linear polysaccharide beta-1,4-xylan into xylose. It helps to breakdown cell wall and thus exposing starch and augmenting digestion.

Preferably, the term "xylanase" refers to a glucuronoarabinoxylan endo-1,4-beta-xylanase (E.C. 3.2.1.136) that catalyses the endohydrolysis of 1,4-beta-D-xylosyl links in some glucuronoarabinoxylans.

The known xylanases are classified into enzyme families based on sequence similarity (cazy.org). The enzymes with mainly endo-xylanase activity have previously been described in Glycoside hydrolase family (GH) 5, 8, 10, 11, 30 and 98. The enzymes within a family share some characteristics such as 3D fold and they usually share the same reaction mechanism. Some GH families have narrow or mono-specific substrate specificities while other families have broad substrate specificities.

Commercially available GH10 and GH11 xylanases are often used to break down the xylose backbone of arabinoxylan. In animal feed this results in a degradation of the cereal cell wall with a subsequent improvement in nutrient release (starch and protein) encapsulated within the cells. Degradation of xylan also results in the formation of xylose oligomers that may be utilised for hind gut fermentation and therefore can help an animal to obtain more digestible energy. However, such xylanases are sensitive to side chain steric hindrance and whilst they are effective at degrading arabinoxylan from wheat, they are not very effective on the xylan found in the seeds of Poaceae species, such as corn or sorghum.

WO 2003/106654 discloses numerous polypeptides with putative xylanase activity. Variants of the GH30 xylanase of SEQ ID NO 190 are described in WO 2003/106654 in order to overcome inherent pH and thermo-stability issues. A number of polypeptides of WO2003/106654 are of relevance to the present invention. WO 2017/103159 also discloses a GH30 subfamily 8 polypeptide having xylanase activity, wherein the GH30 subfamily 8 polypeptide have xylanase activity of relevance to the present invention.

In one embodiment of this invention the polypeptide having xylanase activity is a GH30 family xylanase, for example a xylanase derived from *Bacillus subtilis, Bacillus amyloliquefaciens, Bacillus licheniformis* or *Paenibacillus pabuli.*

Xylanase activity can be determined with 0.2% AZCL-glucuronoxylan as substrate in 0.01% TRITON® X-100 and 200 mM sodium phosphate pH 6 at 37° C. One unit of xylanase activity is defined as 1.0 μmole of azurine produced per minute at 37° C., pH 6 from 0.2% AZCL-glucuronoxylan as substrate in 200 mM sodium phosphate pH 6.

Xylose-containing material: The term "Xylose-containing material" means any material containing xylose. Xylose is a pentose sugar and the main building block for the hemicellulose xylan. Xylose may be extracted from wood, sugar cane or coconuts. It also naturally occurs in small amounts in berries, spinach, broccoli, and pears and as part of the dietary fiber arabinoxylan. The arabinoxylan chain contains a large number of 1,4-linked xylose units. Many xylose units are substituted with 2—, 3- or 2,3-substituted arabinose residues.

DETAILED DESCRIPTION OF THE INVENTION

As mentioned above, the present invention relates to uses of at least one carbohydrase in combination with an animal feed with a defined A/X fiber fraction for improving the nutritional value of an animal feed.

The carbohydrase of the present invention may be added to the feed in the form of a single component carbohydrase or in the form of a multicomponent carbohydrase composition, such as commercially available from Rovabio® Advance (further referred to as "RVB") comprising an Endo-1,4-β-xylanase, β-xylosidase, Endo-1,3 1,4-β-glucanase, laminarinase, α-arabinofuranosidase, α-glucuronidase, ferulic acid esterase, endo-1,4-β-glucanase, cellobiohydrolase, β-glucosidase, polygalacturonase, pectin esterase, endo-1,5-α-arabinanase, α-galactosidase, rhamnogalacturonase, aspartic protease, metallo protease, endo-1,4-β-mannanase, β-manosidase.

Preferred Carbohydrases are Xylanses as Defined Above, for Example:

```
SEQ ID NO 1 is the "wild-type" xylanase (as defined in WO03106654 by
SEQ ID NO: 190):
AASDVTVNVS AEKQVIRGFG GMNHPAWAGD LTAAQRETAF GNGQNQLGFS

ILRIHVDENR NNWYKEVETA KSAVKHGAIV FASPWNPPSD MVETFNRNGD

TSAKRLKYNK YAAYAQHLND FVTFMKNNGV NLYAISVQNE PDYAHEWTWW

TPQEILRFMR ENAGSINARV IAPESFQYLK NLSDPILNDP QALANMDILG

THLYGTQVSQ FPYPLFKQKG AGKDLWMTEV YYPNSDTNSA DRWPEALDVS

QHIHNAMVEG DFQAYVWWYI RRSYGPMKED GTISKRGYNM AHFSKFVRPG

YVRIDATKNP NANVYVSAYK GDNKVVIVAI NKSNTGVNQN FVLQNGSASN

VSRWITSSSS NLQPGTNLTV SGNHFWAHLP AQSVTTFVVN R

SEQ ID NO 2 comprises the sequence:
AANDVTVNIS AEKQVIRGFG GMNHPAWVGD LTAAQRETAF GNGQNQLGFS

ILRIHVDENR NNWYKEVETA KSAIKHGAIV FASPWNPPSN MVETFNHNGD

TSAKRLRYDK YAAYAQHLND FVTFMKSNGV NLYAISIQNE PDYAHEWTWW

TPQEILRFMR ENAGSINARV IAPESFQYLK NLSDPILNDP QALANMDILG

THLYGTQVSQ FPYPLFKQKG AGKDLWMTEV YYPNSDNNSA DRWPEALDVS

QHIHNSMVEG DFQAYVWWYI RRSYGPMKED GTISKRGYNM AHFSKFVRPG

YVRIDATKNP NPNVYVSAYK GDNKVVIVAI NKSNTGVNQN FVLQNGSASQ

VSRWITSSNS NLQPGTNLKV TDNHFWAHLP AQSVTTFVVI R

SEQ ID NO 3 is GH11 xylanase and comprises the sequence:
AASDATVRLS AEKQVIRGFG GMNHPAWIGD LTAAQRETAF GNGQNQLGFS

ILRIHVDENR NNWYREVETA KSAIKHGAIV FASPWNPPSD MVETFNRNGD

TSAKRLRYDK YAAYAKHLND FVTFMKNNGV NLYAISVQNE PDYAHDWTWW

TPQEILRFMK ENAGSINARV IAPESFQYLK NISDPIVNDP KALANMDILG

AHLYGTQLNN FAYPLFKQKG AGKDLWMTEV YYPNSDNHSA DRWPEALDVS

HHIHNSMVEG DFQAYVWWYI RRSYGPMKED GTISKRGYNM AHFSKFVRPG

YVRVDATKSP ASNVYVSAYK GDNKVVIVAI NKNNSGVNQN FVLQNGSVSQ

VSRWITSSSS NLQPGTNLNV TDNHFWAHLP AQSVTTFVAN LR
```

-continued

SEQ ID NO 4 is GH11 xylanase and comprises the sequence:
ANTDYWQNWTDG GGTVNAVNGS GGNYSVNWSN TGNFVVGKGW TTGSPFRTIN

YNAGVWAPNG NAYLTLYGWT RSPLIEYYVV DSWGTYRPTG TYKGTVYSDG

GTYDVYTTTR YDAPSIDGDK TTFTQYWSVR QSKRPTGSNA TITFSNHVNA

WKRYGMNLGS NWSYQVLATE GYRSSGSSNV TVW

SEQ ID NO 5 comprises the sequence:
ASTDYWQNWTDG GGIVNAVNGS GGNYSVNWSN TGNFVVGKGW TTGSPFRTIN

YNAGVWAPNG NGYLTLYGWT RSPLIEYYVV DSWGTYRPTG TYKGTVKSDG

GTYDIYTTTR YNAPSIDGDR TTFTQYWSVR QSKRPTGSNA TITFSNHVNA

WKSHGMNLGS NWAYQVMATE GYQSSGSSNV TVW

SEQ ID NO: 6 is the amino acid sequence of the mature GH30_8 xylanase from *Clostridium acetobutylicum*:
Ala Ser Asn Val Met Val Asn Leu Ala Ser Lys Lys Gln Val Ile Arg Gly Phe Gly Gly Met Asn Ser Val Ala Trp Ala Gly Asp Leu Thr Ala Ala Gln Arg Glu Thr Ala Phe Gly Asn Gly Asn Asn Gln Leu Gly Leu Ser Val Val Arg Ile Phe Val Asp Asp Asn Lys Asn Asn Trp Tyr Lys Glu Leu Pro Thr Ala Lys Ser Ala Ile Ala His Gly Ser Ile Val Phe Ala Thr Pro Trp Asn Pro Pro Ser Ser Met Thr Glu Thr Phe Asn Arg Asn Gly Glu Lys Ala Lys Arg Leu Arg Tyr Asp Lys Tyr Gly Asp Tyr Ala Lys Tyr Leu Asn Asp Phe Val Ser Tyr Met Lys Asn Asn Gly Val Asn Leu Tyr Ala Ile Ser Val Gln Asn Glu Pro Asp Tyr Gly Arg Asp Trp Thr Trp Trp Thr Pro Gln Glu Val Leu Arg Phe Met Arg Asp Tyr Ala Gly Ser Ile Asn Cys Arg Val Met Ser Pro Glu Ser Phe Ser Tyr Gln Lys Asn Met Tyr Asp Pro Ile Leu Asn Asp Pro Lys Ala Leu Ala Asn Met Asp Ile Leu Gly Thr His Thr Tyr Gly Thr Gln Val Lys Asp Phe Pro Tyr Pro Leu Phe Lys Gln Lys Ala Ala Gly Lys Asp Leu Trp Met Thr Glu Val Tyr Val Pro Asn Ser Asp Ala Asn Ser Ala Asp Arg Trp Pro Glu Ala Leu Glu Val Ala Asn His Ile Asn Asn Ala Met Val Glu Gly Asp Phe Gln Ala Tyr Val Trp Trp Tyr Ile Arg Arg Ser Tyr Gly Leu Ile Lys Glu Asn Gly Ala Ile Ser Lys Arg Gly Tyr Met Met Ala His Phe Ser Lys Phe Val Arg Pro Gly Tyr Val Arg Val Asp Ala Thr Lys Asn Pro Val Gly Asn Val Tyr Val Ser Ala Tyr Thr Gly Asn Asn Lys Val Val Ile Val Ala Ile Asn Lys Gly Thr Tyr Pro Val Asn Gln Ser Phe Asn Ile Gln Asn Ser Thr Val Ser Asn Val Ser Ser Trp Val Thr Ser Gly Thr Leu Asn Met Ala Lys Thr Asn Ser Asn Ile Asn Ala Ala Asn Gly Arg Phe Asn Ala Ser Leu Pro Ala Gln Ser Val Thr Thr Phe Val Ala Asp Leu Asn Ser Thr Lys Pro Thr Thr Asn Pro Thr Thr Asn Pro Thr Pro Gly Ser Thr Val Thr Leu Asn Asn Gly Trp Tyr Tyr Ile Lys Asn Ile Asn Ala Gln Lys Tyr Leu Gln Val Ala Asn Asn Thr Gly Lys Ala Gly Gln Asn Val Glu Leu Gly Ser Gly Ser Gly Val Ala Gly Gln Lys Trp Tyr Leu Thr Asn Thr Gly Asp Gly Tyr Ile Thr Leu Lys Asn Ala Leu Gly Asn Tyr Met Leu Asp Val Ser Tyr Gly Glu -continued Asn Lys Asp Gly Ser Asn Ile Gln Ile Phe Asn Ala Tyr Ser Gly Asp Ser Gln Lys Phe Ala Val Lys Ala Ser Ser Lys Asn Gly Gln Tyr Ser Val Ala Thr Lys Ser Ser Asn Gly Ser Lys Val Leu Asp Asp Tyr Asn Phe Gly Thr Ala Asp Gly Thr Asn Val Cys Gln Trp Thr Tyr Gly Gly Asn Ala Asn Gln Leu Trp Val Phe Glu Pro Thr Asn Asn SEQ ID NO: 7 is the amino acid sequence of the mature GH30_8 xylanase from *Pseudoalteromonas tetraodonis*:

Ser Asn Val Thr Ile Asn Phe Asn Thr Gln Tyr Gln Gln Ile Asp Gly

Phe Gly Gly Met Asn Ala Pro Gly Trp Ile Asn Asp Leu Thr Pro Ala

Gln Ala Thr Lys Ala Phe Gly Thr Gly Asn Gly Glu Met Gly Leu Ser

Ile Met Arg Met Arg Ile Ala Pro Asp Ser Asn Gln Trp Tyr Lys Gln

Val Pro Thr Ala Lys Ile Ala Lys Ser Tyr Gly Ala Lys Leu Leu Ala

Ser Pro Trp Ser Pro Pro Ala Tyr Met Lys Ser Asn Asn Asn Leu Asn

Asn Gly Gly Lys Leu Glu Lys Thr His Tyr Trp Gly Tyr Thr Asn His

Leu Met Asp Phe Thr Asn Tyr Met Ala Ser Gln Gly Ala Ser Val Tyr

Ala Leu Ser Leu Gln Asn Glu Pro Asp Trp His Pro Glu Tyr Glu Ser

Cys Asp Trp Ser Ala Ser Asp Phe Val Asn Tyr Leu Asn Asp Gln Gly

Trp Arg Leu Asp Pro Ala Leu Lys Ile Leu Ala Pro Glu Ser Leu Gly

Phe Asn Lys Ala Leu Ser Asp Pro Ile Leu Asn Asn Ser Val Ala Asn

Asn Tyr Val Asp Ile Ile Gly Gly His Leu Tyr Gly Val Ser Pro Ser

Asn Tyr Pro Leu Ala Leu Gln Lys Gly Lys Lys Leu Trp Met Thr Glu

His Tyr Thr Asp Asn Glu Asp Gly Asn Asn Trp Asn Ala Ser Ile Asp

Val Gly Leu Glu Leu His Gln Ser Met Val Ser Asn Tyr Ser Ala Tyr

Ile Trp Trp Tyr Ile Arg Arg Ser Tyr Gly Leu Met Ser Glu Asp Gly

Asn Val Ser Lys Arg Gly Tyr Ile Met Ala Gln Phe Ser Lys Tyr Ile

Arg Pro Gly Tyr Thr Arg Ile Gly Ala Thr Glu Met Pro Glu Asn Asn

Val Tyr Val Thr Ala Tyr Lys Asn Asn Ala Gly Lys Leu Val Ile Val

Val Val Asn Lys Ser Gly Ser Pro Lys Ala Leu Asp Phe Thr Leu Gln

Asn Gly Thr Val Asn Thr Leu Thr Lys Tyr Ser Thr Ser Ala Ser Met

Asn Met Glu Tyr Arg Gly Lys Ser Thr Val Ser Asn Asn Arg Phe Ser

Ala Tyr Ala Asp Ala Trp Ala Val Gln Thr Phe Val Ser Asn

SEQ ID NO: 8 is the amino acid sequence of the mature GH30_8 xylanase from *Paenibacillus* sp-19179:

Ala Ser Asp Ala Ile Val Asn Ile Ser Ala Glu Lys Gln Val Ile Arg

Gly Phe Gly Gly Ile Asn His Pro Val Trp Ile Gly Asp Leu Thr Ala

Ala Gln Arg Glu Thr Ala Phe Gly Asn Gly Asn Asn Gln Leu Gly Phe

Ser Ile Leu Arg Ile Tyr Val His Glu Asp Arg Asn Gln Trp Tyr Arg

Glu Val Glu Thr Ala Lys Arg Ala Ile Ala Leu Gly Ala Ile Val Phe

Ala Ser Pro Trp Asn Pro Pro Ala Asp Met Val Glu Thr Phe Asn Arg

Asn Gly Asp Pro Ser Ala Lys Arg Leu Arg Tyr Asp Lys Tyr Ala Ala

Tyr Ala Gln His Leu Asn Asp Phe Val Thr Tyr Met Arg Asn Asn Gly

Val Asn Leu Tyr Ala Ile Ser Val Gln Asn Glu Pro Asp Tyr Ala His

Asp Trp Thr Trp Trp Thr Pro Gln Glu Met Leu Arg Phe Met Lys Glu

-continued

Asn Ala Gly Ser Ile Asn Thr Arg Val Ile Ala Pro Glu Ser Phe Gln

Tyr Leu Lys Asn Met Ser Asp Pro Ile Leu Asn Asp Pro Gln Ala Leu

Ala Asn Met Asp Ile Leu Gly Ala His Leu Tyr Gly Thr Gln Val Ser

Asn Phe Ala Tyr Pro Leu Phe Lys Gln Lys Gly Ala Gly Lys Asp Leu

Trp Met Thr Glu Val Tyr Tyr Pro Asn Ser Asp Asn Asn Ser Ala Asp

Arg Trp Pro Glu Ala Leu Asp Val Ser Tyr His Ile His Asn Ala Met

Val Glu Gly Asp Phe Gln Ala Tyr Val Trp Trp Tyr Ile Arg Arg Ser

Tyr Gly Pro Met Lys Glu Asp Gly Thr Ile Ser Lys Arg Gly Tyr Ala

Met Ala His Phe Ser Lys Phe Val Arg Pro Gly Tyr Val Arg Val Glu

Ala Thr Lys Asn Pro Glu Thr Asn Val Tyr Val Ser Ala Tyr Lys Gly

Asn Lys Lys Leu Val Ile Val Ala Val Asn Lys Asn Asn Ser Gly Val

Asn Gln Asn Phe Val Leu Pro Asn Ala Ser Val Ser Lys Ile Ser Arg

Trp Ile Thr Ser Gly Ser Ser Asn Leu Gln Pro Gly Thr Glu Leu Thr

Met Thr Gly Gly Asn Phe Trp Ala His Leu Pro Ala Gln Ser Val Thr

Thr Phe Val Ala Asp Leu Gly

SEQ ID NO: 9 is the amino acid sequence of the mature GH30_8 xylanase *Pectobacterium carotovorum* subsp. *Carotovorum*:

Asp Thr Val Lys Ile Asp Ala Lys Thr Ser Tyr Gln Ile Ile Gln Gly

Phe Gly Gly Met Asn Ala Pro Gly Trp Ile Asn Asp Leu Thr Thr Glu

Gln Val Asn Thr Ala Phe Gly Asn Asp Thr Gly Gln Ile Gly Leu Ser

Ile Met Arg Met Arg Ile Asp Pro Asp Ala Asn Arg Trp Asn Ile Gln

Val Ser Ser Ala Arg Gln Ala Ser Leu Leu Gly Ala Lys Leu Met Ala

Thr Pro Trp Thr Pro Pro Ala Tyr Met Lys Ser Asn Lys Ser Leu Ile

Asn Gly Gly Arg Leu Leu Ser Glu His Tyr Ser Gly Tyr Thr Glu His

Leu Leu Lys Phe Ser Asn Phe Met Gln Thr Asn Asn Ala Pro Leu Tyr

Ala Ile Ser Ile Gln Asn Glu Pro Asp Trp Lys Pro Asp Tyr Glu Ser

Cys Glu Trp Asn Gly Asn Asp Phe Lys Asn Tyr Leu Lys Ser Gln Gly

Ser Lys Phe Gly Ser Leu Lys Val Ile Val Gly Glu Ser Leu Asn Phe

Asn His Ser Leu Thr Asp Pro Thr Leu Asn Asp Ser Glu Ala Ala Lys

His Val Ala Ile Val Gly Gly His Leu Tyr Gly Thr Thr Pro Lys Pro

Tyr Pro Leu Ala Gln Asn Lys Gly Lys Glu Val Trp Met Thr Glu His

Leu Val Asp Ser Lys Gln Ser Ala Asn Asn Trp Ser Ser Ala Leu Glu

Val Ala Ser Glu Met Asn Ala Ser Met Val Ala Asn Tyr Asn Ala Tyr

Val Trp Trp Tyr Ile Arg Arg Ser Tyr Gly Leu Leu Thr Glu Asp Gly

Lys Val Ser Lys Arg Gly Tyr Val Met Ala Gln Tyr Ala Lys Phe Val

Arg Pro Gly Phe Gln Arg Ile Gln Ala Thr Glu Asn Pro Gln Ala Asn

Val His Leu Thr Ala Tyr Lys Asn Ser Glu Gly Lys Met Val Ile Val

Ala Ile Asn Thr Asn Asp Ser Asp Gln Leu Leu Ser Leu Asn Ile Ser

Asn His Thr Val Ser Lys Phe Glu Lys Tyr Ser Thr Ser Ala Ile Leu

Asn Val Glu Tyr Gly Gly Thr Tyr Lys Val Asp Ser Asn Gly Lys Ser

Ser Val Trp Leu Asn Pro Leu Ser Val Thr Thr Phe Val Gly Lys

-continued

SEQ ID NO: 10 is the amino acid sequence of the mature GH30_8 xylanase *Ruminococcus* sp. CAG: 330

Ala Asp Val Cys Val Ile Asp Thr Asp Thr Glu His Gln Met Ile Arg

Gly Phe Gly Gly Ile Asn His Pro Glu Trp Ala Gly Asp Leu Thr Gln

Ala Gln Arg Gln Thr Ala Phe Gly Asn Gly Glu Asn Glu Leu Gly Leu

Thr Val Leu Arg Val Phe Val Asn Pro Asp Ser Ser Gln Trp Ser Arg

Ala Leu Pro Thr Ala Gln Phe Ala Thr Gln Met Gly Val Thr Val Phe

Ala Ser Pro Trp Glu Pro Pro Ala Asn Leu Thr Glu Ser Gly Gly Ser

Asn Gly Lys Leu His Leu Pro Lys Ser Asn Tyr Ala Ala Tyr Ala Lys

His Leu Asn Asp Phe Gly Thr Tyr Met Lys Asn Asn Asn Val Asp Leu

Tyr Ala Ile Ser Val Gln Asn Glu Pro Asp Tyr Ala Ser Glu Trp Thr

Tyr Trp Ser Thr Asp Glu Thr Thr Asp Phe Ile Ala Asn Tyr Gly Asp

Gln Ile Thr Ser Thr Arg Leu Met Ser Pro Glu Ser Phe Gln Tyr Ala

Pro Glu Asn Ala Ser Trp Val Ser Asp Gly Gly Lys Lys Phe Tyr Arg

Lys Ile Leu Asn Asn Ser Lys Ala Met Ala Asn Cys Asp Val Phe Gly

Thr His Phe Tyr Gly Thr Gln Arg Ser Trp Met Asp Phe Pro Asp Leu

Glu Asn Ser Gly Lys Glu Ile Trp Met Thr Glu Val Tyr Val Pro Asn

Ser Asp Lys Asp Ser Ala Asn Arg Tyr Pro Glu Ala Leu Gln Val Ser

Glu Asn Ile His Asn Ala Met Val Val Gly Asn Met Ser Ala Tyr Thr

Trp Trp Tyr Ile Arg Arg Asn Tyr Gly Leu Met Thr Glu Asp Gly Lys

Ile Ser Lys Arg Gly Tyr Cys Met Ala Gln Tyr Ser Lys Tyr Val Arg

Pro Gly Asp Val Arg Ile Asp Ala Thr Glu Gln Pro Ala Asp Asn Val

Tyr Val Ser Ala Tyr Lys Gly Asp Asp Asn Gln Val Thr Ile Val Ala

Ile Asn Lys Gly Thr Glu Ser Tyr Ser Gln Gln Phe Ala Val Asp Ala

Asp Ala Gln Ile Thr Glu Val Asp Arg Tyr Arg Thr Ser Ala Ser Glu

Asn Leu Ala Lys Thr Glu Asn Met Glu His Asp Ser Ser Ser Phe Trp

Ala Gln Leu Pro Ala Glu Ser Val Ser Thr Phe Val Val Thr Leu Glu

Asp Gln Pro Val Glu Pro Asp Glu Asn Gly Tyr Tyr Phe His Asp Thr

Phe Glu Ser Asp Asn Cys Asp Trp Gln Gly His Gly Ser Ala Asp Ile

Thr Leu Ser Gly Arg Ile Pro Tyr Gln Gly Thr Asn Ala Leu Leu Val

Gln Asn Arg Ala Ser Ala Trp Asn Gly Ala Glu Lys Val Leu Pro Ala

Lys Ala Phe Gln Ala Gly Lys Glu Tyr Ser Phe Ser Val Cys Leu Asn

Tyr Met Asp Gly Glu Ser Ser Lys Asn Ala Ala Leu Ser Leu Gln Tyr

Thr Asp Ala Ala Gly Glu Thr Lys Tyr Ala Arg Ile Ala Ser Ala Ser

Ala Ala Lys Gly Asn Tyr Val Gln Leu Ala Asn Pro Ser Phe Lys Leu

Pro Asp Gly Gly Lys Asn Phe Lys Ile Tyr Val Glu Thr Glu Gly Asp

Thr Asp Asn Phe Tyr Ile Asp Glu Ala Ile Gly Ala Val Lys Gly Thr

Ala Ile Glu Gly Pro

SEQ ID NO: 11 is the amino acid sequence of the mature GH30_8 xylanase *Streptomyces* sp-62627:

Ser Arg Thr Pro Ser Ala Ala Ala Thr Ser Val Thr Val Asp Pro Ser

Ala Thr Arg Gln Thr Ile Arg Gly Phe Gly Gly Met Asn His Pro Leu

Trp Ile Gly Asp Leu Thr Pro Ala Gln Arg Asp Thr Ala Phe Gly Asn

-continued

Gly Glu Gly Gln Leu Gly Phe Ser Val Leu Arg Ile Pro Val Ser Glu

Asp Arg Ala Asn Trp Ser Arg Glu Val Ala Thr Ala Lys Arg Ala Thr

Glu Leu Gly Ala Ile Val Phe Ala Ser Pro Trp Asn Pro Pro Ala Asn

Met Val Glu Thr Phe Val Arg Gly Gln Gln Thr Asp Ala Lys Arg Leu

Arg His Ser Met Tyr Gly Ala Tyr Ala Gln His Leu Asn Asp Phe Val

Ala Phe Met Lys Ser Asn Gly Val Asn Leu Tyr Ala Ile Ser Val Gln

Asn Glu Pro Asp Tyr Ala His Asp Trp Thr Trp Trp Thr Pro Ser Glu

Met Thr Arg Phe Leu Arg Glu Asn Ala Gly Ser Ile Ser Thr Lys Val

Ile Ala Pro Glu Ser Phe Gln Tyr Val Lys Thr Phe Ser Asp Pro Ile

Leu Asn Asp Ala Ala Ala Leu Ala Asn Leu Asp Ile Leu Gly Ala His

Leu Tyr Gly Thr Ser Phe Gln Asn Phe Pro Tyr Pro Leu Phe Lys Gln

Lys Gly Gly Gly Lys Glu Leu Trp Met Thr Glu Val Tyr His Pro Asn

Ser Ser Asp Ser Ala Asp Leu Trp Pro Gln Ala Leu Asp Val Ala Glu

His Ile His Arg Ala Met Val Asp Ala Glu Phe Gln Ala Tyr Val Trp

Trp Tyr Ile Arg Arg Gly Tyr Gly Pro Met Arg Glu Asp Gly Arg Ile

Ser Lys Arg Gly Ala Gly Met Ala His Phe Ser Lys Phe Val Arg Pro

Gly His Val Arg Val Ala Val Thr Pro Ala Pro Gln Pro Asn Val Tyr

Leu Ser Ala Tyr Lys Gly Gly Gly Ser Arg Val Val Val Val Ala Val

Asn Lys Gly Ala Ser Pro Val Ser Gln Gln Phe Thr Leu Asn Asn Asn

Asn Ser Ser Gly Val Ser Ser Trp Val Thr Asp Ala Ser Arg Asn Leu

Ala Ser Gln Gly Arg Ile Thr Val Ala Asn Gly Ala Phe Thr Ala Arg

Leu Pro Ala Gln Ser Val Thr Thr Leu Val Thr Gly

SEQ ID NO: 12 is the amino acid sequence of the mature GH30_8 xylanase
*Clostridium saccharobutylicum*:

Ala Ser Asn Ala Thr Ile Asn Leu Ser Ala Gln Lys Gln Val Ile Arg

Gly Phe Gly Gly Ile Asn Leu Pro Ala Trp Ala Gly Asp Leu Thr Ala

Ala Gln Arg Glu Thr Ala Phe Gly Asn Gly Asp Asn Gln Leu Gly Leu

Ser Val Leu Arg Ile Tyr Val Asp Asp Asn Lys Asn Asn Trp Tyr Lys

Glu Leu Ala Thr Ala Lys Lys Ala Ile Glu His Gly Ala Ile Val Phe

Ala Thr Pro Trp Asn Pro Pro Ala Tyr Met Thr Glu Lys Phe Asn Arg

Asn Gly Asp Thr Asn Ala Lys Arg Leu Arg Tyr Asp Lys Tyr Ala Ala

Tyr Ala Gln His Leu Asn Asp Phe Val Ser Tyr Met Lys Asn Asn Gly

Val Asn Leu Tyr Ala Ile Ser Val Gln Asn Glu Pro Asp Tyr Gly Lys

Glu Trp Thr Trp Trp Thr Pro Gln Glu Ile Leu Arg Phe Ile Lys Glu

Asn Ala Gly Ser Ile Asn Cys Arg Val Met Ser Pro Glu Ser Phe Ser

Tyr Gln Lys Asn Met Tyr Asp Pro Ile Leu Asn Asn Pro Gln Ala Leu

Ala Asn Met Asp Ile Leu Gly Thr His Thr Tyr Gly Thr Arg Val Asn

Asp Phe Ala Tyr Pro Leu Phe Lys Gln Lys Gly Ala Gly Lys Glu Leu

Trp Met Thr Glu Val Tyr Val Pro Asn Ser Asp Thr Asn Ser Ala Asp

Arg Trp Pro Glu Ala Leu Asp Val Ala Asp His Ile Asn Asn Ala Met

Val Glu Gly Asp Phe Gln Ala Tyr Val Trp Trp Tyr Ile Arg Arg Ser

-continued

Tyr Gly Phe Ile Lys Glu Asp Gly Asn Val Ser Lys Arg Gly Tyr Met

Met Ala His Phe Ser Lys Phe Val Arg Pro Gly Tyr Val Arg Val Asp

Ala Thr Lys Asn Pro Thr Pro Asn Val Tyr Leu Ser Ala Tyr Lys Gly

Asn Asn Lys Val Val Ile Ile Ala Ile Asn Lys Gly Thr Ser Asp Val

Lys Gln Ser Phe Thr Met Pro Asn Ser Lys Val Ser Ser Val Ser Ser

Trp Gln Thr Thr Ala Thr Ala Asn Leu Ala Lys Ser Ala Ser Asn Thr

Asn Val Tyr Asn Gly Asn Phe Thr Ala Thr Leu Pro Ala Gln Ser Val

Thr Thr Phe Val Gly Asp Ile Lys

SEQ ID NO: 13 is the amino acid sequence of the mature GH30_8 xylanase *Paenibacillus panacisoli*.

Ala Ser Asp Ala Val Ile Asn Leu Ser Ala Gln Lys Gln Val Ile Arg

Gly Phe Gly Gly Ile Asn His Pro Ala Trp Ile Gly Asp Leu Thr Ala

Ala Gln Arg Glu Thr Ala Phe Gly Asn Gly Gln Asn Gln Leu Gly Phe

Ser Ile Leu Arg Val Tyr Ile Asp Pro Asp Arg Asn Asn Trp Ser Arg

Glu Val Ala Thr Ala Lys Lys Ala Ile Glu Lys Gly Ala Leu Val Phe

Ala Ser Pro Trp Asn Pro Pro Ser Ser Met Val Glu Thr Phe Asn Arg

Asn Gly Asp Arg Asn Ala Lys Arg Leu Arg Tyr Asp Lys Tyr Ala Ala

Tyr Ala Gln His Leu Asn Asp Phe Val Thr Tyr Met Lys Asn Asn Gly

Val Asn Leu Tyr Ala Ile Ser Val Gln Asn Glu Pro Asp Tyr Ala His

Glu Trp Thr Trp Trp Thr Pro Gln Glu Ile Leu Arg Phe Met Lys Glu

Asn Ala Gly Ser Ile Asn Cys Lys Val Met Ala Pro Glu Ser Phe Gln

Tyr Leu Lys Asn Ile Ser Asp Pro Ile Leu Asn Asp Pro Gln Ala Leu

Ala Asn Met Asp Ile Leu Gly Ala His Leu Tyr Gly Thr Gln Val Ser

Asn Phe Ala Tyr Pro Leu Phe Lys Gln Lys Gly Ala Gly Lys Glu Leu

Trp Met Thr Glu Val Tyr Tyr Pro Asn Ser Asp Asn Asn Ser Ala Asp

Arg Trp Pro Glu Ala Leu Glu Val Ser His His Met His Asn Ala Met

Val Glu Gly Asp Phe Gln Ala Tyr Val Trp Trp Tyr Ile Arg Arg Ser

Tyr Gly Pro Met Lys Glu Asp Gly Thr Ile Ser Lys Arg Gly Tyr Asn

Met Ala His Phe Ser Lys Phe Ile Arg Pro Gly Tyr Val Arg Val Asp

Ala Thr Lys Asn Pro Asp Thr Asn Val His Val Ser Ala Tyr Lys Gly

Asn Asn Lys Val Val Ile Val Ala Ile Asn Arg Gly Thr Thr Ala Val

Asn Gln Asn Phe Val Leu Gln Asn Gly Arg Ala Ala Thr Leu Ser Arg

Trp Ile Thr Asp Ala Asn Arg Asn Leu Ala Pro Glu Ser Asn Leu Asn

Ala Ser Ser Gly Ser Phe Phe Ala His Leu Pro Ala Lys Ser Val Thr

Thr Phe Val Gly Asp Leu Thr Gly Ser Thr Leu Asn Ile Glu Asp Ala

Ala Leu Thr Asn Ser Val Thr Gln Asp Thr Tyr Ser Lys

SEQ ID NO: 14 is the amino acid sequence of the mature GH30_8 xylanase Human Stool metagenome Ala Gln Ala Ala Ser Asp Ala Val Ile Asn Leu Asn Asn Thr His Gln Glu Ile Met Gly Phe Gly Gly Met Asn His Pro Thr Trp Ala Gly Asp Leu Thr Ser Ser Gln Arg Glu Thr Ala Phe Gly Asn Gly Thr Asn Gln Leu Gly Phe Gln Val Leu Arg Ile Trp Val Asp Ser Asp Arg Asn Asn Trp Tyr Lys Glu Leu Ala Thr Ala Lys Ala Ala Leu Ala Lys Gly Ala -continued Ile Val Phe Ala Thr Pro Trp Asn Pro Pro Ser Asn Leu Cys Glu Thr Phe Tyr Lys Asn Gly Ser Ala Asn Ala Lys Arg Leu Lys His Asp Lys Tyr Ala Ala Tyr Ala Gln His Leu Asn Asp Phe Val Thr Tyr Met Arg Asn Asn Gly Val Glu Leu Tyr Gly Ile Ser Val Cys Asn Glu Pro Asp Tyr Gly His Asp Trp Thr Trp Trp Thr Glu Ser Glu Val Val Thr Phe Leu Lys Tyr Tyr Ala Gly Ser Ile Asn Cys Arg Ile Ile Ala Pro Glu Ser Phe Ser Tyr Gln Lys Ser Tyr Tyr Asp Ala Ile Ile Asn Asp Ser Gln Ala Leu Ala Gln Val Asp Ile Ile Gly Thr His Leu Tyr Gly Thr Ser Tyr Asn Asn Phe Ser Tyr Pro Leu Tyr His Gln Lys Ala Ser Ser Lys Gln Leu Trp Met Thr Glu Val Tyr Thr Pro Asn Ser Thr Ser Ser Ala Asp Lys Trp Pro Glu Ala Ile Asn Val Ala Glu His Ile His Lys Ala Met Val Asn Asp Phe Gln Thr Tyr Val Trp Trp Tyr Ile Arg Arg Ser Tyr Gly Pro Met Lys Glu Asp Gly Thr Leu Ser Lys Arg Gly Tyr Cys Met Ala Gln Phe Ser Lys Phe Ile Arg Arg Gly Tyr Lys Arg Val Asp Ala Thr Glu Asn Pro Asn Asn Gly Val Tyr Val Ser Ala Tyr Thr Gly Asp Gly Lys Ala Val Ile Val Ala Val Asn Ser Gly Ser Ser Asp Cys Ser Gln Ser Phe Thr Ile Lys Gly Lys Thr Leu Lys Asn Val Asp Arg Tyr Arg Thr Ser Gly Ser Glu Asn Leu Ala Lys Thr Ser Asn Leu Glu Leu Ser Gly Asn Gly Phe Trp Ala Tyr Leu Pro Ala Asn Ser Val Ser Thr Phe Val Cys Thr Val Glu Asn Ser Ser Ser Asn Pro SEQ ID NO: 15 is the amino acid sequence of the mature GH30_8 xylanase *Vibrio rhizosphaerae*:

Gly Ser Val Tyr Ile Asn Phe Asn Thr Glu Tyr Gln Glu Ile Asp Gly

Phe Gly Ala Met Asn Ala Pro Gly Trp Val Asn Asp Leu Thr Ser Ala

Gln Ala Thr Lys Ala Phe Gly Asn Gly Asp Gly Gln Met Gly Leu Ser

Ile Met Arg Met Arg Ile Asp Pro Asp Ser Asn Gln Trp Tyr Arg Gln

Val Pro Thr Ala Gln Ile Ala Tyr Ser Tyr Gly Ala Lys Leu Leu Ala

Thr Pro Trp Ser Pro Pro Ala Tyr Met Lys Thr Asn Asn Asn Val Asn

Asn Gly Gly Lys Leu Lys Lys Glu His Tyr Trp Gly Tyr Thr Asp His

Leu Met Asp Phe Thr Asn Tyr Met Ala Gly Lys Asn Ala Pro Ile Tyr

Ala Leu Ser Ile Gln Asn Glu Pro Asp Trp His Pro Asn Tyr Glu Ser

Cys Asp Trp Ser Gly Ala Asp Phe Val Asn Tyr Leu Asn Asp Gln Gly

Trp Arg Leu Asp Ser Ser Leu Lys Ile Leu Ala Pro Glu Ser Leu Gly

Phe Asn Pro Ala Leu Ser Asp Pro Ile Leu Lys Asp Ser Val Ala Ser

Ser His Ile Asp Ile Ile Gly Gly His Leu Tyr Gly Val Gln Pro Arg

Asn Tyr Pro Leu Ala Leu Gln Lys Gly Lys Lys Leu Trp Met Thr Glu

His Tyr Thr Asp Thr Asp Asn Ala Asn Ile Trp Asp Lys Ala Met Asn

Val Gly Leu Glu Leu His Gln Ser Met Val Ser Asn Tyr Ser Ala Tyr

Ile Trp Trp Tyr Leu Arg Arg Ser Tyr Gly Met Leu Thr Glu Asp Gly

Asn Ile Ser Lys Arg Gly Tyr Ile Met Ser Gln Phe Ser Lys Phe Ile

Arg Pro Gly Asp Val Arg Ile Ala Ala Thr Glu Val Pro Glu Ser Asn

-continued

Val Tyr Val Thr Ala Tyr Lys Asn Arg Ser Gly Lys Leu Val Ile Ala

Val Val Asn Lys Thr Asn Ser His Lys Lys Leu Asp Phe Thr Leu Gln

Asn Gly Thr Val Gly Ser Met Thr Lys Tyr Val Thr Ser Ala Ser Gln

Asn Val Gly Tyr Ala Gly Lys Tyr Ala Val Ser Asn Asn Arg Phe Thr

Ala Tyr Ala Asp Pro Leu Ser Val Gln Thr Phe Val Ser Glu

SEQ ID NO 16 refers to the xylanase Xyl5 (as defined in US 2019 0106689 by SEQ ID NO: 1) and variants thereof. Xyl5 is the amino acid sequence of a mature GH30 xylanase from *Bacillus subtilis*

Ala Ala Ser Asp Val Thr Val Asn Val Ser Ala Glu Lys Gln Val Ile

Arg Gly Phe Gly Gly Met Asn His Pro Ala Trp Ala Gly Asp Leu Thr

Ala Ala Gln Arg Glu Thr Ala Phe Gly Asn Gly Gln Asn Gln Leu Gly

Phe Ser Ile Leu Arg Ile His Val Asp Glu Asn Arg Asn Asn Trp Tyr

Lys Glu Val Glu Thr Ala Lys Ser Ala Val Lys His Gly Ala Ile Val

Phe Ala Ser Pro Trp Asn Pro Pro Ser Asp Met Val Glu Thr Phe Asn

Arg Asn Gly Asp Thr Ser Ala Lys Arg Leu Lys Tyr Asn Lys Tyr Ala

Ala Tyr Ala Gln His Leu Asn Asp Phe Val Thr Phe Met Lys Asn Asn

Gly Val Asn Leu Tyr Ala Ile Ser Val Gln Asn Glu Pro Asp Tyr Ala

His Glu Trp Thr Trp Trp Thr Pro Gln Glu Ile Leu Arg Phe Met Arg

Glu Asn Ala Gly Ser Ile Asn Ala Arg Val Ile Ala Pro Glu Ser Phe

Gln Tyr Leu Lys Asn Leu Ser Asp Pro Ile Leu Asn Asp Pro Gln Ala

Leu Ala Asn Met Asp Ile Leu Gly Thr His Leu Tyr Gly Thr Gln Val

Ser Gln Phe Pro Tyr Pro Leu Phe Lys Gln Lys Gly Ala Gly Lys Asp

Leu Trp Met Thr Glu Val Tyr Tyr Pro Asn Ser Asp Thr Asn Ser Ala

Asp Arg Trp Pro Glu Ala Leu Asp Val Ser Gln His Ile His Asn Ala

Met Val Glu Gly Asp Phe Gln Ala Tyr Val Trp Trp Tyr Ile Arg Arg

Ser Tyr Gly Pro Met Lys Glu Asp Gly Thr Ile Ser Lys Arg Gly Tyr

Asn Met Ala His Phe Ser Lys Phe Val Arg Pro Gly Tyr Val Arg Ile

Asp Ala Thr Lys Asn Pro Asn Ala Asn Val Tyr Val Ser Ala Tyr Lys

Gly Asp Asn Lys Val Val Ile Val Ala Ile Asn Lys Ser Asn Thr Gly

Val Asn Gln Asn Phe Val Leu Gln Asn Gly Ser Ala Ser Asn Val Ser

Arg Trp Ile Thr Ser Ser Ser Ser Asn Leu Gln Pro Gly Thr Asn Leu

Thr Val Ser Gly Asn His Phe Trp Ala His Leu Pro Ala Gln Ser Val

Thr Thr Phe Val Val Asn Arg

Use of at Least One Carbohydrase in Combination with an Animal Feed

The present invention is also directed to uses of at least one carbohydrase in combination with an animal feed with an A/X ratio greater than 0.70, preferably greater than 0.705, preferably greater than 0.71, preferably greater than 0.715, preferably greater than 0.72, preferably greater than 0.725, preferably greater than 0.73, preferably greater than 0.735, preferably greater than 0.74, preferably greater than 0.745, preferably greater than 0.75, preferably greater than 0.76, preferably greater than 0.77, preferably greater than 0.78, preferably greater than 0.79, preferably greater than 0.80.

The present invention is also directed to uses of at least one carbohydrase in combination with an animal feed with an A/X ratio lower than 1.5, preferably lower than 1.4, preferably lower than 1.3, preferably lower than 1.2, preferably lower than 1.15, preferably lower than 1.1, preferably lower than 1.05, preferably lower than 1, preferably lower than 0.95, preferably lower than 0.9, preferably lower than 0.85, preferably lower than 0.84, preferably lower than 0.83, preferably lower than 0.83, preferably lower than 0.82, preferably lower than 0.81.

The present invention is also directed to uses of at least one carbohydrase in combination with an animal feed with an A/X total feed ratio greater than 0.91, preferably greater than 0.95, preferably greater than 1.00, preferably greater than 1.05, preferably greater than 1.10, preferably greater than 1.15, preferably greater than 1.20, preferably greater than 1.25, preferably greater than 1.30.

The present invention further relates to the use of at least one carbohydrase in combination with an animal feed with an A/X ratio greater than 0.70, preferably greater than 0.705, preferably greater than 0.71, preferably greater than 0.715, preferably greater than 0.72, preferably greater than 0.725, preferably greater than 0.73, preferably greater than 0.735, preferably greater than 0.74, preferably greater than 0.745, preferably greater than 0.75, preferably greater than 0.76, preferably greater than 0.77, preferably greater than 0.78, preferably greater than 0.79, preferably greater than 0.80 for increasing digestibility of said animal feed.

The present invention further relates to the use of at least one carbohydrase in combination with an animal feed with an A/X ratio lower than 1.5, preferably lower than 1.4, preferably lower than 1.3, preferably lower than 1.2, preferably lower than 1.15, preferably lower than 1.1, preferably lower than 1.05, preferably lower than 1, preferably lower than 0.95, preferably lower than 0.9, preferably lower than 0.85, preferably lower than 0.84, preferably lower than 0.83, preferably lower than 0.83, preferably lower than 0.82, preferably lower than 0.81 for increasing digestibility of said animal feed.

The present invention further relates to the use of at least one carbohydrase in combination with an animal feed with an A/X total feed ratio greater than 0.91, preferably greater than 0.95, preferably greater than 1.00, preferably greater than 1.05, preferably greater than 1.10, preferably greater than 1.15, preferably greater than 1.20, preferably greater than 1.25, preferably greater than 1.30.

In the present invention, the digestibility may be improved by at least 1%, such as by at least 1.5%, at least 2.0%, at least 2.5%, at least 3%, at least 3.5%, at least 4% or at least 5%.

The present invention further relates to the use of at least one carbohydrase in combination with an animal feed with an A/X ratio greater than 0.70, preferably greater than 0.705, preferably greater than 0.71, preferably greater than 0.715, preferably greater than 0.72, preferably greater than 0.725, preferably greater than 0.73, preferably greater than 0.735, preferably greater than 0.74, preferably greater than 0.745, preferably greater than 0.75, preferably greater than 0.76, preferably greater than 0.77, preferably greater than 0.78, preferably greater than 0.79, preferably greater than 0.80 for improving the nutritional value of said animal feed.

The present invention further relates to the use of at least one carbohydrase in combination with an animal feed with an A/X ratio lower than 1.5, preferably lower than 1.4, preferably lower than 1.3, preferably lower than 1.2, preferably lower than 1.15, preferably lower than 1.1, preferably lower than 1.05, preferably lower than 1, preferably lower than 0.95, preferably lower than 0.9, preferably lower than 0.85, preferably lower than 0.84, preferably lower than 0.83, preferably lower than 0.83, preferably lower than 0.82, preferably lower than 0.81 for improving the nutritional value of said animal feed.

The present invention further relates to the use of at least one carbohydrase in combination with an animal feed with an A/X total feed ratio greater than 0.91, preferably greater than 0.95, preferably greater than 1.00, preferably greater than 1.05, preferably greater than 1.10, preferably greater than 1.15, preferably greater than 1.20, preferably greater than 1.25, preferably greater than 1.30.

In the present invention, the nutritional value of the feed may be improved by at least 1%, such as by at least 1.5%, at least 2.0%, at least 2.5%, at least 3%, at least 3.5%, at least 4% or at least 5%.

The present invention further relates to the use of at least one carbohydrase in combination with an animal feed with an A/X ratio greater than 0.70, preferably greater than 0.705, preferably greater than 0.71, preferably greater than 0.715, preferably greater than 0.72, preferably greater than 0.725, preferably greater than 0.73, preferably greater than 0.735, preferably greater than 0.74, preferably greater than 0.745, preferably greater than 0.75, preferably greater than 0.76, preferably greater than 0.77, preferably greater than 0.78, preferably greater than 0.79, preferably greater than 0.80 for improving one or more performance parameters in an animal.

The present invention further relates to the use of at least one carbohydrase in combination with an animal feed with an A/X ratio lower than 1.5, preferably lower than 1.4, preferably lower than 1.3, preferably lower than 1.2, preferably lower than 1.15, preferably lower than 1.1, preferably lower than 1.05, preferably lower than 1, preferably lower than 0.95, preferably lower than 0.9, preferably lower than 0.85, preferably lower than 0.84, preferably lower than 0.83, preferably lower than 0.83, preferably lower than 0.82, preferably lower than 0.81 for improving one or more performance parameters in an animal.

The present invention further relates to the use of at least one carbohydrase in combination with an animal feed with an A/X total feed ratio greater than 0.91, preferably greater than 0.95, preferably greater than 1.00, preferably greater than 1.05, preferably greater than 1.10, preferably greater than 1.15, preferably greater than 1.20, preferably greater than 1.25, preferably greater than 1.30.

In the present invention, the one or more performance parameters may be improved by at least 1%, such as by at least 1.5%, at least 2.0%, at least 2.5%, at least 3%, at least 3.5%, at least 4% or at least 5%.

In an embodiment, the improvement in the performance of an animal is an increase in body weight gain. In another embodiment, the improvement is an improved feed conversion ratio. In a further embodiment, the improvement is an increased feed efficiency. In a further embodiment, the improvement is an increase in body weight gain and/or an improved feed conversion ratio and/or an increased feed efficiency.

In the present invention, the improvements are compared to the same feed but excluding the carbohydrase or excluding adjusting the amount of carbohydrase to the A/X fiber fraction of the feed.

The term improving the nutritional value of an animal feed means improving the digestibility and availability of nutrients in the feed. The nutritional values refer in particular to improving the solubilization and degradation of the arabinoxylan-containing fraction (e.g., such as hemicellulose) of the feed, thereby leading to increased release of nutrients from cells in the endosperm that have cell walls composed of highly recalcitrant hemicellulose. Consequently, an increased release of arabinoxylan oligomers indicates a disruption of the cell walls and as a result the nutritional value of the feed is improved resulting in improved animal performance, such as increased growth rate and/or weight gain and/or feed conversion (i.e., the weight of ingested feed relative to weight gain). In addition, the arabinoxylan oligomer release may result in improved utilization of these components per se either directly or by bacterial fermentation in the hind gut thereby resulting in a production of short chain fatty acids that may be readily absorbed in the hind and utilised in the energy metabolism.

Animal Feed

In one aspect, the present invention relates to an animal feed with a defined A/X fiber fraction and comprising at least one carbohydrase as defined above.

Preferably, the A/X fiber fraction in the feed is in a range from 0.61 to 0.97.

More preferably, the A/X fiber fraction in the feed is greater than 0.70, preferably greater than 0.705, preferably greater than 0.71, preferably greater than 0.715, preferably greater than 0.72, preferably greater than 0.725, preferably greater than 0.73, preferably greater than 0.735, preferably greater than 0.74, preferably greater than 0.745, preferably greater than 0.75, preferably greater than 0.76, preferably greater than 0.77, preferably greater than 0.78, preferably greater than 0.79, preferably greater than 0.80.

More preferably, the A/X fiber fraction in the feed is lower than 1.5, preferably lower than 1.4, preferably lower than 1.3, preferably lower than 1.2, preferably lower than 1.15, preferably lower than 1.1, preferably lower than 1.05, preferably lower than 1, preferably lower than 0.95, preferably lower than 0.9, preferably lower than 0.85, preferably lower than 0.84, preferably lower than 0.83, preferably lower than 0.83, preferably lower than 0.82, preferably lower than 0.81.

Preferably, the A/X total feed fiber fraction in the feed is in a range from 0.91 to 1.42.

More preferably, the A/X total feed ratio greater than 0.91, preferably greater than 0.95, preferably greater than 1.00, preferably greater than 1.05, preferably greater than 1.10, preferably greater than 1.15, preferably greater than 1.20, preferably greater than 1.25, preferably greater than 1.30.

The polypeptide having carbohydrase activity may be dosed between 0.1 to 150 ppm enzyme protein per kg animal feed, such as 0.5 to 100 ppm, 1 to 75 ppm, 2 to 50 ppm, 3 to 25 ppm, 2 to 80 ppm, 5 to 60 ppm, 8 to 40 ppm, 10 to 30 ppm, 13 to 75 ppm, to 50 ppm, 17.5 to 40 ppm, 25 to 75 ppm or 30 to 60 ppm enzyme protein per kg animal feed, or any combination of these intervals.

The final total carbohydrase concentration in the feed is within the range of 50-500 mg per kg animal feed, such as 60 to 450 mg, 70 to 400 mg, 80 to 350 mg, 90 to 300 mg, 100 to 300 mg, 110 to 250 mg, 120 to 200 mg per kg animal feed, or any combination of these intervals.

The final total carbohydrase concentration in the feed is within the range of 0.00001% to 0.1%, preferably 0.0001% to 0.1%, preferably 0.001% to 0.1%, preferably 0.01% to 0.1%, preferably 0.01 to 0.05%.

Animal feed compositions or diets have a relatively high content of protein. Poultry and pig diets can be characterised as indicated in Table B of WO 01/58275, columns 2-3. Fish diets can be characterised as indicated in column 4 of this Table B. Furthermore such fish diets usually have a crude fat content of 200-310 g/kg.

An animal feed composition according to the invention has a crude protein content of 50-800 g/kg. The protein source may be vegetable protein source and/or animal protein.

The vegetable proteins may be derived from vegetable protein sources, such as legumes and cereals, for example, materials from plants of the families Fabaceae (Leguminosae), Cruciferaceae, Chenopodiaceae, and Poaceae, such as soybean meal, lupin meal, rapeseed meal, and combinations thereof. The protein content of the vegetable proteins is at least 10, 20, 30, 40, 50, 60, 70, 80, or 90% (w/w).

Preferably, the vegetable protein source may be material from one or more plants of the family Fabaceae, e.g., soybean, lupine, pea, or bean. The vegetable protein source may also be material from one or more plants of the family Chenopodiaceae, e.g. beet, sugar beet, spinach or *quinoa*. Other examples of vegetable protein sources are rapeseed, and cabbage. In the present invention, soybean is a preferred vegetable protein source. Other examples of vegetable protein sources are cereals such as barley, wheat, rye, oat, maize (corn), rice, and sorghum.

Besides the vegetable protein as defined above, the animal feed of the invention may also contain animal protein, such as Meat and Bone Meal, Feather meal, and/or Fish Meal, typically in an amount of 0-25%. The animal feed of the invention may also comprise Dried Distillers Grains with Solubles (DDGS), typically in amounts of 0-30%.

Preferably, the protein source is selected from the group consisting of soybean, wild soybean, beans, lupin, tepary bean, scarlet runner bean, slimjim bean, lima bean, French bean, Broad bean (fava bean), chickpea, lentil, peanut, Spanish peanut, canola, sunflower seed, cotton seed, rapeseed (oilseed rape) or pea or in a processed form such as soybean meal, full fat soy bean meal, soy protein concentrate (SPC), fermented soybean meal (FSBM), sunflower meal, cotton seed meal, rapeseed meal, fish meal, bone meal, feather meal, whey or any combination thereof.

Furthermore, or in the alternative (to the crude protein content indicated above), the animal feed composition of the invention may have a content of metabolisable energy of 10-30 MJ/kg. In present invention, the energy source may be selected from the group consisting of maize, corn, sorghum, barley, wheat, oats, rice, triticale, rye, beet, sugar beet, spinach, potato, cassava, *quinoa*, cabbage, switchgrass, millet, pearl millet, foxtail millet or in a processed form such as milled corn, milled maize, potato starch, cassava starch, milled sorghum, milled switchgrass, milled millet, milled foxtail millet, milled pearl millet, or any combination thereof.

Furthermore, or in the alternative (to the crude protein content indicated above), the animal feed composition of the invention may have a content of calcium of 0.1-200 g/kg; and/or a content of available phosphorus of 0.1-200 g/kg; and/or a content of methionine of 0.1-100 g/kg; and/or a content of methionine plus cysteine of 0.1-150 g/kg; and/or a content of lysine of 0.5-50 g/kg.

In particular, the content of metabolisable energy, crude protein, calcium, phosphorus, methionine, methionine plus cysteine, and/or lysine may be within any one of ranges 2, 3, 4 or 5 in Table B of WO 01/58275 (R. 2-5).

Crude protein is calculated as nitrogen (N) multiplied by a factor 6.25, i.e. Crude protein (g/kg)=N (g/kg)×6.25. The nitrogen content is determined by the Kjeldahl method (A.O.A.C., 1984, Official Methods of Analysis 14th ed., Association of Official Analytical Chemists, Washington DC).

Metabolisable energy can be calculated on the basis of the NRC publication Nutrient requirements in swine, ninth revised edition 1988, subcommittee on swine nutrition, committee on animal nutrition, board of agriculture, national research council. National Academy Press, Washington, D.C., pp. 2-6, and the European Table of Energy Values for Poultry Feed-stuffs, Spelderholt centre for poultry research and extension, 7361 DA Beekbergen, The Netherlands. Grafisch bedrijf Ponsen & looijen bv, Wageningen. ISBN 90-71463-12-5.

The dietary content of calcium, available phosphorus and amino acids in complete animal diets is calculated on the basis of feed tables such as Veevoedertabel 1997, gegevens over chemische samenstelling, verteerbaarheid en voederwaarde van voedermiddelen, Central Veevoederbureau, Runderweg 6, 8219 pk Lelystad. ISBN 90-72839-13-7.

Preferably, the animal feed of the invention contains 0-80% maize; and/or 0-80% sorghum; and/or 0-70% wheat; and/or 0-70% Barley; and/or 0-30% oats; and/or 0-40% soybean meal; and/or 0-25% fish meal; and/or 0-25% meat and bone meal; and/or 0-20% whey.

Animal feed can e.g. be manufactured as mash feed (non-pelleted) or pelleted feed. Typically, the milled feed-stuffs are mixed and sufficient amounts of essential vitamins and minerals are added according to the specifications for the species in question. Enzymes can be added as solid or liquid enzyme formulations. For example, for mash feed a solid or liquid enzyme formulation may be added before or during the ingredient mixing step. For pelleted feed the (liquid or solid) carbohydrase/enzyme preparation may also be added before or during the feed ingredient step. Typically a liquid enzyme preparation comprises the carbohydrase of the invention optionally with a polyol, such as glycerol, ethylene glycol or propylene glycol, and is added after the pelleting step, such as by spraying the liquid formulation onto the pellets. The carbohydrase may also be incorporated in a feed additive or premix that can then be added to the final feed.

Alternatively, the carbohydrase can be prepared by freezing a mixture of liquid enzyme solution with a bulking agent such as ground soybean meal, and then lyophilizing the mixture.

In present invention, the animal feed may further comprise one or more additional enzymes; one or more eubiotics; one or more vitamins; one or more minerals, and one or more amino acids, as described below.

The animal feed of the present invention may be produced by any known process. For example, the animal feed of the present invention is prepared by a process comprising the steps of:

(a) mixing an animal feed additive with one or more protein sources and one or more energy sources;
(b) optionally steam treating the animal feed of (a) followed by pressing the steam treated mixture to form pellets; and
(c) optionally spraying a liquid formulation onto the animal feed of (a) or (b).

In one embodiment, the at least one carbohydrase is added in step (a). In one embodiment, the carbohydrase is added in step (c).

In the present process, the animal feed may be pelleted by steam treating the mixture of (a) to obtain a moisture content below 20% by weight of the mixture, and pressing the steam treated mixture to form pellets. Preferably, the animal feed is pelleted by steam treating the mixture of (a) to obtain a moisture content below 20% by weight of the mixture wherein the steam treatment is between 60° C. and 100° C. when measured at the outlet of the conditioner, and pressing the steam treated mixture to form pellets. In the present process, the total residence time in step b) may be between 1 second and 10 minutes. In the present process, the temperature of the pellets after pelleting of the steam treated mixture may be between 70° C. and 105° C.

Additional Enzymes

In the present invention, the compositions and/or the animal feed described herein may optionally include one or more enzymes. Enzymes can be classified on the basis of the handbook Enzyme Nomenclature from NC-IUBMB, 1992), see also the ENZYME site at the internet: http [colon]//www [dot] expasy [dot] ch/enzyme/. ENZYME is a repository of information relative to the nomenclature of enzymes. It is primarily based on the recommendations of the Nomenclature Committee of the International Union of Biochemistry and Molecular Biology (IUB-MB), Academic Press, Inc., 1992, and it describes each type of characterized enzyme for which an EC (Enzyme Commission) number has been provided (Bairoch A. The ENZYME database, 2000, Nucleic Acids Res 28:304-305). This IUB-MB Enzyme nomenclature is based on their substrate specificity and occasionally on their molecular mechanism; such a classification does not reflect the structural features of these enzymes.

Another classification of certain glycoside hydrolase enzymes, such as endoglucanase, galactanase, mannanase, dextranase, and galactosidase is described in Henrissat et al, "The carbohydrate-active enzymes database (CAZy) in 2013", *Nucl. Acids Res.* (1 Jan. 2014) 42 (D1): D490-D495; see also www [dot] cazy [dot]org.

Thus the composition, the animal feed or the animal feed additive of the present invention may also comprise at least one other enzyme selected from the group comprising of acetylxylan esterase (EC 3.1.1.23), acylglycerol lipase (EC 3.1.1.72), alpha-amylase (EC 3.2.1.1), beta-amylase (EC 3.2.1.2), arabinofuranosidase (EC 3.2.1.55), cellobiohydrolases (EC 3.2.1.91), cellulase (EC 3.2.1.4), feruloyl esterase (EC 3.1.1.73), galactanase (EC 3.2.1.89), alpha-galactosidase (EC 3.2.1.22), beta-galactosidase (EC 3.2.1.23), beta-glucanase (EC 3.2.1.6), beta-glucosidase (EC 3.2.1.21), triacylglycerol lipase (EC 3.1.1.3), lysophospholipase (EC 3.1.1.5), lysozyme (EC 3.2.1.17), alpha-mannosidase (EC 3.2.1.24), beta-mannosidase (mannanase) (EC 3.2.1.25), phytase (EC 3.1.3.8, EC 3.1.3.26, EC 3.1.3.72), phospholipase A1 (EC 3.1.1.32), phospholipase A2 (EC 3.1.1.4), phospholipase D (EC 3.1.4.4), protease (EC 3.4), pullulanase (EC 3.2.1.41), pectinesterase (EC 3.1.1.11), xylanase (EC 3.2.1.8, EC 3.2.1.136), beta-xylosidase (EC 3.2.1.37), or any combination thereof.

The composition, the animal feed or the animal feed additive of the invention may also comprise a galactanase (EC 3.2.1.89) and a beta-galactosidase (EC 3.2.1.23).

The composition, the animal feed or the animal feed additive of the present invention may also comprise a phytase (EC 3.1.3.8 or 3.1.3.26). Examples of commercially available phytases include Bio-Feed™ Phytase (Novozymes), Ronozyme® P, Ronozyme® NP and Ronozyme® HiPhos (DSM Nutritional Products), Natuphos™ (BASF), Natuphos™ E (BASF), Finase® and Quantum® Blue (AB Enzymes), OptiPhos® (Huvepharma), AveMix® Phytase (Aveve Biochem), Phyzyme® XP (Verenium/DuPont) and Axtra® PHY (DuPont). Other preferred phytases include those described in e.g. WO 98/28408, WO 00/43503, and WO 03/066847.

The composition, the animal feed or the animal feed additive of the present invention may also comprise a xylanase (EC 3.2.1.8). Examples of commercially available xylanases include Ronozyme® WX (DSM Nutritional Products), Econase® XT and Barley (AB Vista), Xylathin® (Verenium), Hostazym® X (Huvepharma), Axtra® XB (Xylanase/beta-glucanase, DuPont) and Axtra® XAP (Xylanase/amylase/protease, DuPont), AveMix® XG 10 (xylanase/glucanase) and AveMix® 02 CS (xylanase/glucanase/pectinase, Aveve Biochem), and Naturgrain (BASF).

The composition, the animal feed or the animal feed additive of the invention may also comprise a protease (EC 3.4). Examples of commercially available proteases include Ronozyme® ProAct (DSM Nutritional Products), Winzyme Pro Plus® (Suntaq International Limited) and Cibenza® DP100 (Novus International).

The composition, the animal feed or the animal feed additive of the invention may also comprise an alpha-amylase (EC 3.2.1.1). Examples of commercially available alpha-amylases include Ronozyme® A and RONOZYMER RumiStar™ (DSM Nutritional Products).

The composition, the animal feed or the animal feed additive of the invention may also comprise a multicomponent enzyme product, such as FRA® Octazyme (Framelco), Ronozyme® G2, Ronozyme® VP and Ronozyme® Multi-Grain (DSM Nutritional Products), Rovabio® Excel or Rovabio® Advance (Adisseo).

Eubiotics

The composition, the animal feed or the animal feed additive of the invention may additionally comprise eubiotics. Eubiotics are compounds which are designed to give a healthy balance of the micro-flora in the gastrointestinal tract. Eubiotics cover a number of different feed additives, such as probiotics, prebiotics, phytogenics (essential oils) and organic acids which are described in more detail below.

Probiotics

In the present invention, the composition, the animal feed or the animal feed additive may further comprise one or more additional probiotic. In particular, the animal feed composition may further comprise a bacterium from one or more of the following genera: *Lactobacillus, Lactococcus, Streptococcus, Bacillus, Pediococcus, Enterococcus, Leuconostoc, Carnobacterium, Propionibacterium, Bifidobacterium, Clostridium* and Megasphaera or any combination thereof.

Preferably, the composition, the animal feed or the animal feed additive further comprises a bacterium from one or more of the following strains: *Bacillus subtilis, Bacillus licheniformis, Bacillus amyloliquefaciens, Bacillus cereus, Bacillus pumilus, Bacillus polymyxa, Bacillus megaterium, Bacillus coagulans, Bacillus circulans, Enterococcus faecium, Enterococcus* spp, and *Pediococcus* spp, *Lactobacillus* spp, *Bifidobacterium* spp, *Lactobacillus acidophilus, Pediococsus acidilactici, Lactococcus lactis, Bifidobacterium bifidum, Propionibacterium thoenii, Lactobacillus farciminus, Lactobacillus rhamnosus, Clostridium butyricum, Bifidobacterium animalis* ssp. *animalis, Lactobacillus reuteri, Lactobacillus salivarius* ssp. *salivarius, Megasphaera elsdenii, Propionibacteria* sp.

More preferably, the composition or the animal feed of the present invention further comprises a bacterium from one or more of the following strains of *Bacillus subtilis:* 3A-P4 (PTA-6506), 15A-P4 (PTA-6507), 22C-P1 (PTA-6508), 2084 (NRRL B-500130), LSSA01 (NRRL-B-50104), BS27 (NRRL B-501 05), BS 18 (NRRL B-50633), BS 278 (NRRL B-50634), DSM 29870, DSM 29871, DSM 32315, NRRL B-50136, NRRL B-50605, NRRL B-50606, NRRL B-50622 and PTA-7547.

More preferably, the composition or the animal feed of the present invention further comprises a bacterium from one or more of the following strains of *Bacillus pumilus*: NRRL B-50016, ATCC 700385, NRRL B-50885 or NRRL B-50886.

More preferably, the composition or the animal feed of the present invention further comprises a bacterium from one or more of the following strains of *Bacillus* lichenformis: NRRL B 50015, NRRL B-50621 or NRRL B-50623.

More preferably, the composition or the animal feed of the present invention further comprises a bacterium from one or more of the following strains of *Bacillus amyloliquefaciens*: DSM 29869, DSM 29869, NRRL B 50607, PTA-7543, PTA-7549, NRRL B-50349, NRRL B-50606, NRRL B-50013, NRRL B-50151, NRRL B-50141, NRRL B-50147 or NRRL B-50888.

The bacterial count of each of the bacterial strains in the composition, the animal feed or the animal feed additive is between $1\times10^4$ and $1\times10^{14}$ CFU/kg of dry matter, preferably between $1\times10^6$ and $1\times10^{12}$ CFU/kg of dry matter, and more preferably between $1\times10^7$ and $1\times10^{11}$ CFU/kg of dry matter. Preferably, the bacterial count of each of the bacterial strains in the composition, the animal feed or the animal feed additive is between $1\times10^8$ and $1\times10^{10}$ CFU/kg of dry matter.

The bacterial count of each of the bacterial strains in the composition, the animal feed or the animal feed additive is between $1\times10^5$ and $1\times10^{15}$ CFU/animal/day, preferably between $1\times10^7$ and $1\times10^{13}$ CFU/animal/day, and more preferably between $1\times10^8$ and $1\times10^{12}$ CFU/animal/day. Preferably, the bacterial count of each of the bacterial strains in the composition, the animal feed or the animal feed additive is between $1\times10^9$ and $1\times10^{11}$ CFU/animal/day. More preferably, the amount of probiotics is 0.001% to 10% by weight of the composition or the animal feed or animal feed additive.

In the present invention, the one or more bacterial strains may be present in the form of a stable spore.

Examples of commercial products are Cylactin® (DSM Nutritional Products), Alterion (Adisseo), Enviva PRO (DuPont Animal Nutrition), Syncra® (mix enzyme+probiotic, DuPont Animal Nutrition), Ecobiol® and Fecinor® (Norel/Evonik) and GutCare® PY1 (Evonik).

Prebiotics

Prebiotics are substances that induce the growth or activity of microorganisms (e.g., bacteria and fungi) that contribute to the well-being of their host. Prebiotics are typically non-digestible fiber compounds that pass undigested through the upper part of the gastrointestinal tract and stimulate the growth or activity of advantageous bacteria that colonize the large bowel by acting as substrate for them. Normally, prebiotics increase the number or activity of bifidobacteria and lactic acid bacteria in the GI tract.

Yeast derivatives (inactivated whole yeasts or yeast cell walls) can also be considered as prebiotics. They often comprise mannan-oligosaccharides, yeast beta-glucans or protein contents and are normally derived from the cell wall of the yeast, *Saccharomyces cerevisiae.*

In the present invention, the amount of prebiotics may be 0.001% to 10% by weight of the composition. Examples of yeast products are Yang® and Agrimos (Lallemand Animal Nutrition).

Amino Acids

The composition or the animal feed of the invention may further comprise one or more amino acids. Examples of amino acids which are used are lysine, alanine, beta-alanine, threonine, methionine and tryptophan. In the present invention, the amount of amino acid may be 0.001% to 10% by weight of the composition or the animal feed.

Vitamins and Minerals

In the present invention, the composition or the animal feed may include one or more vitamins, such as one or more fat-soluble vitamins and/or one or more water-soluble vitamins. In addition, the composition or the animal feed may optionally include one or more minerals, such as one or more trace minerals and/or one or more macro minerals.

Usually fat- and water-soluble vitamins, as well as trace minerals form part of a so-called premix intended for addition to the feed, whereas macro minerals are usually separately added to the feed.

Non-limiting examples of fat-soluble vitamins include vitamin A, vitamin D3, vitamin E, and vitamin K, e.g., vitamin K3.

Non-limiting examples of water-soluble vitamins include vitamin C, vitamin B12, biotin and choline, vitamin B1, vitamin B2, vitamin B6, niacin, folic acid and panthothenate, e.g., Ca-D-panthothenate.

Non-limiting examples of trace minerals include boron, cobalt, chloride, chromium, copper, fluoride, iodine, iron, manganese, molybdenum, iodine, selenium and zinc.

Non-limiting examples of macro minerals include calcium, magnesium, phosphorus, potassium and sodium.

In the present invention, the amount of vitamins may be 0.001% to 10% by weight of the composition or the animal feed. Preferably, the amount of minerals is 0.001% to 10% by weight of the composition or the animal feed.

The nutritional requirements of these components (exemplified with poultry and piglets/pigs) are listed in Table A of WO 01/58275. Nutritional requirement means that these components should be provided in the diet in the concentrations indicated.

In the alternative, the composition or the animal feed of the invention comprises at least one of the individual components specified in Table A of WO 01/58275. At least one means either of, one or more of, one, or two, or three, or four and so forth up to all thirteen, or up to all fifteen individual components. More specifically, this at least one individual component is included in the additive of the invention in such an amount as to provide an in-feed-concentration within the range indicated in column four, or column five, or column six of Table A.

Preferably, the composition or the animal feed of the invention comprises at least one of the below vitamins, preferably to provide an in-feed-concentration within the ranges specified in the below Table 1 (for piglet diets, and broiler diets, respectively).

TABLE 1

| Typical vitamin recommendations | | |
|---|---|---|
| Vitamin | Piglet diet | Broiler diet |
| Vitamin A | 10,000-15,000 IU/kg feed | 8-12,500 IU/kg feed |
| Vitamin D3 | 1800-2000 IU/kg feed | 3000-5000 IU/kg feed |
| Vitamin E | 60-100 mg/kg feed | 150-240 mg/kg feed |
| Vitamin K3 | 2-4 mg/kg feed | 2-4 mg/kg feed |
| Vitamin B1 | 2-4 mg/kg feed | 2-3 mg/kg feed |
| Vitamin B2 | 6-10 mg/kg feed | 7-9 mg/kg feed |
| Vitamin B6 | 4-8 mg/kg feed | 3-6 mg/kg feed |
| Vitamin B12 | 0.03-0.05 mg/kg feed | 0.015-0.04 mg/kg feed |
| Niacin (Vitamin B3) | 30-50 mg/kg feed | 50-80 mg/kg feed |
| Pantothenic acid | 20-40 mg/kg feed | 10-18 mg/kg feed |
| Folic acid | 1-2 mg/kg feed | 1-2 mg/kg feed |
| Biotin | 0.15-0.4 mg/kg feed | 0.15-0.3 mg/kg feed |
| Choline chloride | 200-400 mg/kg feed | 300-600 mg/kg feed |

Other Feed Ingredients

The composition or the animal feed of the invention may further comprise colouring agents, stabilisers, growth improving additives and aroma compounds/flavourings, polyunsaturated fatty acids (PUFAs); reactive oxygen generating species, antioxidants, anti-microbial peptides, anti-fungal polypeptides and mycotoxin management compounds.

Examples of colouring agents are carotenoids such as beta-carotene, astaxanthin, and lutein.

Examples of aroma compounds/flavourings are creosol, anethol, deca-, undeca- and/or dodeca-lactones, ionones, irone, gingerol, piperidine, propylidene phatalide, butylidene phatalide, capsaicin and tannin.

Examples of antimicrobial peptides (AMP's) are CAP18, Leucocin A, Tritrpticin, Protegrin-1, Thanatin, Defensin, Lactoferrin, Lactoferricin, and Ovispirin such as Novispirin (Robert Lehrer, 2000), Plectasins, and Statins, including the compounds and polypeptides disclosed in WO 03/044049 and WO 03/048148, as well as variants or fragments of the above that retain antimicrobial activity.

Examples of antifungal polypeptides (AFP's) are the *Aspergillus giganteus*, and *Aspergillus niger* peptides, as well as variants and fragments thereof which retain antifungal activity, as disclosed in WO 94/01459 and WO 02/090384.

Examples of polyunsaturated fatty acids are C18, C20 and C22 polyunsaturated fatty acids, such as arachidonic acid, docosohexaenoic acid, eicosapentaenoic acid and gamma-linoleic acid.

Examples of reactive oxygen generating species are chemicals such as perborate, persulphate, or percarbonate; and enzymes such as an oxidase, an oxygenase or a syntethase.

Antioxidants can be used to limit the number of reactive oxygen species which can be generated such that the level of reactive oxygen species is in balance with antioxidants.

Mycotoxins, such as deoxynivalenol, aflatoxin, zearalenone and fumonisin can be found in animal feed and can result in negative animal performance or illness. Compounds which can manage the levels of mycotoxin, such as via deactivation of the mycotoxin or via binding of the mycotoxin, can be added to the feed to ameliorate these negative effects. Examples of mycotoxin management compounds are Vitafix®, Vitafix Ultra (Nuscience), Mycofix®, Mycofix® Secure, FUMzyme®, Biomin® BBSH, Biomin® MTV (Biomin), Mold-Nil®, Toxy-Nil® and Unike® Plus (Nutriad).

Formulation of the Carbohydrase

In the present invention, the polypeptide having carbohydrase activity of the composition may be formulated as a solid formulation;

In the present invention, the polypeptide having carbohydrase activity of the composition may also be formulated as a liquid formulation;

In the present invention, the liquid formulation may further comprise 20%-80% polyol (i.e. total amount of polyol), preferably 25%-75% polyol, more preferably 30%-70% polyol, more preferably 35%-65% polyol or most preferably 40%-60% polyol. Preferably, the liquid formulation comprises 20%-80% polyol, more preferably 25%-75% polyol, more preferably 30%-70% polyol, more preferably 35%-65% polyol or most preferably 40%-60% polyol wherein the polyol is selected from the group consisting of glycerol, sorbitol, propylene glycol (MPG), ethylene glycol, diethylene glycol, triethylene glycol, 1,2-propylene glycol or 1, 3-propylene glycol, dipropylene glycol, polyethylene glycol (PEG) having an average molecular weight below about 600 and polypropylene glycol (PPG) having an average molecular weight below about 600. More preferably, the liquid formulation comprises 20%-80% polyol (i.e. total amount of polyol), more preferably 25%-75% polyol, more preferably 30%-70% polyol, more preferably 35%-65% polyol or most preferably 40%-60% polyol wherein the polyol is selected from the group consisting of glycerol, sorbitol and propylene glycol (MPG).

In the present invention, the liquid formulation may further comprise preservative, preferably selected from the group consisting of sodium sorbate, potassium sorbate, sodium benzoate and potassium benzoate or any combination thereof. Preferably, the liquid formulation comprises 0.02% to 1.5% w/w preservative, more preferably 0.05% to 1.0% w/w preservative or most preferably 0.1% to 0.5% w/w preservative. More preferably, the liquid formulation comprises 0.001% to 2.0% w/w preservative (i.e. total amount of preservative), preferably 0.02% to 1.5% w/w preservative, more preferably 0.05% to 1.0% w/w preservative or most preferably 0.1% to 0.5% w/w preservative wherein the preservative is selected from the group consisting of sodium sorbate, potassium sorbate, sodium benzoate and potassium benzoate or any combination thereof.

In the present invention, the liquid formulation may comprise one or more formulating agents (such as those described herein), preferably a formulating agent selected from the list consisting of glycerol, ethylene glycol, 1,2-propylene glycol or 1, 3-propylene glycol, sodium chloride, sodium benzoate, potassium sorbate, sodium sulfate, potassium sulfate, magnesium sulfate, sodium thiosulfate, calcium carbonate, sodium citrate, dextrin, glucose, sucrose, sorbitol, lactose, starch, PVA, acetate and phosphate, preferably selected from the list consisting of 1, 2-propylene glycol, 1,3-propylene glycol, sodium sulfate, dextrin, cellulose, sodium thiosulfate, kaolin and calcium carbonate.

In the present invention, the solid formulation may be for example as a granule, spray dried powder or agglomerate (e.g. as disclosed in WO2000/70034). The formulating agent may comprise a salt (organic or inorganic zinc, sodium, potassium or calcium salts such as e.g. such as calcium acetate, calcium benzoate, calcium carbonate, calcium chloride, calcium citrate, calcium sorbate, calcium sulfate, potassium acetate, potassium benzoate, potassium carbonate, potassium chloride, potassium citrate, potassium sorbate, potassium sulfate, sodium acetate, sodium benzoate, sodium carbonate, sodium chloride, sodium citrate, sodium sulfate, zinc acetate, zinc benzoate, zinc carbonate, zinc chloride, zinc citrate, zinc sorbate, zinc sulfate), starch or a sugar or sugar derivative (such as e.g. sucrose, dextrin, glucose, lactose, sorbitol).

Preferably, the formulating agents of the solid formulation are selected from the list consisting of sodium chloride, sodium benzoate, potassium sorbate, sodium sulfate, potassium sulfate, magnesium sulfate, sodium thiosulfate, calcium carbonate, sodium citrate, dextrin, glucose, sucrose, sorbitol, lactose, starch and cellulose. Preferably, the formulating agent is selected from one or more of the following compounds: sodium sulfate, dextrin, cellulose, sodium thiosulfate, magnesium sulfate and calcium carbonate.

Preferably, the composition of the present invention is an enzyme granule comprising the enzymes of the invention optionally combined with one or more additional enzymes. The granule is composed of a core, and optionally one or more coatings (outer layers) surrounding the core.

Typically, the granule size, measured as equivalent spherical diameter (volume based average particle size), of the granule is 20-2000 μm, particularly 50-1500 μm, 100-1500 μm or 250-1200 μm.

The core can be prepared by granulating a blend of the ingredients, e.g., by a method comprising granulation techniques such as crystallization, precipitation, pan-coating, fluid bed coating, fluid bed agglomeration, rotary atomization, extrusion, prilling, spheronization, size reduction methods, drum granulation, and/or high shear granulation.

Methods for preparing the core can be found in Handbook of Powder Technology; Particle size enlargement by C. E. Capes; Volume 1; 1980; Elsevier. Preparation methods include known granule formulation technologies, e.g.:

a) spray dried products, wherein a liquid enzyme-containing solution is atomized in a spray drying tower to form small droplets which during their way down the drying tower dry to form an enzyme-containing particulate material;

b) layered products, wherein the enzyme is coated as a layer around a pre-formed inert core particle, wherein an enzyme-containing solution is atomized, typically in a fluid bed apparatus wherein the pre-formed core particles are fluidized, and the enzyme-containing solution adheres to the core particles and dries up to leave a layer of dry enzyme on the surface of the core particle. Particles of a desired size can be obtained this way if a useful core particle of the desired size can be found. This type of product is described in, e.g., WO 97/23606;

c) absorbed core particles, wherein rather than coating the enzyme as a layer around the core, the enzyme is absorbed onto and/or into the surface of the core. Such a process is described in WO 97/39116.

d) extrusion or pelletized products, wherein an enzyme-containing paste is pressed to pellets or under pressure is extruded through a small opening and cut into particles which are subsequently dried. Such particles usually have a considerable size because of the material in which the extrusion opening is made (usually a plate with bore holes) sets a limit on the allowable pressure drop over the extrusion opening. Also, very high extrusion pressures when using a small opening increase heat generation in the enzyme paste, which is harmful to the enzyme;

e) prilled products, wherein an enzyme-containing powder is suspended in molten wax and the suspension is sprayed, e.g., through a rotating disk atomiser, into a cooling chamber where the droplets quickly solidify (Michael S. Showell (editor); Powdered detergents; Surfactant Science Series; 1998; vol. 71; page 140-142; Marcel Dekker). The product obtained is one wherein the enzyme is uniformly distributed throughout an inert material instead of being concentrated on its surface. Also U.S. Pat. Nos. 4,016,040 and 4,713,245 are documents relating to this technique;

f) mixer granulation products, wherein a liquid is added to a dry powder composition of, e.g., conventional granulating components, the enzyme being introduced either via the liquid or the powder or both. The liquid and the powder are mixed and as the moisture of the liquid is absorbed in the dry powder, the components of the dry powder will start to adhere and agglomerate and particles will build up, forming granulates comprising the enzyme. Such a process is described in U.S. Pat. No. 4,106,991 and related documents EP 170360, EP 304332, EP 304331, WO 90/09440 and WO 90/09428. In a particular product of this process wherein various high-shear mixers can be used as granulators, granulates consisting of enzyme as enzyme, fillers and binders etc. are mixed with cellulose fibres to reinforce the particles to give the so-called T-granulate. Reinforced particles, being more robust, release less enzymatic dust.

g) size reduction, wherein the cores are produced by milling or crushing of larger particles, pellets, tablets, briquettes etc. containing the enzyme. The wanted core particle fraction is obtained by sieving the milled or crushed product. Over and undersized particles can be recycled. Size reduction is described in (Martin Rhodes (editor); Principles of Powder Technology; 1990; Chapter 10; John Wiley & Sons);

h) fluid bed granulation, which involves suspending particulates in an air stream and spraying a liquid onto the fluidized particles via nozzles. Particles hit by spray droplets get wetted and become tacky. The tacky particles collide with other particles and adhere to them and form a granule;

i) the cores may be subjected to drying, such as in a fluid bed drier. Other known methods for drying granules in the feed or detergent industry can be used by the skilled person. The drying preferably takes place at a product temperature of from 25 to 90° C.

For some enzymes it is important the cores comprising the enzyme contain a low amount of water before coating. If water sensitive enzymes are coated before excessive water is removed, it will be trapped within the core and it may affect the activity of the enzyme negatively. After drying, the cores preferably contain 0.1-10% w/w water.

The core may include additional materials such as fillers, fibre materials (cellulose or synthetic fibres), stabilizing agents, solubilizing agents, suspension agents, viscosity regulating agents, light spheres, plasticizers, salts, lubricants and fragrances.

The core may include a binder, such as synthetic polymer, wax, fat, or carbohydrate.

The core may include a salt of a multivalent cation, a reducing agent, an antioxidant, a peroxide decomposing catalyst and/or an acidic buffer component, typically as a homogenous blend.

In the present invention, the core may comprise a material selected from the group consisting of salts (such as calcium acetate, calcium benzoate, calcium carbonate, calcium chloride, calcium citrate, calcium sorbate, calcium sulfate, potassium acetate, potassium benzoate, potassium carbonate, potassium chloride, potassium citrate, potassium sorbate, potassium sulfate, sodium acetate, sodium benzoate, sodium carbonate, sodium chloride, sodium citrate, sodium sulfate, zinc acetate, zinc benzoate, zinc carbonate, zinc chloride, zinc citrate, zinc sorbate, zinc sulfate), starch or a sugar or sugar derivative (such as e.g. sucrose, dextrin, glucose, lactose, sorbitol), sugar or sugar derivative (such as e.g. sucrose, dextrin, glucose, lactose, sorbitol), small organic molecules, starch, flour, cellulose and minerals and clay minerals (also known as hydrous aluminium phyllosilicates). Preferably, the core comprises a clay mineral such as kaolinite or kaolin.

The core may also include an inert particle with the enzyme absorbed into it, or applied onto the surface, e.g., by fluid bed coating.

The core may have a diameter of 20-2000 μm, particularly 50-1500 μm, 100-1500 μm or 250-1200 μm.

The core may be surrounded by at least one coating, e.g., to improve the storage stability, to reduce dust formation during handling, or for coloring the granule. The optional coating(s) may include a salt and/or wax and/or flour coating, or other suitable coating materials.

The coating may be applied in an amount of at least 0.1% by weight of the core, e.g., at least 0.5%, 1% or 5%. The amount may be at most 100%, 70%, 50%, 40% or 30% by weight of the core.

The coating is preferably at least 0.1 μm thick, particularly at least 0.5 μm, at least 1 μm or at least 5 μm. In some embodiments the thickness of the coating is below 100 μm, such as below 60 μm, or below 40 μm.

The coating should encapsulate the core unit by forming a substantially continuous layer. A substantially continuous layer is to be understood as a coating having few or no holes, so that the core unit is encapsulated or enclosed with few or no uncoated areas. The layer or coating should in particular be homogeneous in thickness.

The coating can further contain other materials as known in the art, e.g., fillers, antisticking agents, pigments, dyes, plasticizers and/or binders, such as titanium dioxide, kaolin, calcium carbonate or talc.

Preferably, the enzyme granules of the invention may comprise a core comprising the enzymes of the invention, one or more salt coatings and one or more wax coatings. Examples of enzyme granules with multiple coatings are shown in WO1993/07263, WO1997/23606 and WO2016/149636.

The salt coating may comprise at least 60% by weight of a salt, e.g., at least 65%, at least 70%, at least 75%, at least 80%, at least 85%, at least 90%, at least 95% or at least 99% by weight. The salt coating may be as described in WO1997/05245, WO1998/54980, WO1998/55599, WO2000/70034, WO2006/034710, WO2008/017661, WO2008/017659, WO2000/020569, WO2001/004279, WO1997/05245, WO2000/01793, WO2003/059086, WO2003/059087, WO2007/031483, WO2007/031485, WO2007/044968, WO2013/192043, WO2014/014647 and WO2015/197719 or polymer coating such as described in WO 2001/00042.

The salt in the coating may have a constant humidity at 20° C. above 60%, particularly above 70%, above 80% or above 85%, or it may be another hydrate form of such a salt (e.g., anhydrate).

The salt may be an inorganic salt, e.g., salts of sulfate, sulfite, phosphate, phosphonate, nitrate, chloride or carbonate or salts of simple organic acids (less than 10 carbon atoms, e.g., 6 or less carbon atoms) such as citrate, malonate or acetate. Examples of cations in these salts are alkali or earth alkali metal ions, the ammonium ion or metal ions of the first transition series, such as sodium, potassium, magnesium, calcium, zinc or aluminium. Examples of anions include chloride, bromide, iodide, sulfate, sulfite, bisulfite, thiosulfate, phosphate, monobasic phosphate, dibasic phosphate, hypophosphite, dihydrogen pyrophosphate, tetraborate, borate, carbonate, bicarbonate, metasilicate, citrate, malate, maleate, malonate, succinate, sorbate, lactate, formate, acetate, butyrate, propionate, benzoate, tartrate, ascorbate or gluconate. In particular alkali- or earth alkali metal salts of sulfate, sulfite, phosphate, phosphonate, nitrate, chloride or carbonate or salts of simple organic acids such as citrate, malonate or acetate may be used.

Specific examples of suitable salts are NaCl (CH20° C.=76%), Na2CO3 (CH20° C.=92%), NaNO3 (CH20° C.=73%), Na2HPO4 (CH20° C.=95%), Na3PO4 (CH25° C.=92%), NH4CI (CH20° C.=79.5%), (NH4) 2HPO4 (CH20° C.=93.0%), NH4H2PO4 (CH20° C.=93.1%), (NH4) 2SO4 (CH20° C.=81.1%), KCl (CH20° C.=85%), K2HPO4 (CH20° C.=92%), KH2PO4 (CH20° C.=96.5%), KNO3 (CH20° C.=93.5%), Na2SO4 (CH20° C.=93%), K2SO4 (CH20° C.=98%), KHSO4 (CH20° C.=86%), MgSO4 (CH20° C.=90%), ZnSO4 (CH20° C.=90%) and sodium citrate (CH25° C.=86%). Other examples include NaH2PO4, (NH4) H2PO4, CuSO4, Mg (NO3) 2, magnesium acetate, calcium acetate, calcium benzoate, calcium carbonate, calcium chloride, calcium citrate, calcium sorbate, calcium sulfate, potassium acetate, potassium benzoate, potassium carbonate, potassium chloride, potassium citrate, potassium sorbate, sodium acetate, sodium benzoate, sodium citrate, sodium sulfate, zinc acetate, zinc benzoate, zinc carbonate, zinc chloride, zinc citrate and zinc sorbate.

The salt may be in anhydrous form, or it may be a hydrated salt, i.e. a crystalline salt hydrate with bound water(s) of crystallization, such as described in WO 99/32595. Specific examples include anhydrous sodium sulfate (Na2SO4), anhydrous magnesium sulfate (MgSO4), magnesium sulfate heptahydrate (MgSO4.7H2O), zinc sulfate heptahydrate (ZnSO4.7H2O), sodium phosphate dibasic heptahydrate (Na2HPO4.7H2O), magnesium nitrate hexahydrate (Mg(NO3) 2 (6H2O)), sodium citrate dihydrate and magnesium acetate tetrahydrate.

The salt coating may comprise a single salt or a mixture of two or more salts. The salt may be water soluble, in particular having a solubility at least 0.1 g in 100 g of water at 20° C., preferably at least 0.5 g per 100 g water, e.g., at least 1 g per 100 g water, e.g., at least 5 g per 100 g water. The salt may be added from a salt solution where the salt is completely dissolved or from a salt suspension wherein the fine particles are less than 50 μm, such as less than 10 μm or less than 5 μm.

A wax coating may comprise at least 60% by weight of a wax, e.g., at least 65%, at least 70%, at least 75%, at least 80%, at least 85%, at least 90%, at least 95% or at least 99% by weight.

Specific examples of waxes are polyethylene glycols; polypropylenes; Carnauba wax; Candelilla wax; bees wax; hydrogenated plant oil or animal tallow such as polyethylene glycol (PEG), methyl hydroxy-propyl cellulose (MHPC), polyvinyl alcohol (PVA), hydrogenated ox tallow, hydrogenated palm oil, hydrogenated cotton seeds and/or hydrogenated soy bean oil; fatty acid alcohols; mono-glycerides and/or di-glycerides, such as glyceryl stearate, wherein stearate is a mixture of stearic and palmitic acid; microcrystalline wax; paraffin's; and fatty acids, such as hydrogenated linear long chained fatty acids and derivatives thereof. A preferred wax is palm oil or hydrogenated palm oil.

The granulate of the present invention may also be produced as a non-dusting granulate, e.g., as disclosed in U.S. Pat. Nos. 4,106,991 and 4,661,452 and may optionally be coated by methods known in the art. The coating materials can be waxy coating materials and film-forming coating materials. Examples of waxy coating materials are poly (ethylene oxide) products (polyethyleneglycol, PEG) with mean molar weights of 1000 to 20000; ethoxylated nonylphenols having from 16 to 50 ethylene oxide units; ethoxylated fatty alcohols in which the alcohol contains from 12 to 20 carbon atoms and in which there are 15 to 80 ethylene oxide units; fatty alcohols; fatty acids; and mono- and di- and triglycerides of fatty acids. Examples of film-forming coating materials suitable for application by fluid bed techniques are given in GB 1483591.

The granulate may further comprise one or more additional enzymes. Each enzyme will then be present in more granules securing a more uniform distribution of the enzymes, and also reduces the physical segregation of different enzymes due to different particle sizes. Methods for producing multi-enzyme co-granulates is disclosed in the ip.com disclosure IPCOM000200739D.

Another example of formulation of enzymes by the use of co-granulates is disclosed in WO 2013/188331.

The present invention also relates to protected enzymes prepared according to the method disclosed in EP 238,216.

Thus, preferably, the present invention provides a granule, which comprises:

(a) a core comprising a carbohydrase according to the invention, and
(b) a coating consisting of one or more layer(s) surrounding the core.

In the present invention, the coating comprises a salt coating as described herein. Preferably, the coating comprises a wax coating as described herein. More preferably, the coating comprises a salt coating followed by a wax coating as described herein. The polypeptide having carbohydrase activity and other polypeptides may be co-granulated.

In the present invention, the composition may further comprise one or more components selected from the list consisting of one or more carriers. The carrier may be selected from the group consisting of water, glycerol, ethylene glycol, 1,2-propylene glycol or 1, 3-propylene glycol, sodium chloride, sodium benzoate, potassium sorbate, sodium sulfate, potassium sulfate, magnesium sulfate, sodium thiosulfate, calcium carbonate, sodium citrate, dextrin, maltodextrin, glucose, sucrose, sorbitol, lactose, wheat flour, wheat bran, corn gluten meal, starch, kaolin and cellulose or any combination thereof.

In present invention, the composition may further comprise one or more additional enzymes; one or more eubiotics; one or more vitamins; one or more minerals, and one or more amino acids, as described below.

Methods of Composing an Animal Feed

The present invention is also directed to methods of composing an animal feed comprising at least one enzyme and with an A/X ratio greater than 0.70, preferably greater than 0.705, preferably greater than 0.71, preferably greater than 0.715, preferably greater than 0.72, preferably greater than 0.725, preferably greater than 0.73, preferably greater than 0.735, preferably greater than 0.74, preferably greater than 0.745, preferably greater than 0.75, preferably greater than 0.76, preferably greater than 0.77, preferably greater than 0.78, preferably greater than 0.79, preferably greater than 0.80.

The present invention is also directed to methods of composing an animal feed comprising at least one enzyme and with an A/X ratio lower than 1.5, preferably lower than 1.4, preferably lower than 1.3, preferably lower than 1.2, preferably lower than 1.15, preferably lower than 1.1, preferably lower than 1.05, preferably lower than 1, preferably lower than 0.95, preferably lower than 0.9, preferably lower than 0.85, preferably lower than 0.84, preferably lower than 0.83, preferably lower than 0.83, preferably lower than 0.82, preferably lower than 0.81.

The present invention is also directed to methods of composing an animal feed comprising at least one enzyme and with an A/X total feed ratio greater than 0.91, preferably greater than 0.95, preferably greater than 1.00, preferably greater than 1.05, preferably greater than 1.10, preferably greater than 1.15, preferably greater than 1.20, preferably greater than 1.25, preferably greater than 1.30.

An embodiment of the present invention therefore is a method of composing an animal feed a) with an A/X ratio greater than 0.70, preferably greater than 0.705, preferably greater than 0.71, preferably greater than 0.715, preferably greater than 0.72, preferably greater than 0.725, preferably greater than 0.73, preferably greater than 0.735, preferably greater than 0.74, preferably greater than 0.745, preferably greater than 0.75, preferably greater than 0.76, preferably greater than 0.77, preferably greater than 0.78, preferably greater than 0.79, preferably greater than 0.80; and b) comprising at least one enzyme; and c) comprising the step of adjusting the amount of the at least one enzymes in the animal feed depending on the A/X ratio in the feed using $$\text{Effect of Carbohydrase on } BWcFCR \text{ vs } NC = 6.127216113 + 0.1347057461 * \text{Cornzyme dose} - 15.9027776 * \text{Corn}\frac{A}{X}\text{ratio} - 0.189932808 * \text{Cornzyme dose} * \text{Corn}\frac{A}{X}\text{ratio} + 10.264604897 * \text{Corn}\frac{A}{X}\text{ratio}^2;$$

and the improvement in body weight corrected feed conversion ratio compared with a non-enzyme treatment control.

An embodiment of the present invention therefore is a method of composing an animal feed a) with an A/X ratio lower than 1.5, preferably lower than 1.4, preferably lower than 1.3, preferably lower than 1.2, preferably lower than 1.15, preferably lower than 1.1, preferably lower than 1.05, preferably lower than 1, preferably lower than 0.95, preferably lower than 0.9, preferably lower than 0.85, preferably lower than 0.84, preferably lower than 0.83, preferably lower than 0.83, preferably lower than 0.82, preferably lower than 0.81; and b) comprising at least one enzyme; and c) comprising the step of adjusting the amount of the at least one enzymes in the animal feed depending on the A/X ratio in the feed using $$\text{Effect of Carbohydrase on } BWcFCR \text{ vs } NC = 6.127216113 + 0.1347057461 * \text{Cornzyme dose} - 15.9027776 * \text{Corn}\frac{A}{X}\text{ratio} - 0.189932808 * \text{Cornzyme dose} * \text{Corn}\frac{A}{X}\text{ratio} + 10.264604897 * \text{Corn}\frac{A}{X}\text{ratio}^2;$$

and the improvement in body weight corrected feed conversion ratio compared with a non-enzyme treatment control.

An embodiment of the present invention therefore is a method of composing an animal feed a) with an A/X total feed ratio greater than 0.91, preferably greater than 0.95, preferably greater than 1.00, preferably greater than 1.05, preferably greater than 1.10, preferably greater than 1.15, preferably greater than 1.20, preferably greater than 1.25, preferably greater than 1.30; and b) comprising at least one enzyme; and c) comprising the step of adjusting the amount of the at least one enzymes in the animal feed depending on the A/X ratio in the feed and using $$\text{Effect of Carbohydrase on } BWcFCR \text{ vs } NC = 6.127216113 + 0.1347057461 * \text{Cornzyme dose} - 15.9027776 * \text{Corn}\frac{A}{X}\text{ratio} - 0.189932808 * \text{Cornzyme dose} * \text{Corn}\frac{A}{X}\text{ratio} + 10.264604897 * \text{Corn}\frac{A}{X}\text{ratio}^2;$$

and the improvement in body weight corrected feed conversion ratio compared with a non-enzyme treatment control.

Another embodiment of the present invention is a method of composing an animal feed comprising at least one enzyme, and comprising the steps of a) subjecting a sample of an animal feed to
   a1) a quantitative analysis of the dietary fiber in the sample;
   a2) a determination of the A/X ratio in the total amount of the animal feed; and b) quantitative evaluation of the factor by which the enzyme activity is reduced as a function of the determined A/X ratio;

c) determining the total amount of the at least one enzyme needed to compensate for the reduction in activity using $$\text{Effect of Carbohydrase on } BWcFCR \text{ vs } NC = 6.127216113 + 0.1347057461 * \text{Cornzyme dose} - 15.9027776 * \text{Corn}\frac{A}{X}\text{ratio} - 0.189932808 * \text{Cornzyme dose} * \text{Corn}\frac{A}{X}\text{ratio} + 10.264604897 * \text{Corn}\frac{A}{X}\text{ratio}^2;$$

and the improvement in body weight corrected feed conversion ratio compared with a non-enzyme treatment control.

d) adding the amount of the at least one enzymes to the animal feed in the amount determined in step c).

Quantitative analysis of the dietary fiber content in animal feed can be performed by standard methods, such as wet chemistry, HPLC, GLC or spectrophotometry, and enzyme assays.

Wet chemistry methods include the methods as used by Englyst et al. (Englyst H N, Quigley M E, Hudson G J (1994). Determination of dietary fiber as non-starch polysaccharides with gas-liquid chromatographic, high-performance liquid chromatographic or spectrophotometric measurement of constituent sugars. Analyst 119, 1497-1509.) to determine the non-starch polysaccharides (NSP) in the form of soluble, insoluble and total NSP fractions from feed samples are separated. Briefly, 5 mL of sodium acetate buffer is added to the ground feed sample followed by serial enzymatic treatment for starch removal. The sample is then centrifuged to collect the soluble NSP fraction. The remaining pellet is the insoluble NSP. Both portions are acid hydrolysed and the monosaccharides are deterimined using gas chromatography, high performance liquid chromatography or spectrophotometry.

Enzyme assays can be purchased as kits, for example from Megazyme®.

Additionally, dietary fiber fractions may be calculated from other fractions or as a percent of NDF as in the paper as disclosed by Balckom et al. (Mourtzinis S, Arriaga F J, Bransby D, Balcom K S (2014). A simplified method for monomeric carbohydrate analysis of corn stover biomass. GCB Bioenergy 6, 300-304.).

The quantitative analysis of the steps a1) and a2) of the method according to the present invention is rather time and cost consuming. Near infrared measurements (NIR) of the respective animal feed would be a more time and cost efficient alternative for determining the A/X ratio in an animal feed. However, near infrared spectroscopy does not give the results with the desired precision. Accordingly, neither quantitative analysis nor near infrared spectroscopy alone are suitable for a cost and time efficient determination of the A/X ratio in the total amount of the animal feed.

According to the present invention this problem is solved in that the near infrared absorptions obtained for a sample of an animal feed are correlated with the corresponding values of the quantitative analysis of the same. The thus obtained correlation of the values of the quantitative analysis with the absorptions of the NIR measurement is preferably depicted or plotted as a calibration graph, which facilitates the matching of the absorptions of the NIR measurements of other sample with the corresponding exact values for the parameters based on the quantitative analysis.

Another object of the present invention is therefore a computer-implemented method of composing an animal feed comprising at least one enzyme, comprising the steps of A) subjecting a sample of an animal feed to A1) near infrared (NIR) spectroscopy to obtain an NIR spectrum;

A2) matching the absorption intensities at the respective wavelengths or wavenumbers in the NIR spectrum obtained in A1) with a calibration graph or equation;

A3) a quantitative analysis of the dietary fiber in the sample

A4) a determination of the A/X ratio in the total amount of processed feedstuff raw material and/or feedstuff; and B) quantitative evaluation of the factor by which the enzyme activity is reduced as a function of the determined A/X ratio;

C) determining the total amount of the at least one enzyme needed to compensate for the reduction in activity D) adding the amount of the at least one enzymes to the animal feed in the amount determined in step C).

The present invention further comprises the step of generating a calibration graph or equation as in A2) by additionally following the steps A-i) subjecting a sample of an animal feed as in A) to near infrared (NIR) spectroscopy;

A-ii) matching the absorption intensities at the respective wavelengths or wavenumbers in the NIR spectrum obtained in step A-i) with the corresponding parameters and their values determined in A of subjecting the sample to a1) a quantitative analysis of the A/X ratio in the sample;

a2) a determination of the A/X ratio in the total amount of the animal feed; and A-iii) plotting the matching of step A-ii) as a calibration graph and/or expressing the parameters determined in steps a1) and a2) in a calibration equation as a function of the absorption intensities at the respective wavelengths or wavenumbers matched in step A-iii).

Depending on the spectrometer used, the near-infrared (NIR) spectra of step A) can be recorded at wavelengths between 400 and 2,500 nm with any suitable infrared spectroscopes working either on the monochromator principle or on the Fourier transform principle. Preferably, the NIR spectra are recorded between 1,000 and 2,500 nm. Wavelengths are easily converted into the respective wavenumbers and therefore, the NIR spectra can of course also be recorded at the corresponding wavenumbers. Organic compounds rich in O—H bonds, C—H bonds and N—H bonds are suitable for the detection by means of near-infrared spectroscopy. However, a biological sample such as an animal. feed contains a multitude of different organic compounds and thus represents a complex matrix. Notwithstanding every biological substance has a unique near-infrared spectrum, comparable to an individual fingerprint. Consequently, two biological substances having exactly the same spectrum can be assumed to have the same physical and chemical composition and thus to be identical. On the other hand, if two biological substances have different spectra, it can be assumed that they are different, either in terms of their physical or chemical characteristics or in both terms. Due to their individual and highly specific absorption bands the signals of organic compounds and their intensities in NIR spectra can be easily attributed and correlated to a specific organic compound and its concentration in a sample of known weight. Thus, the NIR spectroscopy allows a reliable prediction or assessment of for example the amount of dietary fiber in a sample. Since the same sample of a specific animal feed is subjected to the quantitative analysis in step a) and to the NIR spectroscopy in step A), it is also possible to attribute and correlate absorptions and their intensities in an NIR spectrum to parameters, such as the amount. of arabinoxylans in the sample. Once, the absorption intensities at the respective wavelengths or wavenumbers have been successfully matched, i.e. attributed and correlated to the parameters of interest and their values, the NIR spectroscopy allows a reliable prediction or assessment of the dietary fiber in the animal feed. For this purpose a large number of NIR spectra, e.g. 100, 200, 300, 400, 500 or more, of an animal feed are recorded, and the absorption intensities at the respective wavelengths or wavenumbers are matched with the corresponding parameters and their values.

The relationship between the A/X fiber fraction in the feed and carbohydrase efficacy can be described by the following equations:

Equation 1: Effect of Carbohydrase (mg EP/kg) on body weight corrected feed conversion ratio (BWcFCR) and corn A/X ratio, $R^2=0.74$, RMSE=0.027, n=28, $P<0.0001$.

$$\text{Effect of Carbohydrase on } BWcFCR \text{ vs } NC = 0.9815263 - 1.3898953 * \text{Corn}\frac{A}{X}\text{ratio} + 10.264605 * \left(\text{Corn}\frac{A}{X}\text{ratio} - 0.74857\right)^2$$

Equation 2: Effect of Carbohydrase dose (mg EP/kg) on BWcFCR and corn A/X ratio, $R^2$=0.88, RMSE=0.019, n=28, P<0.0001

$$\text{Effect of Carbohydrase on } BWcFCR \text{ vs } NC = 6.127216113 + 0.1347057461 * \text{Carbohydrase dose} - 15.907776 * \text{Corn}\frac{A}{X}\text{ratio} - 0.189932808 * \text{Carbohydrase dose} * \text{Corn}\frac{A}{X}\text{ratio} + 10.264604897 * \text{Corn}\frac{A}{X}\text{ratio}^2$$

Equation 3: Effect of Carbohydrase dose (mg EP/kg) on BWcFCR and total diet A/X ratio, $R^2$=0.51, RMSE=0.036, n=28, P<0.0001

Effect of Carbohydrase on BWcFCR vs NC=0.725-0.7857143*Diet total A/X ratio

In general, the relationship shows that body weight corrected feed conversion ratio improves as total carbohydrase dose (as mg of enzyme protein/kg) and A/X ratio increases. This relationship is illustrated in FIG. 2. FIG. 2 and table 2 show that the response, expressed in FCR, is similar for all three different dosages of xylanase (SEQ ID 2) in diets with an A/X corn ratio of 0.71. The FCR is reduced, and therefore improved, for diets containing xylanase at a medium A/X corn ratio of 0.74. Additionally, it is shown that the higher the xylanase dose, the better the improvement is in FCR. The FCR is even more reduced, and therefore improved, for diets containing xylanase at a high A/X corn ratio of 0.82. The lowest FCR can be achieved with the highest xylanase dose at the highest A/X corn ratio.

TABLE 2

Predicted effect of xylanase dose and A/X corn ratio on BWcFCR

| Corn A/X ratio | mg EP/kg XYL | Predicted effect of XYL on BWcFCR (vs a non-enzyme supplemented control) | Predicted effect of XYL on BWcFCR if control BWcFCR = 1.596 |
|---|---|---|---|
| 0.71 | 0 | 0.0106 | 1.607 |
| | 2 | 0.0102 | 1.606 |
| | 5 | 0.0099 | 1.606 |
| 0.74 | 0 | −0.0199 | 1.576 |
| | 2 | −0.0316 | 1.564 |
| | 5 | −0.0492 | 1.547 |
| 0.82 | 0 | −0.0111 | 1.585 |
| | 2 | −0.0532 | 1.543 |
| | 5 | −0.1163 | 1.480 |

Embodiments of the Invention

1. Use of at least one carbohydrase in combination with an animal feed with an A/X corn ratio greater than 0.70, preferably greater than 0.705, preferably greater than 0.71, preferably greater than 0.715, preferably greater than 0.72, preferably greater than 0.725, preferably greater than 0.73, preferably greater than 0.735, preferably greater than 0.74, preferably greater than 0.745, preferably greater than 0.75, preferably greater than 0.76, preferably greater than 0.77, preferably greater than 0.78, preferably greater than 0.79, preferably greater than 0.80 for improving the nutritional value of said animal feed.
2. Use of at least one carbohydrase in combination with an animal feed with an A/X corn ratio greater than 0.70, preferably greater than 0.705, preferably greater than 0.71, preferably greater than 0.715, preferably greater than 0.72, preferably greater than 0.725, preferably greater than 0.73, preferably greater than 0.735, preferably greater than 0.74, preferably greater than 0.745, preferably greater than 0.75, preferably greater than 0.76, preferably greater than 0.77, preferably greater than 0.78, preferably greater than 0.79, preferably greater than 0.80 for increasing digestibility of said animal feed.
3. Use of at least one carbohydrase in combination with an animal feed with an A/X corn ratio greater than 0.70, preferably greater than 0.705, preferably greater than 0.71, preferably greater than 0.715, preferably greater than 0.72, preferably greater than 0.725, preferably greater than 0.73, preferably greater than 0.735, preferably greater than 0.74, preferably greater than 0.745, preferably greater than 0.75, preferably greater than 0.76, preferably greater than 0.77, preferably greater than 0.78, preferably greater than 0.79, preferably greater than 0.80 for improving one or more performance parameters in an animal.
4. The use according to embodiment 1, wherein the A/X corn ratio is lower than 1.5, preferably lower than 1.4, preferably lower than 1.3, preferably lower than 1.2, preferably lower than 1.15, preferably lower than 1.1, preferably lower than 1.05, preferably lower than 1, preferably lower than 0.95, preferably lower than 0.9, preferably lower than 0.85, preferably lower than 0.84, preferably lower than 0.83, preferably lower than 0.83, preferably lower than 0.82, preferably lower-than 0.81.
5. Use according to embodiment 3 or 4, wherein the one or more performance parameters in an animal is the feed conversion ratio.
6. Use of at least one carbohydrase in combination with an animal feed with an A/X total feed ratio greater than 0.91, preferably greater than 0.95, preferably greater than 1.00, preferably greater than 1.05, preferably greater than 1.10, preferably greater than 1.15, preferably greater than 1.20, preferably greater than 1.25, preferably greater than 1.30 for improving the nutritional value of said animal feed.
7. Use of at least one carbohydrase in combination with an animal feed with an A/X total feed ratio greater than 0.91, preferably greater than 0.95, preferably greater than 1.00, preferably greater than 1.05, preferably greater than 1.10, preferably greater than 1.15, preferably greater than 1.20, preferably greater than 1.25, preferably greater than 1.30 for increasing digestibility of said animal feed.
8. Use of at least one carbohydrase in combination with an animal feed with an A/X total feed ratio greater than 0.91, preferably greater than 0.95, preferably greater than 1.00, preferably greater than 1.05, preferably greater than 1.10, preferably greater than 1.15, preferably greater than 1.20, preferably greater than 1.25, preferably greater than 1.30 for improving one or more performance parameters in an animal.
9. Use according to embodiment 8, wherein the one or more performance parameters in an animal is the feed conversion ratio.
10. The use of any of embodiments 1 to 9, wherein the at least one carbohydrase is selected from the group of *Bacillus subtilis, Bacillus amyloliquefaciens, Bacillus licheniformis* or *Paenibacillus pabuli, Thermomyces*

*lanuginosus, Trichderma reeseibeta*, genetically modified *Aspergillus oryzae* or genetically modified *Bacillus amyloliquefaciens.*

11. The use of any of embodiments 1 to 10, wherein the at least one carbohydrase is from the group of glucanases, xylanase, pectinase, galactosidases, cellulose, mannanases, debranching enzymes or amylases
12. The use of any of embodiments 1 to 11, wherein the at least one carbohydrase is stable in the presence of protease.
13. The use of any of embodiments 1 to 12, wherein the xylanase is a *Bacillus subtilis* xylanase.
14. The use of any of embodiments 1 to 13, wherein a second carbohydrase is alpha-galactosidase.
15. The use of any of embodiments 1 to 14, wherein the xylanase is a xylanase variant, comprising a substitution at one or more positions corresponding to positions 24, 26, 36, 37, 60, 71, 74, 75, 76, 124, 133, 155, 167, 208, 317, and 321 of SEQ ID NO: 1.
16. The use of embodiments 15, wherein the xylanase variant has xylanase activity and wherein the xylanase variant has at least 60%, e.g., at least 65%, at least 70%, at least 75%, at least 80%, at least 85%, at least 90%, at least 95%, at least 96%, at least 97%, at least 98%, or at least 99%, but less than 100% sequence identity to SEQ ID NO: 1, 2, 3, 4, 5 or 6.
17. The use of any of embodiments 15 or 16, wherein the xylanase variant has an improved property relative to the parent, wherein the improved property is selected from the group consisting of catalytic efficiency, catalytic rate, chemical stability, oxidation stability, pH activity, pH stability, specific activity, stability under storage conditions, substrate binding, substrate cleavage, substrate specificity, substrate stability, surface properties, thermal activity, and thermostability.
18. The use of any of embodiments 15 to 17, wherein the xylanase variant has improved thermostability.
19. The use of any of embodiments 1 to 18, wherein the at least one carbohydrase is added to the animal feed in a total amount of 50-500 mg per kg animal feed, such as 60 to 450 mg, 70 to 400 mg, 80 to 350 mg, 90 to 300 mg, 100 to 300 mg, 110 to 250 mg, 120 to 200 mg per kg animal feed, or any combination of these intervals.
20. The use of any of embodiments 1 to 19, wherein the xylanase or xylanase variant is formulated as a solid formulation or liquid formulation.
21. The use of embodiment 20, wherein the liquid formulation comprises 20%-80% polyol.
22. The use of embodiment 21, wherein the polyol is selected from the group consisting of glycerol, sorbitol, propylene glycol (MPG), ethylene glycol, diethylene glycol, triethylene glycol, 1,2-propylene glycol or 1, 3-propylene glycol, dipropylene glycol, polyethylene glycol (PEG) having an average molecular weight below about 600 and polypropylene glycol (PPG) having an average molecular weight below about 600.
23. The use of any of embodiments 20 to 22, wherein the liquid formulation further comprises preservative, preferably selected from the group consisting of sodium sorbate, potassium sorbate, sodium benzoate and potassium benzoate or any combination thereof.
24. The use of any one of embodiments 20 to 23, wherein the liquid formulation further comprises one or more formulating agents, preferably selected from the list consisting of glycerol, ethylene glycol, 1,2-propylene glycol or 1, 3-propylene glycol, sodium chloride, sodium benzoate, potassium sorbate, sodium sulfate, potassium sulfate, magnesium sulfate, sodium thiosulfate, calcium carbonate, sodium citrate, dextrin, glucose, sucrose, sorbitol, lactose, starch, PVA, acetate and phosphate, preferably selected from the list consisting of 1, 2-propylene glycol, 1,3-propylene glycol, sodium sulfate, dextrin, cellulose, sodium thiosulfate, kaolin and calcium carbonate.
25. The use of embodiment 20, wherein the solid formulation is a granule, spray dried powder or agglomerate.
26. The use of embodiment 20 or 25, wherein the solid formulation comprises a formulating agent which is selected from the group consisting of a salt (organic or inorganic zinc, sodium, potassium or calcium salts such as e.g. such as calcium acetate, calcium benzoate, calcium carbonate, calcium chloride, calcium citrate, calcium sorbate, calcium sulfate, potassium acetate, potassium benzoate, potassium carbonate, potassium chloride, potassium citrate, potassium sorbate, potassium sulfate, sodium acetate, sodium benzoate, sodium carbonate, sodium chloride, sodium citrate, sodium sulfate, zinc acetate, zinc benzoate, zinc carbonate, zinc chloride, zinc citrate, zinc sorbate, zinc sulfate), starch or a sugar or sugar derivative (such as e.g. sucrose, dextrin, glucose, lactose, sorbitol).
27. The use of any one of embodiments 20, 25 or 26, wherein the solid formulation is an enzyme granule.
28. An animal feed
    a. Comprising a an A/X corn ratio greater than 0.70, preferably greater than 0.705, preferably greater than 0.71, preferably greater than 0.715, preferably greater than 0.72, preferably greater than 0.725, preferably greater than 0.73, preferably greater than 0.735, preferably greater than 0.74, preferably greater than 0.745, preferably greater than 0.75, preferably greater than 0.76, preferably greater than 0.77, preferably greater than 0.78, preferably greater than 0.79, preferably greater than 0.80; and
    b. At least one carbohydrase.
29. The animal feed according to embodiment 28, wherein the A/X corn ratio is lower than 1.5, preferably lower than 1.4, preferably lower than 1.3, preferably lower than 1.2, preferably lower than 1.15, preferably lower than 1.1, preferably lower than 1.05, preferably lower than 1, preferably lower than 0.95, preferably lower than 0.9, preferably lower than 0.85, preferably lower than 0.84, preferably lower than 0.83, preferably lower than 0.83, preferably lower than 0.82, preferably lower than 0.81.
30. An animal feed
    a. Comprising an A/X total feed ratio greater than 0.91, preferably greater than 0.95, preferably greater than 1.00, preferably greater than 1.05, preferably greater than 1.10, preferably greater than 1.15, preferably greater than 1.20, preferably greater than 1.25, preferably greater than 1.30; and
    b. At least one carbohydrase.
31. The animal feed of embodiment 29 or 30, wherein the at least one carbohydrase is selected from the group of *Bacillus subtilis, Bacillus amyloliquefaciens, Bacillus licheniformis* or *Paenibacillus pabuli, Thermomyces lanuginosus, Trichderma reeseibeta*, genetically modified *Aspergillus oryzae* or genetically modified *Bacillus amyloliquefaciens.*
32. The animal feed of any of embodiments 29 to 31, wherein the at least one carbohydrase is from the group of glucanases, xylanase, pectinase, galactosidases, cellulose, mannanases, debranching enzymes or amylases 33. The animal feed of any of embodiments 29 to 32, wherein the at least one carbohydrase is stable in the presence of protease.
34. The animal feed of any of embodiments 29 to 33, wherein the xylanase is a *Bacillus subtilis* xylanase.
35. The animal feed of any of embodiments 29 to 35, further comprising alpha-galactosidase.
36. The animal feed of any of embodiments 32 to 35, wherein the xylanase is a xylanase variant, comprising a substitution at one or more positions corresponding to positions 24, 26, 36, 37, 60, 71, 74, 75, 76, 124, 133, 155, 167, 208, 317, and 321 of SEQ ID NO: 1.
37. The animal feed of any of embodiments 29 to 36, wherein the xylanase variant has xylanase activity and wherein the xylanase variant has at least 60%, e.g., at least 65%, at least 70%, at least 75%, at least 80%, at least 85%, at least 90%, at least 95%, at least 96%, at least 97%, at least 98%, or at least 99%, but less than 100% sequence identity to SEQ ID NO: 1, 2, 3, 4, 5 or 6.
38. The animal feed of any of embodiments 29 to 37, wherein the xylanase variant has an improved property relative to the parent, wherein the improved property is selected from the group consisting of catalytic efficiency, catalytic rate, chemical stability, oxidation stability, pH activity, pH stability, specific activity, stability under storage conditions, substrate binding, substrate cleavage, substrate specificity, substrate stability, surface properties, thermal activity, and thermostability.
39. The animal feed of any of embodiments 29 to 38, wherein the xylanase variant has improved thermostability.
40. The animal feed of any of embodiments 29 to 39, wherein the xylanase is added in an amount of 50-500 mg per kg animal feed, such as 60 to 450 mg, 70 to 400 mg, 80 to 350 mg, 90 to 300 mg, 100 to 300 mg, 110 to 250 mg, 120 to 200 mg per kg animal feed, or any combination of these intervals.
41. The feed of any one of embodiments 29 to 40, wherein the xylanase or xylanase variant is formulated as a solid formulation or liquid formulation.
42. The feed of embodiment 41, wherein the liquid formulation comprises 20%-80% polyol.
43. The feed of embodiment 42, wherein the polyol is selected from the group consisting of glycerol, sorbitol, propylene glycol (MPG), ethylene glycol, diethylene glycol, triethylene glycol, 1,2-propylene glycol or 1, 3-propylene glycol, dipropylene glycol, polyethylene glycol (PEG) having an average molecular weight below about 600 and polypropylene glycol (PPG) having an average molecular weight below about 600.
44. The feed of any of embodiments 41 to 43, wherein the liquid formulation further comprises preservative, preferably selected from the group consisting of sodium sorbate, potassium sorbate, sodium benzoate and potassium benzoate or any combination thereof.
45. The feed of any one of embodiments 41 to 43, wherein the liquid formulation further comprises one or more formulating agents, preferably selected from the list consisting of glycerol, ethylene glycol, 1,2-propylene glycol or 1, 3-propylene glycol, sodium chloride, sodium benzoate, potassium sorbate, sodium sulfate, potassium sulfate, magnesium sulfate, sodium thiosulfate, calcium carbonate, sodium citrate, dextrin, glucose, sucrose, sorbitol, lactose, starch, PVA, acetate and phosphate, preferably selected from the list consisting of 1, 2-propylene glycol, 1,3-propylene glycol, sodium sulfate, dextrin, cellulose, sodium thiosulfate, kaolin and calcium carbonate.
46. The feed of embodiment 41, wherein the solid formulation is a granule, spray dried powder or agglomerate.
47. The feed of embodiment 41 or 46, wherein the solid formulation comprises a formulating agent which is selected from the group consisting of a salt (organic or inorganic zinc, sodium, potassium or calcium salts such as e.g. such as calcium acetate, calcium benzoate, calcium carbonate, calcium chloride, calcium citrate, calcium sorbate, calcium sulfate, potassium acetate, potassium benzoate, potassium carbonate, potassium chloride, potassium citrate, potassium sorbate, potassium sulfate, sodium acetate, sodium benzoate, sodium carbonate, sodium chloride, sodium citrate, sodium sulfate, zinc acetate, zinc benzoate, zinc carbonate, zinc chloride, zinc citrate, zinc sorbate, zinc sulfate), starch or a sugar or sugar derivative (such as e.g. sucrose, dextrin, glucose, lactose, sorbitol).
48. The feed of any one of embodiments 41, 46 or 47, wherein the solid formulation is an enzyme granule.
49. The feed of any one of embodiments 29 to 48, which further comprises one or more components selected from the list consisting of:
one or more additional enzymes;
one or more eubiotics, such as probiotics, prebiotics and organic acids;
one or more vitamins;
of one or more carriers;
one or more minerals;
one or more amino acids; and
one or more other feed ingredients.
50. The feed of any one of embodiments 29 to 50, which further comprises one or more protein sources and one or more energy sources.
51. The animal feed of embodiment 50, wherein the protein source is selected from the group consisting of soybean, wild soybean, beans, lupin, tepary bean, scarlet runner bean, slimjim bean, lima bean, French bean, Broad bean (fava bean), chickpea, lentil, peanut, Spanish peanut, canola, sunflower seed, cotton seed, rapeseed (oilseed rape) or pea or in a processed form such as soybean meal, full fat soy bean meal, soy protein concentrate (SPC), fermented soybean meal (FSBM), sunflower meal, cotton seed meal, rapeseed meal, fish meal, bone meal, feather meal, whey or any combination thereof.
52. The animal feed of any of embodiments 50 or 51, wherein the energy source is selected from the group consisting of maize, corn, sorghum, barley, wheat, oats, rice, triticale, rye, beet, sugar beet, spinach, potato, cassava, *quinoa*, cabbage, switchgrass, millet, pearl millet, foxtail millet or in a processed form such as milled corn, milled maize, potato starch, cassava starch, milled sorghum, milled switchgrass, milled millet, milled foxtail millet, milled pearl millet, or any combination thereof.
53. The animal feed of any one of embodiments 29 to 52, wherein the animal is a mono-gastric animal, e.g. pigs or swine (including, but not limited to, piglets, growing pigs, and sows); poultry (including but not limited to poultry, turkey, duck, quail, guinea fowl, goose, pigeon, squab, chicken, broiler, layer, pullet and chick); pet animals such as cats and dogs, fish (including but not limited to amberjack, arapaima, barb, bass, bluefish, bocachico, bream, bullhead, cachama, carp, catfish, catla, chanos, char, cichlid, cobia, cod, crappie, dorada, drum, eel, goby, goldfish, gourami, grouper, guapote, halibut, java, labeo, lai, loach, mackerel, milkfish, mojarra, mudfish, mullet, paco, pearlspot, pejerrey, perch, pike, pompano, roach, salmon, sampa, sauger, sea bass, seabream, shiner, sleeper, snakehead, snapper, snook, sole, spinefoot, sturgeon, sunfish, sweetfish, tench, terror, tilapia, trout, tuna, turbot, vendace, walleye and whitefish); and crustaceans (including but not limited to shrimps and prawns).

54. A method of composing an animal feed with an A/X corn ratio greater than 0.70, preferably greater than 0.705, preferably greater than 0.71, preferably greater than 0.715, preferably greater than 0.72, preferably greater than 0.725, preferably greater than 0.73, preferably greater than 0.735, preferably greater than 0.74, preferably greater than 0.745, preferably greater than 0.75, preferably greater than 0.76, preferably greater than 0.77, preferably greater than 0.78, preferably greater than 0.79, preferably greater than 0.80; comprising the steps of
   a) determining the A/X corn ratio in feed
   b) adding at least one carbohydrase to the feed and
   c) adjusting the amount of the at least one carbohydrase in the animal feed depending on the A/X corn ratio in the feed using Equation 2:

$$\text{Effect of Carbohydrase on } BWcFCR \text{ vs } NC = 6.127216113 + 0.1347057461 * \text{Carbohydrase dose} - 15.9027776 * \text{Corn}\frac{A}{X}\text{ratio} - 0.189932808 * \text{Carbohydrase dose} * \text{Corn}\frac{A}{X}\text{ratio} + 10.264604897 * \text{Corn}\frac{A}{X}\text{ratio}^2;$$

and the improvement in body weight corrected feed conversion ratio compared with a non-enzyme treatment control.

55. The method according to embodiment 55, wherein the A/X corn ratio is lower than 1.5, preferably lower than 1.4, preferably lower than 1.3, preferably lower than 1.2, preferably lower than 1.15, preferably lower than 1.1, preferably lower than 1.05, preferably lower than 1, preferably lower than 0.95, preferably lower than 0.9, preferably lower than 0.85, preferably lower than 0.84, preferably lower than 0.83, preferably lower than 0.83, preferably lower than 0.82, preferably. lower than 0.81.

56. A method of composing an animal feed with an A/X total feed ratio greater than 0.91, preferably greater than 0.95, preferably greater than 1.00, preferably greater than 1.05, preferably greater than 1.10, preferably greater than 1.15, preferably greater than 1.20, preferably greater than 1.25, preferably greater than 1.30; comprising the steps of
   a) determining the A/X total feed ratio in feed
   b) adding at least one carbohydrase to the feed and
   c) adjusting the amount of the at least one carbohydrase in the animal feed depending on the A/X total feed ratio in the feed using $$\text{Effect of Carbohydrase on } BWcFCR \text{ vs } NC = 6.127216113 + 0.1347057461 * \text{Carbohydrase dose} - 15.9027776 * \text{Corn}\frac{A}{X}\text{ratio} - 0.189932808 * \text{Coarbohydrase dose} * \text{Corn}\frac{A}{X}\text{ratio} + 10.264604897 * \text{Corn}\frac{A}{X}\text{ratio}^2;$$

and the improvement in body weight corrected feed conversion ratio compared with a non-enzyme treatment control.

57. The method according to embodiment 55 or 56, wherein step a) is performed by methods selected from the group of wet chemistry, HPLC, GLC, spectrophotometry and enzyme assays.

58. A Computer-implemented method of composing an animal feed according to any of embodiments 27 to 51, where (a) comprising the steps of
   A) subjecting a sample of an animal feed to
      A1) near infrared (NIR) spectroscopy to obtain an NIR spectrum;
      A2) matching the absorption intensities at the respective wavelengths or wavenumbers in the NIR spectrum obtained in A1) with a calibration graph or equation
      A3) a quantitative analysis of the dietary fiber, specifically arabinoxylans and xylose, in the sample
      A4) a determination of the A/X ratio in the total amount of processed feedstuff raw material and/or feedstuff; and
   B) quantitative evaluation of the factor by which the enzyme activity is reduced as a function of the determined A/X ratio;
   C) determining the total amount of the at least one enzyme needed to compensate for the reduction in activity using $$\text{Effect of Carbohydrase on } BWcFCR \text{ vs } NC = 6.127216113 + 0.1347057461 * \text{Carbohydrase dose} - 15.9027776 * \text{Corn}\frac{A}{X}\text{ratio} - 0.189932808 * \text{Carbohydrase dose} * \text{Corn}\frac{A}{X}\text{ratio} + 10.264604897 * \text{Corn}\frac{A}{X}\text{ratio}^2;$$

and the improvement in body weight corrected feed conversion ratio compared with a non-enzyme treatment control;
   D) adding the amount of the at least one enzymes to the animal feed in the amount determined in step C).

59. The Computer-implemented method according to embodiment 58, wherein the step A2 further comprises the step of generating a calibration graph or equation by following the steps
   A-i) subjecting a sample of an animal feed as in step A) of embodiment 1 to near infrared (NIR) spectroscopy;
   A-ii) matching the absorption intensities at the respective wavelengths or wavenumbers in the NIR spectrum obtained in step A-i) with the corresponding parameters and their values determined in the of embodiment 1 of subjecting the sample to a1) a quantitative analysis of the A/X ratio in the sample;

a2) a determination of the A/X ratio in the total amount of the animal feed; and A-iii) plotting the matching of step A-ii) as a calibration graph and/or expressing the parameters determined in steps a1) and a2) in a calibration equation as a function of the absorption intensities at the respective wavelengths or wavenumbers matched in step A-iii).

60. The method or computer-implemented method of any of embodiments 58 or 59, wherein the A/X ratio is the A/X corn ratio and wherein said A/X corn ratio is greater than 0.70, preferably greater than 0.705, preferably greater than 0.71, preferably greater than 0.715, preferably greater than 0.72, preferably greater than 0.725, preferably greater than 0.73, preferably greater than 0.735, preferably greater than 0.74, preferably greater than 0.745, preferably greater than 0.75, preferably greater than 0.76, preferably greater than 0.77, preferably greater than 0.78, preferably greater than 0.79, preferably greater than 0.80.

61. The method or computer-implemented method according to embodiment 59 or 60, wherein the A/X corn ratio is lower than 1.5, preferably lower than 1.4, preferably lower than 1.3, preferably lower than 1.2, preferably lower than 1.15, preferably lower than 1.1, preferably lower than 1.05, preferably lower than 1, preferably lower than 0.95, preferably lower than 0.9, preferably lower than 0.85, preferably lower than 0.84, preferably lower than 0.83, preferably lower than 0.83, preferably lower than 0.82, preferably lower than 0.81.

62. The method or computer-implemented method of any of embodiments 59 to 61, wherein the A/X ratio is the A/X total feed ratio and wherein said A/X total feed ratio greater than 0.91, preferably greater than 0.95, preferably greater than 1.00, preferably greater than 1.05, preferably greater than 1.10, preferably greater than 1.15, preferably greater than 1.20, preferably greater than 1.25, preferably greater than 1.30.

63. The method or computer-implemented method of any of embodiments 59 to 62, wherein the at least one carbohydrase is selected from the group of *Bacillus subtilis, Bacillus amyloliquefaciens, Bacillus licheniformis* or *Paenibacillus pabuli, Thermomyces lanuginosus, Trichderma reeseibeta*, genetically modified *Aspergillus oryzae* or genetically modified *Bacillus amyloliquefaciens.*

64. The method or computer-implemented method of any of embodiments 59 to 63, wherein the at least one carbohydrase is from the group of glucanases, xylanase, pectinase, galactosidases, cellulose, mannanases, debranching enzymes or amylases.

65. The method or computer-implemented method of any of embodiments 59 to 64, wherein the at least one carbohydrase is stable in the presence of protease.

66. The method or computer-implemented method of any of embodiments 59 to 65, wherein the xylanase is a *Bacillus subtilis* xylanase.

67. The method or computer-implemented method of any of embodiments 59 to 66, wherein a second carbohydrase is alpha-galactosidase.

68. The method or computer-implemented method of any of embodiments 59 to 67, wherein the xylanase is a xylanase variant, comprising a substitution at one or more positions corresponding to positions 24, 26, 36, 37, 60, 71, 74, 75, 76, 124, 133, 155, 167, 208, 317, and 321 of SEQ ID NO: 1.

69. The method or computer-implemented method of any of embodiments 59 to 68, wherein the xylanase variant has xylanase activity and wherein the xylanase variant has at least 60%, e.g., at least 65%, at least 70%, at least 75%, at least 80%, at least 85%, at least 90%, at least 95%, at least 96%, at least 97%, at least 98%, or at least 99%, but less than 100% sequence identity to SEQ ID NO: 1, 2, 3, 4, 5 or 6.

70. The method or computer-implemented method of any of embodiments 59 to 69, wherein the xylanase variant has an improved property relative to the parent, wherein the improved property is selected from the group consisting of catalytic efficiency, catalytic rate, chemical stability, oxidation stability, pH activity, pH stability, specific activity, stability under storage conditions, substrate binding, substrate cleavage, substrate specificity, substrate stability, surface properties, thermal activity, and thermostability.

71. The method or computer-implemented method of any of embodiments 59 to 71 wherein the xylanase variant has improved thermostability.

The present invention will be further illustrated by the following examples.

EXAMPLES

Example 1: In Vivo Broiler Trial; Corn A/X Ratio of 0.82

The study evaluated different levels of dietary xylanase (SEQ ID NO 2), alpha-galactosidase (SEQ ID NO 17) and multi-carbohydrase (RVB) in a corn-based diet with a corn A/X corn fiber fraction of 0.82 compared to control basal diet fed broilers.

Materials and Methods

Trial (BR 190307) was performed from Oct. 24 to Dec. 5, 2019 at a Research Center in Brazil for DSM Nutritional Products.

Animals and Housing

1400 Day-old male broiler chickens (Cobb 500) were supplied by a commercial hatchery.

On the day of arrival (day 1), the chickens were divided by weight into groups of 25 birds. Each group was placed in one floor-pen littered with wood shavings and allocated to one of the different treatments. Each treatment was replicated with 8 groups. Chickens were housed in an environmentally controlled room. The room temperature was adapted to the age of the birds. In the first few days an additional infra-red electric heating lamp was placed in each pen.

Feeding and Treatments

The experimental diets (Starter, Grower and Finisher) were standard corn based mash diets with a corn A/X corn fiber fraction of 0.82. The broilers were treated for 42 days. The xylanase of SEQ ID NO 2 was used in the concentrations indicated in table 3. The α-galactosidase of SEQ ID NO 17 was used in the concentrations indicated in table 3. A multicomponent carbohydrase composition, commercially available as Rovabio® Advance (further referred to as "RVB"), was used in the concentrations indicated in table 3. Diets were fed either as a non-supplemented, low energy diet (negative control), a non-supplemented, high energy diet (positive control) or as a low energy diet supplemented with SEQ ID NO 2, SEQ ID NO 2 and SEQ ID NO 17 or RVB. The treatments were as follows (Table 3):

1. Positive Control (PC): high energy basal diet with no enzyme
2. Negative Control (NC): low energy basal diet with no enzyme
3. NC+RVB: low energy basal diet with 500 ppm multi-carbohydrase
4. NC+5 SEQ ID NO 2: low energy basal diet with 5 mg/kg xylanase SEQ ID NO 2
5. NC+5 SEQ ID NO 2+2 SEQ ID NO 17: low energy basal diet with 5 mg/kg xylanase SEQ ID NO 2 and 5 mg/kg alpha-galactosidase SEQ ID NO 17
6. NC+2 SEQ ID NO 2: low energy basal diet with 2 mg/kg xylanase SEQ ID NO 2
7. NC+2 SEQ ID NO 2+2 SEQ ID NO 17: low energy basal diet with 2 mg/kg xylanase SEQ ID NO 2 and 5 mg/kg alpha-galactosidase SEQ ID NO 17

TABLE 3

Treatments

| Diet | Starter period (day 0-14) SEQ ID NO 2 (mg/kg) | Starter period (day 0-14) SEQ ID NO 17 (mg/kg) | Energy (kcal/kg) Starter period (day 0-14) | Energy (kcal/kg) Grower period (14-28) | Energy (kcal/kg) Finisher period (28-42) |
|---|---|---|---|---|---|
| 1 | 0 | 0 | 3 050 | 3 100 | 3 200 |
| 2 | 0 | 0 | 2 975 | 3 000 | 3 075 |
| 3 | 0' | 0 | 2 975 | 3 000 | 3 075 |
| 4 | 5 | 0 | 2 975 | 3 000 | 3 075 |
| 5 | 5 | 2 | 2 975 | 3 000 | 3 075 |
| 6 | 2 | 0 | 2 975 | 3 000 | 3 075 |
| 7 | 2 | 2 | 2 975 | 3 000 | 3 075 |

Experimental Parameters and Analyses

On day 14, 21 and day 42, body weight gain (kg) was measured and feed conversion ratio (g/g) was calculated.

Results and Discussion

Xylanase supplementation at 5 mg/kg improved BWG by 11-97 g compared with birds fed the NC and comparable to birds fed the PC.

Xylanase supplementation at 2 mg/kg improved BWG by 5-54 g compared with birds fed the NC and comparable to birds fed the PC.

Xylanase supplementation at 5 mg/kg with alpha-galactosidase increased BWG comparable to birds fed the PC.

Xylanase supplementation at 5 mg/kg with alpha-galactosidase improved FCR comparable to birds fed the PC.

Xylanase supplementation at 5 mg/kg improved FCR by 0.042-0.069 compared with birds fed the NC and comparable to birds fed the PC.

Xylanase supplementation at 2 mg/kg improved FCR by 0.026-0.052 compared with birds fed the NC and comparable to birds fed the PC.

RVB supplementation improved BWG and FCR comparable to birds fed the PC.

TABLE 4

Growth performance

| Diet | Starter period (day 0-14) Body weight gain (kg) | Starter period (day 0-14) FCR (g/g) | Grower period (14-28) Body weight gain (kg) | Grower period (14-28) FCR (g/g) | Finisher period (28-42) Body weight gain (kg) | Finisher period (28-42) FCR (g/g) |
|---|---|---|---|---|---|---|
| 1 | 0.509 | 1.165 | 1.803 | 1.341 | 3.499 | 1.499 |
| 2 | 0.483 | 1.254 | 1.710 | 1.440 | 3.359 | 1.626 |
| 3 | 0.591 | 1.208 | 1.751 | 1.398 | 3.411 | 1.569 |
| 4 | 0.494 | 1.212 | 1.765 | 1.382 | 3.438 | 1.557 |
| 5 | 0.506 | 1.200 | 1.796 | 1.358 | 3.483 | 1.514 |
| 6 | 0.488 | 1.228 | 1.750 | 1.388 | 3.413 | 1.574 |
| 7 | 0.498 | 1.207 | 1.767 | 1.372 | 3.426 | 1.553 |

Example 2: In Vivo Broiler Trial; Corn A/X Ratio of 0.71

The study evaluated different levels of dietary xylanase (SEQ ID NO 2), alpha-galactosidase (SEQ ID NO 17) and multi-carbohydrase (RVB) in a corn based diet with a corn A/X corn fiber fraction of 0.71 compared to control basal diet fed broilers.

Materials and Methods

Trial (BR 190306) was performed from Sep. 12 to Oct. 24, 2019 at a Research Center in Brazil for DSM Nutritional Products.

Animals and Housing 2 625 Day-old male broiler chickens (Ross AP91) were supplied by a commercial hatchery.

On the day of arrival (day 1), the chickens were divided by weight into groups of 25 birds. Each group was placed in one floor-pen littered with wood shavings and allocated to one of the different treatments. Each treatment was replicated with 15 groups. Chickens were housed in an environmentally controlled room. The room temperature was adapted to the age of the birds. In the first few days an additional infra-red electric heating lamp was placed in each pen.

Feeding and Treatments

The experimental diets (Starter, Grower and Finisher) were standard corn based mash diets with a corn A/X fiber fraction of 0.71. The broilers were treated for 42 days. The xylanase of SEQ ID NO 2 was used in the concentrations indicated in table 5. The α-galactosidase of SEQ ID NO 17 was used in the concentrations indicated in table 5. A multicomponent carbohydrase composition, commercially available as Rovabio® Advance (further referred to as "RVB"), was used in the concentrations indicated in table 5. Diets were fed either as a non-supplemented, low energy diet (negative control), a non-supplemented, high energy diet (positive control) or as a low energy diet supplemented with SEQ ID NO 2, SEQ ID NO 2 and SEQ ID NO 17 or RVB. The treatments were as follows (Table 5):

1. Positive Control (PC): high energy basal diet with no enzyme
2. Negative Control (NC): low energy basal diet with no enzyme
3. NC+RVB: low energy basal diet with 500 ppm multi-carbohydrase
4. NC+5 SEQ ID NO 2: low energy basal diet with 5 mg/kg xylanase SEQ ID NO 2

5. NC+5 SEQ ID NO 2+2 SEQ ID NO 17: low energy basal diet with 5 mg/kg xylanase SEQ ID NO 2 and 5 mg/kg alpha-galactosidase SEQ ID NO 17
6. NC+2 SEQ ID NO 2: low energy basal diet with 2 mg/kg xylanase SEQ ID NO 2
7. NC+2 SEQ ID NO 2+2 SEQ ID NO 17: low energy basal diet with 2 mg/kg xylanase SEQ ID NO 2 and 5 mg/kg alpha-galactosidase SEQ ID NO 17

TABLE 5

| Treatments | | | | | |
|---|---|---|---|---|---|
| | Starter period (day 0-14) | | Energy (kcal/kg) | | |
| Diet | SEQ ID NO 2 (mg/kg) | SEQ ID NO 17 (mg/kg) | Starter period (day 0-14) | Grower period (14-28) | Finisher period (28-42) |
| 1 | 0 | 0 | 3 050 | 3 100 | 3 200 |
| 2 | 0 | 0 | 2 975 | 3 000 | 3 075 |
| 3 | 0' | 0 | 2 975 | 3 000 | 3 075 |
| 4 | 5 | 0 | 2 975 | 3 000 | 3 075 |
| 5 | 5 | 2 | 2 975 | 3 000 | 3 075 |
| 6 | 2 | 0 | 2 975 | 3 000 | 3 075 |
| 7 | 2 | 2 | 2 975 | 3 000 | 3 075 |

Experimental Parameters and Analyses

On day 14, 21 and day 42, body weight gain (kg) was measured and feed conversion ratio (g/g) was calculated.

Results and Discussion

Xylanase supplementation at 5 mg/kg improved BWG by 5-29 g compared with birds fed the NC and comparable to birds fed the PC.

Xylanase supplementation at 2 mg/kg improved BWG by 13-36 g compared with birds fed the NC and comparable to birds fed the PC.

TABLE 6

| Growth performance | | | | | | |
|---|---|---|---|---|---|---|
| | Starter period (day 0-14) | | Grower period (14-28) | | Finisher period (28-42) | |
| Diet | Body weight gain (kg) | FCR (g/g) | Body weight gain (kg) | FCR (g/g) | Body weight gain (kg) | FCR (g/g) |
| 1 | 0.331 | 1.458 | 1.400 | 1.404 | 2.916 | 1.537 |
| 2 | 0.320 | 1.505 | 1.329 | 1.451 | 2.814 | 1.575 |
| 3 | 0.323 | 1.480 | 1.341 | 1.461 | 2.811 | 1.603 |
| 4 | 0.325 | 1.495 | 1.358 | 1.458 | 2.791 | 1.595 |
| 5 | 0.326 | 1.487 | 1.342 | 1.458 | 2.808 | 1.591 |
| 6 | 0.333 | 1.461 | 1.365 | 1.447 | 2.825 | 1.579 |
| 7 | 0.322 | 1.516 | 1.433 | 1.461 | 2.793 | 1.608 |

Example 3: In Vivo Broiler Trial; Corn A/X Ratio of 0.74

The study evaluated different levels of dietary xylanase (SEQ ID NO 2), alpha-galactosidase (SEQ ID NO 17) and multi-carbohydrase (RVB) in a corn-based diet with a corn A/X corn fiber fraction of 0.74 compared to control basal diet fed broilers.

Materials and Methods

Trial (CS0619-07) was performed from Aug. 5 to Sep. 16, 2019 at a Research Center in USA for DSM Nutritional Products.

Animals and Housing 2 100 Day-old male broiler chickens (Hubbard-Cobb) were supplied by a commercial hatchery.

On the day of arrival (day 1), the chickens were divided by weight into groups of 20 birds. Each group was placed in one floor-pen littered with wood shavings and allocated to one of the different treatments. Each treatment was replicated with 15 groups. Chickens were housed in an environmentally controlled room. The room temperature was adapted to the age of the birds. In the first few days an additional infra-red electric heating lamp was placed in each pen.

Feeding and Treatments

The experimental diets (Starter, Grower and Finisher) were standard corn based mash diets with a corn A/X fiber fraction of 0.74. The broilers were treated for 42 days. The xylanase of SEQ ID NO 2 was used in the concentrations indicated in table 7. The α-galactosidase of SEQ ID NO 17 was used in the concentrations indicated in table 7. A multicomponent carbohydrase composition, commercially available as Rovabio® Advance (further referred to as "RVB"), was used in the concentrations indicated in table 7. Diets were fed either as a non-supplemented, low energy diet (negative control), a non-supplemented, high energy diet (positive control) or as a low energy diet supplemented with SEQ ID NO 2, SEQ ID NO 2 and SEQ ID NO 17 or RVB. The treatments were as follows (Table 7):

1. Positive Control (PC): high energy basal diet with no enzyme
2. Negative Control (NC): low energy basal diet with no enzyme
3. NC+RVB: low energy basal diet with 500 ppm multi-carbohydrase
4. NC+5 SEQ ID NO 2: low energy basal diet with 5 mg/kg xylanase SEQ ID NO 2
5. NC+5 SEQ ID NO 2+2 SEQ ID NO 17: low energy basal diet with 5 mg/kg xylanase SEQ ID NO 2 and 5 mg/kg alpha-galactosidase SEQ ID NO 17
6. NC+2 SEQ ID NO 2: low energy basal diet with 2 mg/kg xylanase SEQ ID NO 2
7. NC+2 SEQ ID NO 2+2 SEQ ID NO 17: low energy basal diet with 2 mg/kg xylanase SEQ ID NO 2 and 5 mg/kg alpha-galactosidase SEQ ID NO 17

TABLE 7

| Treatments | | | | | |
|---|---|---|---|---|---|
| | Starter period (day 0-14) | | Energy (kcal/kg) | | |
| Diet | SEQ ID NO 2 (mg/kg) | SEQ ID NO 17 (mg/kg) | Starter period (day 0-14) | Grower period (14-28) | Finisher period (28-42) |
| 1 | 0 | 0 | 3 050 | 3 100 | 3 200 |
| 2 | 0 | 0 | 2 975 | 3 000 | 3 075 |
| 3 | 0' | 0 | 2 975 | 3 000 | 3 075 |
| 4 | 5 | 0 | 2 975 | 3 000 | 3 075 |
| 5 | 5 | 2 | 2 975 | 3 000 | 3 075 |
| 6 | 2 | 0 | 2 975 | 3 000 | 3 075 |
| 7 | 2 | 2 | 2 975 | 3 000 | 3 075 |

Experimental Parameters and Analyses

On day 14, 21 and day 42, body weight gain (kg) was measured and feed conversion ratio (g/g) was calculated.

Results and Discussion

Xylanase supplementation at 5 mg/kg improved BWG by 8-75 g compared with birds fed the NC and comparable to birds fed the PC.

Xylanase supplementation at 2 mg/kg improved BWG by 2-26 g compared with birds fed the NC and comparable to birds fed the PC.

Xylanase supplementation at 5 mg/kg improved FCR by 0.013-0.043 compared with birds fed the NC and comparable to birds fed the PC.

Xylanase supplementation at 2 mg/kg improved FCR by 0.001-0.016 compared with birds fed the NC and comparable to birds fed the PC.

Xylanase supplementation at 5 mg/kg with alpha-galactosidase improved BWG by 75-90 g compared with birds fed the NC and comparable to birds fed the PC.

Xylanase supplementation at 5 mg/kg with alpha-galactosidase showed improved FCR comparable to birds fed the PC.

Xylanase supplementation at 2 mg/kg with alpha-galactosidase improved BWG by 48 g and this was comparable with birds fed the PC.

Birds fed the RVB show improved FCR when compared with birds fed the NC.

TABLE 8

Growth performance

| Diet | Starter period (day 0-14) | | Grower period (14-28) | | Finisher period (28-42) | |
|---|---|---|---|---|---|---|
| | Body weight gain (kg) | FCR (g/g) | Body weight gain (kg) | FCR (g/g) | Body weight gain (kg) | FCR (g/g) |
| 1 | 0.404 | 1.147 | 1.368 | 1.415 | 2.652 | 1.713 |
| 2 | 0.393 | 1.164 | 1.316 | 1.453 | 2.541 | 1.773 |
| 3 | 0.398 | 1.150 | 1.342 | 1.432 | 2.594 | 1.740 |
| 4 | 0.401 | 1.151 | 1.350 | 1.425 | 2.616 | 1.730 |
| 5 | 0.402 | 1.146 | 1.357 | 1.420 | 2.631 | 1.721 |
| 6 | 0.395 | 1.154 | 1.328 | 1.442 | 2.567 | 1.757 |
| 7 | 0.397 | 1.159 | 1.338 | 1.434 | 2.589 | 1.746 |

Conclusion

The supplementation of the basal feed having a high corn A/X ratio of 0.82 with xylanase led to a significantly improved FCR and body weight gain.

The supplementation of the basal feed having a medium corn A/X ratio of 0.74 with xylanase led to an improved FCR and body weight gain.

The supplementation of the basal feed having a low corn A/X ratio of 0.71 with xylanase led to small to no improvement in FCR and body weight gain.

The same trend can be observed for supplementation with the multi-carbohydrase RVB and alpha-galactosidase.

Example 4: In Vivo Broiler Trial; Different Corn A/X Ratios 2 broiler studies were conducted using the same experimental design between 2020-2021

Study 1: Cobb 500 male broilers were raised from hatch to day 42. There were 19 birds/pen and 16 replicate pens/diet. The study was conducted in the US, using corn and soybean meal-based diets as indicated in table 10. Diets were nutrient adequate with the exception of apparent metabolizable energy (AME) in the negative control (NC) as indicated in table 9.

Study 2: Ross 708 male broilers were raised from hatch to day 42. There were 20 birds/pen and 16 replicate pens/diet. The study was conducted in the US using corn and soybean meal-based diets as indicated in table 10. Diets were nutrient adequate with the exception of apparent metabolizable energy (AME) in the negative control (NC) as indicated in table 9.

Diets were fed either as a non-supplemented, low energy diet (negative control), a non-supplemented, high energy diet (positive control) or as a low energy diet supplemented with Cornsoyzyme according to table 9. The term Cornsoyzyme refers to the addition of a xylanase of SEQ ID NO 16 in the amount of 93 g/MT and an $\alpha$-galactosidase as defined in WO1994/23022 by the corrected amino acid sequence of the alpha-galactosidase SEQ ID NO:4 in the amount of 37 g/MT.

TABLE 9

Description of the experimental diets used in study 1 and 2

| Diet | Basal diet[1] | AME, kcal/kg reduction in the starter, grower, finisher diets | Cornsoyzyme | Dose [g/MT] |
|---|---|---|---|---|
| 1 | Positive control (PC) | Nutrient adequate at each feeding phase | No | 0 |
| 2 | Negative control (NC) | minus 100, 125 and 150 kcal/kg in the starter, grower and finisher, respectively | No | 0 |
| 3 | | | Yes | 93 + 37 |

[1]All diets included 1,000 FYT/kg Ronozyme HiPhos (commercially available preparation of 6-phytase)

TABLE 10

Example experimental diets in the starter, grower and finisher phase

| Ingredient | Starter PC | Starter NO | Grower PC | Grower NC | Finisher PC | Finisher NC |
|---|---|---|---|---|---|---|
| Corn | 56.58% | 58.75% | 60.23% | 62.94% | 61.73% | 64.99% |
| Soybean meal | 37.72% | 37.37% | 34.07% | 33.63% | 31.90% | 31.38% |
| Soya oil | 2.20% | 0.37% | 2.57% | 0.28% | 3.68% | 0.93% |
| Salt | 0.29% | 0.29% | 0.27% | 0.27% | 0.31% | 0.31% |
| Limestone | 0.48% | 0.48% | 0.46% | 0.47% | 0.43% | 0.43% |
| Dicalcium Phos, 17% P | 1.63% | 1.63% | 1.45% | 1.45% | 1.19% | 1.19% |
| Sodium Bicarbonate | 0.20% | 0.20% | 0.15% | 0.15% | 0.10% | 0.10% |
| Lysine HCl | 0.19% | 0.20% | 0.17% | 0.18% | 0.11% | 0.12% |
| DL-Methionine | 0.35% | 0.34% | 0.31% | 0.31% | 0.28% | 0.28% |
| Threonine | 0.11% | 0.11% | 0.06% | 0.06% | 0.02% | 0.02% |

TABLE 10-continued

Example experimental diets in the starter, grower and finisher phase

| Ingredient | Starter PC | Starter NO | Grower PC | Grower NC | Finisher PC | Finisher NC |
|---|---|---|---|---|---|---|
| Vitamin & Mineral premix | 0.20% | 0.20% | 0.20% | 0.20% | 0.20% | 0.20% |
| Sacox 60 (coccidiostat) | 0.042% | 0.042% | 0.04% | 0.04% | 0.04% | 0.04% |
| Ronozyme HiPhos (10,000 FYT/g) | 0.01% | 0.01% | 0.01% | 0.01% | 0.01% | 0.01% |
| TOTAL | 100.0% | 100.0% | 100.00% | 100.00% | 100.00% | 100.00% |
| Crude protein % | 22.00 | 22.00 | 20.50 | 20.50 | 19.50 | 19.50 |
| Poult ME kcal/kg | 3025.00 | 2925.00 | 3100.00 | 2975.00 | 3200.00 | 3050.00 |
| DM, % | 88.09 | 87.85 | 88.04 | 87.75 | 88.10 | 87.74 |
| Calcium % | 0.90 | 0.90 | 0.84 | 0.84 | 0.76 | 0.76 |
| Phos % | 0.65 | 0.65 | 0.60 | 0.60 | 0.55 | 0.55 |
| nPP % | 0.38 | 0.38 | 0.34 | 0.34 | 0.29 | 0.29 |
| Crude Fibre % | 2.79 | 2.82 | 2.73 | 2.78 | 2.68 | 2.74 |
| D Met + Cys % | 0.91 | 0.91 | 0.85 | 0.85 | 0.80 | 0.80 |
| D Lys % | 1.22 | 1.22 | 1.12 | 1.12 | 1.02 | 1.02 |
| D Tryp % | 0.26 | 0.26 | 0.24 | 0.24 | 0.23 | 0.23 |
| D Thr % | 0.83 | 0.83 | 0.73 | 0.73 | 0.66 | 0.66 |
| Available P % | 0.45 | 0.45 | 0.42 | 0.42 | 0.38 | 0.38 |
| Na % | 0.20 | 0.20 | 0.18 | 0.18 | 0.18 | 0.18 |
| Cl % | 0.25 | 0.25 | 0.24 | 0.25 | 0.25 | 0.26 |

TABLE 11

Analyzed non-starch polysaccharide, arabinose and xylose content of the corn used in the experimental diets

| Parameter | Study 1 | Study 2 |
|---|---|---|
| Soluble NSP | 0.30 | 0.30 |
| Insoluble NSP | 6.70 | 6.10 |
| Total NSP | 7.10 | 6.40 |
| Soluble Arabinose (calculated) | 0.00 | 0.16 |
| Insoluble Arabinose | 1.60 | 1.31 |
| Total Arabinose | 1.60 | 1.47 |
| Soluble Xylose (calculated) | 0.00 | 0.12 |
| Insoluble Xylose | 2.30 | 2.10 |
| Total Xylose | 2.30 | 2.22 |
| A:X ratio | 0.70 | 0.66 |

(calc) = calculated values from total and insoluble.

TABLE 12

Growth performance of birds in study 1 from hatch to day 42 post-hatch

| Diet | Treatment | Feed intake [g] | BW gain [g] | mFCR [g:g] | BWcFCR[1] [g:g] | Mortality [%] |
|---|---|---|---|---|---|---|
| 1 | Positive control | 4,593$^{b}$ | 3,075 | 1.491$^{b}$ | 1.493 | 4.73$^{ab}$ |
| 2 | Negative control (NC) | 4,714$^{a}$ | 3,080 | 1.520$^{a}$ | 1.516 | 2.91$^{b}$ |
| 3 | NC + c | 4,717$^{a}$ | 3,115 | 1.515$^{a}$ | 1.503 | 7.25$^{a}$ |
| | Pooled SEM | 28 | 23 | 0.007 | 0.012 | 1.46 |
| | Diet P-value | 0.0031 | 0.4594 | 0.0346 | 0.5392 | 0.0219 |

[1]30 g improvement in BW gain compared with the negative control = 1 pt in FCR.

TABLE 13

Growth performance of birds in study 2 from hatch to day 42 post-hatch

| Diet | Treatment | Feed intake [g] | BW gain [g] | FCR [g:g] | BWcFCR[1] [g:g] | Mortality [%] |
|---|---|---|---|---|---|---|
| 1 | Positive control | 4,960$^{ab}$ | 3,327$^{ab}$ | 1.479 | 1.501$^{b}$ | 3.8 |
| 2 | Negative control (NC) | 5,136$^{a}$ | 3,409$^{a}$ | 1.511 | 1.511$^{b}$ | 6.0 |
| 3 | NC + Cornsoyzyme | 4,913$^{b}$ | 3,265$^{b}$ | 1.514 | 1.568$^{a}$ | 4.4 |
| | Pooled SEM | 59 | 35 | 0.014 | 0.020 | 1.6 |
| | Diet P-value | 0.0706 | 0.0299 | 0.2369 | 0.0253 | 0.3708 |

[1]30 g improvement in BW gain compared with the negative control = 1 pt in FCR.

Results and Discussion

Mortality corrected FCR (mFCR) was not influenced by supplementation with Cornsoyzyme in diets containing corn with an A:X ratio≤0.70 and improved by 0.5 FCR points when the corn had an A:X ratio of 0.70 (table 14, FIG. 9).

Body weight corrected FCR was not or was negatively influenced by supplementation with Cornsoyzyme n diets containing corn with an A:X ratio≤0.70 and improved by 1.3 FCR points when the corn had an A:X ratio of 0.70 (table 15, FIG. 11).

TABLE 14

Mortality corrected feed conversion ratio, day 0 to 42

| mFCR, day 0 to 42 | Study 2 | Study 1 |
|---|---|---|
| A:X ratio of corn | 0.66 | 0.70 |
| NC | 1.511 | 1.520 |
| NC + CSZ | 1.514 | 1.515 |
| Delta, points in FCR | 0.3 | −0.5 |

TABLE 15

| Body weight corrected feed conversion ratio, day 0 to 42 | | |
|---|---|---|
| BWcFCR, day 0 to 42 | Study 2 | Study 1 |
| A:X ratio of corn | 0.66 | 0.70 |
| NC | 1.511 | 1.516 |
| NC + CSZ | 1.568 | 1.503 |
| Delta, points in FCR | 5.7 | −1.3 |

The invention described and claimed herein is not to be limited in scope by the specific aspects herein disclosed, since these aspects are intended as illustrations of several aspects of the invention. Any equivalent aspects are intended to be within the scope of this invention. Indeed, various modifications of the invention in addition to those shown and described herein will become apparent to those skilled in the art from the foregoing description. Such modifications are also intended to fall within the scope of the appended claims. In the case of conflict, the present disclosure including definitions will control.

What is claimed is:

1. A method of composing an animal feed comprising corn and at least one carbohydrase and has an A/X ((mass of arabinoxylans)/(mass of xylose)) corn ratio greater than 0.70, greater than 0.705, greater than 0.71, greater than 0.715, greater than 0.72, greater than 0.725, greater than 0.73, greater than 0.735, greater than 0.74, greater than 0.745, greater than 0.75, greater than 0.76, greater than 0.77, greater than 0.78, greater than 0.79, or greater than 0.80, wherein the method comprises the steps of:

A) subjecting a sample of animal feed to:

A1) near infrared (NIR) spectroscopy to obtain an NIR spectrum;

A2) matching the absorption intensities at the respective wavelengths or wavenumbers in the NIR spectrum obtained in A1) with a calibration graph or equation;

A3) a quantitative analysis of the arabinoxylans and xylose in the sample; and

A4) a determination of the A/X corn ratio in the sample of animal feed;

B) quantitative evaluation of the BWcFCR factor using Equation 2:

Effect of Carbohydrase on BWcFCR vs NC(Body Weight corrected Feed Conversion Ratio versus NC(negative control))=6.127216113+ 0.1347057461*Carbohydrase dose- $$15.9027776*A/X\ corn\ ratio-0.189932808*Carbohydrase\ dose*A/X\ corn\ ratio+10.264604897*(A/X\ corn\ ratio)^2,$$ wherein Carbohydrase dose is mg of carbohydrase/kg animal feed, and wherein Effect of Carbohydrase on BWcFCR vs NC is the calculated FCR (feed conversion ratio) when animals are fed a diet with addition of carbohydrase compared to animals fed the same diet without addition of carbohydrase, and C) adding an amount of at least one carbohydrase to the animal feed in the amount determined to achieve a lower BWcFCR using Equation 2.

2. The method according to claim 1, wherein the step A2) further comprises the step of generating a calibration graph or equation by following the steps of:

A-i) subjecting a sample of an animal feed as in step A) of claim 1 to near infrared (NIR) spectroscopy;

A-ii) matching the absorption intensities at the respective wavelengths or wavenumbers in the NIR spectrum obtained in step A-i) with the corresponding parameters and their values determined in claim 1 wherein the sample is subjected to a1) a quantitative analysis of the A/X corn ratio in the sample and a2) a determination of the A/X corn ratio in the total amount of the animal feed; and, A-iii) plotting the matching of step A-ii) as a calibration graph and/or expressing the parameters determined in steps al) and a2) in a calibration equation as a function of the absorption intensities at the respective wavelengths or wavenumbers matched in step A-ii).

* * * * *

```
                         SEQUENCE LISTING


<160> NUMBER OF SEQ ID NOS: 17

<210> SEQ ID NO 1
<211> LENGTH: 391
<212> TYPE: PRT
<213> ORGANISM: Bacillus subtilis

<400> SEQUENCE: 1

Ala Ala Ser Asp Val Thr Val Asn Val Ser Ala Glu Lys Gln Val Ile
1               5                   10                  15

Arg Gly Phe Gly Gly Met Asn His Pro Ala Trp Ala Gly Asp Leu Thr
            20                  25                  30

Ala Ala Gln Arg Glu Thr Ala Phe Gly Asn Gly Gln Asn Gln Leu Gly
        35                  40                  45

Phe Ser Ile Leu Arg Ile His Val Asp Glu Asn Arg Asn Asn Trp Tyr
    50                  55                  60

Lys Glu Val Glu Thr Ala Lys Ser Ala Val Lys His Gly Ala Ile Val
65                  70                  75                  80

Phe Ala Ser Pro Trp Asn Pro Pro Ser Asp Met Val Glu Thr Phe Asn
                85                  90                  95

Arg Asn Gly Asp Thr Ser Ala Lys Arg Leu Lys Tyr Asn Lys Tyr Ala
            100                 105                 110

Ala Tyr Ala Gln His Leu Asn Asp Phe Val Thr Phe Met Lys Asn Asn
        115                 120                 125

Gly Val Asn Leu Tyr Ala Ile Ser Val Gln Asn Glu Pro Asp Tyr Ala
    130                 135                 140

His Glu Trp Thr Trp Trp Thr Pro Gln Glu Ile Leu Arg Phe Met Arg
145                 150                 155                 160

Glu Asn Ala Gly Ser Ile Asn Ala Arg Val Ile Ala Pro Glu Ser Phe
                165                 170                 175

Gln Tyr Leu Lys Asn Leu Ser Asp Pro Ile Leu Asn Asp Pro Gln Ala
            180                 185                 190

Leu Ala Asn Met Asp Ile Leu Gly Thr His Leu Tyr Gly Thr Gln Val
        195                 200                 205

Ser Gln Phe Pro Tyr Pro Leu Phe Lys Gln Lys Gly Ala Gly Lys Asp
    210                 215                 220

Leu Trp Met Thr Glu Val Tyr Tyr Pro Asn Ser Asp Thr Asn Ser Ala
225                 230                 235                 240

Asp Arg Trp Pro Glu Ala Leu Asp Val Ser Gln His Ile His Asn Ala
                245                 250                 255

Met Val Glu Gly Asp Phe Gln Ala Tyr Val Trp Trp Tyr Ile Arg Arg
            260                 265                 270

Ser Tyr Gly Pro Met Lys Glu Asp Gly Thr Ile Ser Lys Arg Gly Tyr
        275                 280                 285

Asn Met Ala His Phe Ser Lys Phe Val Arg Pro Gly Tyr Val Arg Ile
```

```
    290                 295                 300

Asp Ala Thr Lys Asn Pro Asn Ala Asn Val Tyr Val Ser Ala Tyr Lys
305                 310                 315                 320

Gly Asp Asn Lys Val Val Ile Val Ala Ile Asn Lys Ser Asn Thr Gly
                325                 330                 335

Val Asn Gln Asn Phe Val Leu Gln Asn Gly Ser Ala Ser Asn Val Ser
            340                 345                 350

Arg Trp Ile Thr Ser Ser Ser Ser Asn Leu Gln Pro Gly Thr Asn Leu
        355                 360                 365

Thr Val Ser Gly Asn His Phe Trp Ala His Leu Pro Ala Gln Ser Val
    370                 375                 380

Thr Thr Phe Val Val Asn Arg
385                 390


<210> SEQ ID NO 2
<211> LENGTH: 391
<212> TYPE: PRT
<213> ORGANISM: Bacillus subtilis

<400> SEQUENCE: 2

Ala Ala Asn Asp Val Thr Val Asn Ile Ser Ala Glu Lys Gln Val Ile
1               5                   10                  15

Arg Gly Phe Gly Gly Met Asn His Pro Ala Trp Val Gly Asp Leu Thr
            20                  25                  30

Ala Ala Gln Arg Glu Thr Ala Phe Gly Asn Gly Gln Asn Gln Leu Gly
        35                  40                  45

Phe Ser Ile Leu Arg Ile His Val Asp Glu Asn Arg Asn Asn Trp Tyr
    50                  55                  60

Lys Glu Val Glu Thr Ala Lys Ser Ala Ile Lys His Gly Ala Ile Val
65                  70                  75                  80

Phe Ala Ser Pro Trp Asn Pro Pro Ser Asn Met Val Glu Thr Phe Asn
                85                  90                  95

His Asn Gly Asp Thr Ser Ala Lys Arg Leu Arg Tyr Asp Lys Tyr Ala
            100                 105                 110

Ala Tyr Ala Gln His Leu Asn Asp Phe Val Thr Phe Met Lys Ser Asn
        115                 120                 125

Gly Val Asn Leu Tyr Ala Ile Ser Ile Gln Asn Glu Pro Asp Tyr Ala
    130                 135                 140

His Glu Trp Thr Trp Trp Thr Pro Gln Glu Ile Leu Arg Phe Met Arg
145                 150                 155                 160

Glu Asn Ala Gly Ser Ile Asn Ala Arg Val Ile Ala Pro Glu Ser Phe
                165                 170                 175

Gln Tyr Leu Lys Asn Leu Ser Asp Pro Ile Leu Asn Asp Pro Gln Ala
            180                 185                 190

Leu Ala Asn Met Asp Ile Leu Gly Thr His Leu Tyr Gly Thr Gln Val
        195                 200                 205

Ser Gln Phe Pro Tyr Pro Leu Phe Lys Gln Lys Gly Ala Gly Lys Asp
    210                 215                 220

Leu Trp Met Thr Glu Val Tyr Tyr Pro Asn Ser Asp Asn Asn Ser Ala
225                 230                 235                 240

Asp Arg Trp Pro Glu Ala Leu Asp Val Ser Gln His Ile His Asn Ser
                245                 250                 255

Met Val Glu Gly Asp Phe Gln Ala Tyr Val Trp Trp Tyr Ile Arg Arg
            260                 265                 270
```

```
Ser Tyr Gly Pro Met Lys Glu Asp Gly Thr Ile Ser Lys Arg Gly Tyr
        275                 280                 285

Asn Met Ala His Phe Ser Lys Phe Val Arg Pro Gly Tyr Val Arg Ile
    290                 295                 300

Asp Ala Thr Lys Asn Pro Asn Pro Asn Val Tyr Val Ser Ala Tyr Lys
305                 310                 315                 320

Gly Asp Asn Lys Val Val Ile Val Ala Ile Asn Lys Ser Asn Thr Gly
                325                 330                 335

Val Asn Gln Asn Phe Val Leu Gln Asn Gly Ser Ala Ser Gln Val Ser
            340                 345                 350

Arg Trp Ile Thr Ser Ser Asn Ser Asn Leu Gln Pro Gly Thr Asn Leu
        355                 360                 365

Lys Val Thr Asp Asn His Phe Trp Ala His Leu Pro Ala Gln Ser Val
    370                 375                 380

Thr Thr Phe Val Val Ile Arg
385                 390


<210> SEQ ID NO 3
<211> LENGTH: 392
<212> TYPE: PRT
<213> ORGANISM: Bacillus subtilis

<400> SEQUENCE: 3

Ala Ala Ser Asp Ala Thr Val Arg Leu Ser Ala Glu Lys Gln Val Ile
1               5                   10                  15

Arg Gly Phe Gly Gly Met Asn His Pro Ala Trp Ile Gly Asp Leu Thr
            20                  25                  30

Ala Ala Gln Arg Glu Thr Ala Phe Gly Asn Gly Gln Asn Gln Leu Gly
        35                  40                  45

Phe Ser Ile Leu Arg Ile His Val Asp Glu Asn Arg Asn Asn Trp Tyr
    50                  55                  60

Arg Glu Val Glu Thr Ala Lys Ser Ala Ile Lys His Gly Ala Ile Val
65                  70                  75                  80

Phe Ala Ser Pro Trp Asn Pro Pro Ser Asp Met Val Glu Thr Phe Asn
                85                  90                  95

Arg Asn Gly Asp Thr Ser Ala Lys Arg Leu Arg Tyr Asp Lys Tyr Ala
            100                 105                 110

Ala Tyr Ala Lys His Leu Asn Asp Phe Val Thr Phe Met Lys Asn Asn
        115                 120                 125

Gly Val Asn Leu Tyr Ala Ile Ser Val Gln Asn Glu Pro Asp Tyr Ala
    130                 135                 140

His Asp Trp Thr Trp Trp Thr Pro Gln Glu Ile Leu Arg Phe Met Lys
145                 150                 155                 160

Glu Asn Ala Gly Ser Ile Asn Ala Arg Val Ile Ala Pro Glu Ser Phe
                165                 170                 175

Gln Tyr Leu Lys Asn Ile Ser Asp Pro Ile Val Asn Asp Pro Lys Ala
            180                 185                 190

Leu Ala Asn Met Asp Ile Leu Gly Ala His Leu Tyr Gly Thr Gln Leu
        195                 200                 205

Asn Asn Phe Ala Tyr Pro Leu Phe Lys Gln Lys Gly Ala Gly Lys Asp
    210                 215                 220

Leu Trp Met Thr Glu Val Tyr Tyr Pro Asn Ser Asp Asn His Ser Ala
225                 230                 235                 240

Asp Arg Trp Pro Glu Ala Leu Asp Val Ser His His Ile His Asn Ser
                245                 250                 255
```

Met Val Glu Gly Asp Phe Gln Ala Tyr Val Trp Trp Tyr Ile Arg Arg
260 265 270

Ser Tyr Gly Pro Met Lys Glu Asp Gly Thr Ile Ser Lys Arg Gly Tyr
275 280 285

Asn Met Ala His Phe Ser Lys Phe Val Arg Pro Gly Tyr Val Arg Val
290 295 300

Asp Ala Thr Lys Ser Pro Ala Ser Asn Val Tyr Val Ser Ala Tyr Lys
305 310 315 320

Gly Asp Asn Lys Val Val Ile Val Ala Ile Asn Lys Asn Asn Ser Gly
325 330 335

Val Asn Gln Asn Phe Val Leu Gln Asn Gly Ser Val Ser Gln Val Ser
340 345 350

Arg Trp Ile Thr Ser Ser Ser Ser Asn Leu Gln Pro Gly Thr Asn Leu
355 360 365

Asn Val Thr Asp Asn His Phe Trp Ala His Leu Pro Ala Gln Ser Val
370 375 380

Thr Thr Phe Val Ala Asn Leu Arg
385 390

<210> SEQ ID NO 4
<211> LENGTH: 185
<212> TYPE: PRT
<213> ORGANISM: Bacillus subtilis

<400> SEQUENCE: 4

Ala Asn Thr Asp Tyr Trp Gln Asn Trp Thr Asp Gly Gly Gly Thr Val
1 5 10 15

Asn Ala Val Asn Gly Ser Gly Gly Asn Tyr Ser Val Asn Trp Ser Asn
20 25 30

Thr Gly Asn Phe Val Val Gly Lys Gly Trp Thr Thr Gly Ser Pro Phe
35 40 45

Arg Thr Ile Asn Tyr Asn Ala Gly Val Trp Ala Pro Asn Gly Asn Ala
50 55 60

Tyr Leu Thr Leu Tyr Gly Trp Thr Arg Ser Pro Leu Ile Glu Tyr Tyr
65 70 75 80

Val Val Asp Ser Trp Gly Thr Tyr Arg Pro Thr Gly Thr Tyr Lys Gly
85 90 95

Thr Val Tyr Ser Asp Gly Gly Thr Tyr Asp Val Tyr Thr Thr Thr Arg
100 105 110

Tyr Asp Ala Pro Ser Ile Asp Gly Asp Lys Thr Thr Phe Thr Gln Tyr
115 120 125

Trp Ser Val Arg Gln Ser Lys Arg Pro Thr Gly Ser Asn Ala Thr Ile
130 135 140

Thr Phe Ser Asn His Val Asn Ala Trp Lys Arg Tyr Gly Met Asn Leu
145 150 155 160

Gly Ser Asn Trp Ser Tyr Gln Val Leu Ala Thr Glu Gly Tyr Arg Ser
165 170 175

Ser Gly Ser Ser Asn Val Thr Val Trp
180 185

<210> SEQ ID NO 5
<211> LENGTH: 185
<212> TYPE: PRT
<213> ORGANISM: Bacillus subtilis

<400> SEQUENCE: 5

```
Ala Ser Thr Asp Tyr Trp Gln Asn Trp Thr Asp Gly Gly Gly Ile Val
1               5                   10                  15

Asn Ala Val Asn Gly Ser Gly Gly Asn Tyr Ser Val Asn Trp Ser Asn
            20                  25                  30

Thr Gly Asn Phe Val Val Gly Lys Gly Trp Thr Thr Gly Ser Pro Phe
        35                  40                  45

Arg Thr Ile Asn Tyr Asn Ala Gly Val Trp Ala Pro Asn Gly Asn Gly
    50                  55                  60

Tyr Leu Thr Leu Tyr Gly Trp Thr Arg Ser Pro Leu Ile Glu Tyr Tyr
65                  70                  75                  80

Val Val Asp Ser Trp Gly Thr Tyr Arg Pro Thr Gly Thr Tyr Lys Gly
                85                  90                  95

Thr Val Lys Ser Asp Gly Gly Thr Tyr Asp Ile Tyr Thr Thr Thr Arg
            100                 105                 110

Tyr Asn Ala Pro Ser Ile Asp Gly Asp Arg Thr Thr Phe Thr Gln Tyr
        115                 120                 125

Trp Ser Val Arg Gln Ser Lys Arg Pro Thr Gly Ser Asn Ala Thr Ile
    130                 135                 140

Thr Phe Ser Asn His Val Asn Ala Trp Lys Ser His Gly Met Asn Leu
145                 150                 155                 160

Gly Ser Asn Trp Ala Tyr Gln Val Met Ala Thr Glu Gly Tyr Gln Ser
                165                 170                 175

Ser Gly Ser Ser Asn Val Thr Val Trp
            180                 185


<210> SEQ ID NO 6
<211> LENGTH: 557
<212> TYPE: PRT
<213> ORGANISM: Bacillus subtilis

<400> SEQUENCE: 6

Ala Ser Asn Val Met Val Asn Leu Ala Ser Lys Lys Gln Val Ile Arg
1               5                   10                  15

Gly Phe Gly Gly Met Asn Ser Val Ala Trp Ala Gly Asp Leu Thr Ala
            20                  25                  30

Ala Gln Arg Glu Thr Ala Phe Gly Asn Gly Asn Asn Gln Leu Gly Leu
        35                  40                  45

Ser Val Val Arg Ile Phe Val Asp Asp Asn Lys Asn Asn Trp Tyr Lys
    50                  55                  60

Glu Leu Pro Thr Ala Lys Ser Ala Ile Ala His Gly Ser Ile Val Phe
65                  70                  75                  80

Ala Thr Pro Trp Asn Pro Pro Ser Ser Met Thr Glu Thr Phe Asn Arg
                85                  90                  95

Asn Gly Glu Lys Ala Lys Arg Leu Arg Tyr Asp Lys Tyr Gly Asp Tyr
            100                 105                 110

Ala Lys Tyr Leu Asn Asp Phe Val Ser Tyr Met Lys Asn Asn Gly Val
        115                 120                 125

Asn Leu Tyr Ala Ile Ser Val Gln Asn Glu Pro Asp Tyr Gly Arg Asp
    130                 135                 140

Trp Thr Trp Trp Thr Pro Gln Glu Val Leu Arg Phe Met Arg Asp Tyr
145                 150                 155                 160

Ala Gly Ser Ile Asn Cys Arg Val Met Ser Pro Glu Ser Phe Ser Tyr
                165                 170                 175

Gln Lys Asn Met Tyr Asp Pro Ile Leu Asn Asp Pro Lys Ala Leu Ala
```

```
            180                 185                 190

Asn Met Asp Ile Leu Gly Thr His Thr Tyr Gly Thr Gln Val Lys Asp
        195                 200                 205

Phe Pro Tyr Pro Leu Phe Lys Gln Lys Ala Ala Gly Lys Asp Leu Trp
    210                 215                 220

Met Thr Glu Val Tyr Val Pro Asn Ser Asp Ala Asn Ser Ala Asp Arg
225                 230                 235                 240

Trp Pro Glu Ala Leu Glu Val Ala Asn His Ile Asn Asn Ala Met Val
                245                 250                 255

Glu Gly Asp Phe Gln Ala Tyr Val Trp Trp Tyr Ile Arg Arg Ser Tyr
            260                 265                 270

Gly Leu Ile Lys Glu Asn Gly Ala Ile Ser Lys Arg Gly Tyr Met Met
        275                 280                 285

Ala His Phe Ser Lys Phe Val Arg Pro Gly Tyr Val Arg Val Asp Ala
    290                 295                 300

Thr Lys Asn Pro Val Gly Asn Val Tyr Val Ser Ala Tyr Thr Gly Asn
305                 310                 315                 320

Asn Lys Val Val Ile Val Ala Ile Asn Lys Gly Thr Tyr Pro Val Asn
                325                 330                 335

Gln Ser Phe Asn Ile Gln Asn Ser Thr Val Ser Asn Val Ser Ser Trp
            340                 345                 350

Val Thr Ser Gly Thr Leu Asn Met Ala Lys Thr Asn Ser Asn Ile Asn
        355                 360                 365

Ala Ala Asn Gly Arg Phe Asn Ala Ser Leu Pro Ala Gln Ser Val Thr
    370                 375                 380

Thr Phe Val Ala Asp Leu Asn Ser Thr Lys Pro Thr Thr Asn Pro Thr
385                 390                 395                 400

Thr Asn Pro Thr Pro Gly Ser Thr Val Thr Leu Asn Asn Gly Trp Tyr
                405                 410                 415

Tyr Ile Lys Asn Ile Asn Ala Gln Lys Tyr Leu Gln Val Ala Asn Asn
            420                 425                 430

Thr Gly Lys Ala Gly Gln Asn Val Glu Leu Gly Ser Gly Ser Gly Val
        435                 440                 445

Ala Gly Gln Lys Trp Tyr Leu Thr Asn Thr Gly Asp Gly Tyr Ile Thr
    450                 455                 460

Leu Lys Asn Ala Leu Gly Asn Tyr Met Leu Asp Val Ser Tyr Gly Glu
465                 470                 475                 480

Asn Lys Asp Gly Ser Asn Ile Gln Ile Phe Asn Ala Tyr Ser Gly Asp
                485                 490                 495

Ser Gln Lys Phe Ala Val Lys Ala Ser Ser Lys Asn Gly Gln Tyr Ser
            500                 505                 510

Val Ala Thr Lys Ser Ser Asn Gly Ser Lys Val Leu Asp Asp Tyr Asn
        515                 520                 525

Phe Gly Thr Ala Asp Gly Thr Asn Val Cys Gln Trp Thr Tyr Gly Gly
    530                 535                 540

Asn Ala Asn Gln Leu Trp Val Phe Glu Pro Thr Asn Asn
545                 550                 555
```

<210> SEQ ID NO 7
<211> LENGTH: 382
<212> TYPE: PRT
<213> ORGANISM: Bacillus subtilis

<400> SEQUENCE: 7

```
Ser Asn Val Thr Ile Asn Phe Asn Thr Gln Tyr Gln Gln Ile Asp Gly
1               5                   10                  15

Phe Gly Gly Met Asn Ala Pro Gly Trp Ile Asn Asp Leu Thr Pro Ala
            20                  25                  30

Gln Ala Thr Lys Ala Phe Gly Thr Gly Asn Gly Glu Met Gly Leu Ser
        35                  40                  45

Ile Met Arg Met Arg Ile Ala Pro Asp Ser Asn Gln Trp Tyr Lys Gln
    50                  55                  60

Val Pro Thr Ala Lys Ile Ala Lys Ser Tyr Gly Ala Lys Leu Leu Ala
65                  70                  75                  80

Ser Pro Trp Ser Pro Pro Ala Tyr Met Lys Ser Asn Asn Asn Leu Asn
                85                  90                  95

Asn Gly Gly Lys Leu Glu Lys Thr His Tyr Trp Gly Tyr Thr Asn His
            100                 105                 110

Leu Met Asp Phe Thr Asn Tyr Met Ala Ser Gln Gly Ala Ser Val Tyr
        115                 120                 125

Ala Leu Ser Leu Gln Asn Glu Pro Asp Trp His Pro Glu Tyr Glu Ser
    130                 135                 140

Cys Asp Trp Ser Ala Ser Asp Phe Val Asn Tyr Leu Asn Asp Gln Gly
145                 150                 155                 160

Trp Arg Leu Asp Pro Ala Leu Lys Ile Leu Ala Pro Glu Ser Leu Gly
                165                 170                 175

Phe Asn Lys Ala Leu Ser Asp Pro Ile Leu Asn Asn Ser Val Ala Asn
            180                 185                 190

Asn Tyr Val Asp Ile Ile Gly Gly His Leu Tyr Gly Val Ser Pro Ser
        195                 200                 205

Asn Tyr Pro Leu Ala Leu Gln Lys Gly Lys Lys Leu Trp Met Thr Glu
    210                 215                 220

His Tyr Thr Asp Asn Glu Asp Gly Asn Asn Trp Asn Ala Ser Ile Asp
225                 230                 235                 240

Val Gly Leu Glu Leu His Gln Ser Met Val Ser Asn Tyr Ser Ala Tyr
                245                 250                 255

Ile Trp Trp Tyr Ile Arg Arg Ser Tyr Gly Leu Met Ser Glu Asp Gly
            260                 265                 270

Asn Val Ser Lys Arg Gly Tyr Ile Met Ala Gln Phe Ser Lys Tyr Ile
        275                 280                 285

Arg Pro Gly Tyr Thr Arg Ile Gly Ala Thr Glu Met Pro Glu Asn Asn
    290                 295                 300

Val Tyr Val Thr Ala Tyr Lys Asn Asn Ala Gly Lys Leu Val Ile Val
305                 310                 315                 320

Val Val Asn Lys Ser Gly Ser Pro Lys Ala Leu Asp Phe Thr Leu Gln
                325                 330                 335

Asn Gly Thr Val Asn Thr Leu Thr Lys Tyr Ser Thr Ser Ala Ser Met
            340                 345                 350

Asn Met Glu Tyr Arg Gly Lys Ser Thr Val Ser Asn Asn Arg Phe Ser
        355                 360                 365

Ala Tyr Ala Asp Ala Trp Ala Val Gln Thr Phe Val Ser Asn
    370                 375                 380


<210> SEQ ID NO 8
<211> LENGTH: 391
<212> TYPE: PRT
<213> ORGANISM: Bacillus subtilis

<400> SEQUENCE: 8
```

```
Ala Ser Asp Ala Ile Val Asn Ile Ser Ala Glu Lys Gln Val Ile Arg
1               5                   10                  15

Gly Phe Gly Gly Ile Asn His Pro Val Trp Ile Gly Asp Leu Thr Ala
            20                  25                  30

Ala Gln Arg Glu Thr Ala Phe Gly Asn Gly Asn Asn Gln Leu Gly Phe
        35                  40                  45

Ser Ile Leu Arg Ile Tyr Val His Glu Asp Arg Asn Gln Trp Tyr Arg
    50                  55                  60

Glu Val Glu Thr Ala Lys Arg Ala Ile Ala Leu Gly Ala Ile Val Phe
65                  70                  75                  80

Ala Ser Pro Trp Asn Pro Pro Ala Asp Met Val Glu Thr Phe Asn Arg
                85                  90                  95

Asn Gly Asp Pro Ser Ala Lys Arg Leu Arg Tyr Asp Lys Tyr Ala Ala
            100                 105                 110

Tyr Ala Gln His Leu Asn Asp Phe Val Thr Tyr Met Arg Asn Asn Gly
        115                 120                 125

Val Asn Leu Tyr Ala Ile Ser Val Gln Asn Glu Pro Asp Tyr Ala His
    130                 135                 140

Asp Trp Thr Trp Trp Thr Pro Gln Glu Met Leu Arg Phe Met Lys Glu
145                 150                 155                 160

Asn Ala Gly Ser Ile Asn Thr Arg Val Ile Ala Pro Glu Ser Phe Gln
                165                 170                 175

Tyr Leu Lys Asn Met Ser Asp Pro Ile Leu Asn Asp Pro Gln Ala Leu
            180                 185                 190

Ala Asn Met Asp Ile Leu Gly Ala His Leu Tyr Gly Thr Gln Val Ser
        195                 200                 205

Asn Phe Ala Tyr Pro Leu Phe Lys Gln Lys Gly Ala Gly Lys Asp Leu
    210                 215                 220

Trp Met Thr Glu Val Tyr Tyr Pro Asn Ser Asp Asn Asn Ser Ala Asp
225                 230                 235                 240

Arg Trp Pro Glu Ala Leu Asp Val Ser Tyr His Ile His Asn Ala Met
                245                 250                 255

Val Glu Gly Asp Phe Gln Ala Tyr Val Trp Trp Tyr Ile Arg Arg Ser
            260                 265                 270

Tyr Gly Pro Met Lys Glu Asp Gly Thr Ile Ser Lys Arg Gly Tyr Ala
        275                 280                 285

Met Ala His Phe Ser Lys Phe Val Arg Pro Gly Tyr Val Arg Val Glu
    290                 295                 300

Ala Thr Lys Asn Pro Glu Thr Asn Val Tyr Val Ser Ala Tyr Lys Gly
305                 310                 315                 320

Asn Lys Lys Leu Val Ile Val Ala Val Asn Lys Asn Asn Ser Gly Val
                325                 330                 335

Asn Gln Asn Phe Val Leu Pro Asn Ala Ser Val Ser Lys Ile Ser Arg
            340                 345                 350

Trp Ile Thr Ser Gly Ser Ser Asn Leu Gln Pro Gly Thr Glu Leu Thr
        355                 360                 365

Met Thr Gly Gly Asn Phe Trp Ala His Leu Pro Ala Gln Ser Val Thr
    370                 375                 380

Thr Phe Val Ala Asp Leu Gly
385                 390
```

<210> SEQ ID NO 9
<211> LENGTH: 383

```
<212> TYPE: PRT
<213> ORGANISM: Bacillus subtilis

<400> SEQUENCE: 9

Asp Thr Val Lys Ile Asp Ala Lys Thr Ser Tyr Gln Ile Ile Gln Gly
1               5                   10                  15

Phe Gly Gly Met Asn Ala Pro Gly Trp Ile Asn Asp Leu Thr Thr Glu
            20                  25                  30

Gln Val Asn Thr Ala Phe Gly Asn Asp Thr Gly Gln Ile Gly Leu Ser
        35                  40                  45

Ile Met Arg Met Arg Ile Asp Pro Asp Ala Asn Arg Trp Asn Ile Gln
    50                  55                  60

Val Ser Ser Ala Arg Gln Ala Ser Leu Leu Gly Ala Lys Leu Met Ala
65                  70                  75                  80

Thr Pro Trp Thr Pro Pro Ala Tyr Met Lys Ser Asn Lys Ser Leu Ile
                85                  90                  95

Asn Gly Gly Arg Leu Leu Ser Glu His Tyr Ser Gly Tyr Thr Glu His
            100                 105                 110

Leu Leu Lys Phe Ser Asn Phe Met Gln Thr Asn Asn Ala Pro Leu Tyr
        115                 120                 125

Ala Ile Ser Ile Gln Asn Glu Pro Asp Trp Lys Pro Asp Tyr Glu Ser
    130                 135                 140

Cys Glu Trp Asn Gly Asn Asp Phe Lys Asn Tyr Leu Lys Ser Gln Gly
145                 150                 155                 160

Ser Lys Phe Gly Ser Leu Lys Val Ile Val Gly Glu Ser Leu Asn Phe
                165                 170                 175

Asn His Ser Leu Thr Asp Pro Thr Leu Asn Asp Ser Glu Ala Ala Lys
            180                 185                 190

His Val Ala Ile Val Gly Gly His Leu Tyr Gly Thr Thr Pro Lys Pro
        195                 200                 205

Tyr Pro Leu Ala Gln Asn Lys Gly Lys Glu Val Trp Met Thr Glu His
    210                 215                 220

Leu Val Asp Ser Lys Gln Ser Ala Asn Asn Trp Ser Ser Ala Leu Glu
225                 230                 235                 240

Val Ala Ser Glu Met Asn Ala Ser Met Val Ala Asn Tyr Asn Ala Tyr
                245                 250                 255

Val Trp Trp Tyr Ile Arg Arg Ser Tyr Gly Leu Leu Thr Glu Asp Gly
            260                 265                 270

Lys Val Ser Lys Arg Gly Tyr Val Met Ala Gln Tyr Ala Lys Phe Val
        275                 280                 285

Arg Pro Gly Phe Gln Arg Ile Gln Ala Thr Glu Asn Pro Gln Ala Asn
    290                 295                 300

Val His Leu Thr Ala Tyr Lys Asn Ser Glu Gly Lys Met Val Ile Val
305                 310                 315                 320

Ala Ile Asn Thr Asn Asp Ser Asp Gln Leu Leu Ser Leu Asn Ile Ser
                325                 330                 335

Asn His Thr Val Ser Lys Phe Glu Lys Tyr Ser Thr Ser Ala Ile Leu
            340                 345                 350

Asn Val Glu Tyr Gly Gly Thr Tyr Lys Val Asp Ser Asn Gly Lys Ser
        355                 360                 365

Ser Val Trp Leu Asn Pro Leu Ser Val Thr Thr Phe Val Gly Lys
    370                 375                 380

<210> SEQ ID NO 10
```

```
<211> LENGTH: 565
<212> TYPE: PRT
<213> ORGANISM: Bacillus subtilis

<400> SEQUENCE: 10

Ala Asp Val Cys Val Ile Asp Thr Asp Thr Glu His Gln Met Ile Arg
1               5                   10                  15

Gly Phe Gly Gly Ile Asn His Pro Glu Trp Ala Gly Asp Leu Thr Gln
            20                  25                  30

Ala Gln Arg Gln Thr Ala Phe Gly Asn Gly Glu Asn Glu Leu Gly Leu
        35                  40                  45

Thr Val Leu Arg Val Phe Val Asn Pro Asp Ser Ser Gln Trp Ser Arg
    50                  55                  60

Ala Leu Pro Thr Ala Gln Phe Ala Thr Gln Met Gly Val Thr Val Phe
65                  70                  75                  80

Ala Ser Pro Trp Glu Pro Pro Ala Asn Leu Thr Glu Ser Gly Gly Ser
                85                  90                  95

Asn Gly Lys Leu His Leu Pro Lys Ser Asn Tyr Ala Ala Tyr Ala Lys
            100                 105                 110

His Leu Asn Asp Phe Gly Thr Tyr Met Lys Asn Asn Asn Val Asp Leu
        115                 120                 125

Tyr Ala Ile Ser Val Gln Asn Glu Pro Asp Tyr Ala Ser Glu Trp Thr
    130                 135                 140

Tyr Trp Ser Thr Asp Glu Thr Thr Asp Phe Ile Ala Asn Tyr Gly Asp
145                 150                 155                 160

Gln Ile Thr Ser Thr Arg Leu Met Ser Pro Glu Ser Phe Gln Tyr Ala
                165                 170                 175

Pro Glu Asn Ala Ser Trp Val Ser Asp Gly Gly Lys Lys Phe Tyr Arg
            180                 185                 190

Lys Ile Leu Asn Asn Ser Lys Ala Met Ala Asn Cys Asp Val Phe Gly
        195                 200                 205

Thr His Phe Tyr Gly Thr Gln Arg Ser Trp Met Asp Phe Pro Asp Leu
    210                 215                 220

Glu Asn Ser Gly Lys Glu Ile Trp Met Thr Glu Val Tyr Val Pro Asn
225                 230                 235                 240

Ser Asp Lys Asp Ser Ala Asn Arg Tyr Pro Glu Ala Leu Gln Val Ser
                245                 250                 255

Glu Asn Ile His Asn Ala Met Val Val Gly Asn Met Ser Ala Tyr Thr
            260                 265                 270

Trp Trp Tyr Ile Arg Arg Asn Tyr Gly Leu Met Thr Glu Asp Gly Lys
        275                 280                 285

Ile Ser Lys Arg Gly Tyr Cys Met Ala Gln Tyr Ser Lys Tyr Val Arg
    290                 295                 300

Pro Gly Asp Val Arg Ile Asp Ala Thr Glu Gln Pro Ala Asp Asn Val
305                 310                 315                 320

Tyr Val Ser Ala Tyr Lys Gly Asp Asp Asn Gln Val Thr Ile Val Ala
                325                 330                 335

Ile Asn Lys Gly Thr Glu Ser Tyr Ser Gln Gln Phe Ala Val Asp Ala
            340                 345                 350

Asp Ala Gln Ile Thr Glu Val Asp Arg Tyr Arg Thr Ser Ala Ser Glu
        355                 360                 365

Asn Leu Ala Lys Thr Glu Asn Met Glu His Asp Ser Ser Ser Phe Trp
    370                 375                 380

Ala Gln Leu Pro Ala Glu Ser Val Ser Thr Phe Val Val Thr Leu Glu
```

```
385                 390                 395                 400

Asp Gln Pro Val Glu Pro Asp Glu Asn Gly Tyr Tyr Phe His Asp Thr
                405                 410                 415

Phe Glu Ser Asp Asn Cys Asp Trp Gln Gly His Gly Ser Ala Asp Ile
            420                 425                 430

Thr Leu Ser Gly Arg Ile Pro Tyr Gln Gly Thr Asn Ala Leu Leu Val
        435                 440                 445

Gln Asn Arg Ala Ser Ala Trp Asn Gly Ala Glu Lys Val Leu Pro Ala
    450                 455                 460

Lys Ala Phe Gln Ala Gly Lys Glu Tyr Ser Phe Ser Val Cys Leu Asn
465                 470                 475                 480

Tyr Met Asp Gly Glu Ser Ser Lys Asn Ala Ala Leu Ser Leu Gln Tyr
                485                 490                 495

Thr Asp Ala Ala Gly Glu Thr Lys Tyr Ala Arg Ile Ala Ser Ala Ser
            500                 505                 510

Ala Ala Lys Gly Asn Tyr Val Gln Leu Ala Asn Pro Ser Phe Lys Leu
        515                 520                 525

Pro Asp Gly Gly Lys Asn Phe Lys Ile Tyr Val Glu Thr Glu Gly Asp
    530                 535                 540

Thr Asp Asn Phe Tyr Ile Asp Glu Ala Ile Gly Ala Val Lys Gly Thr
545                 550                 555                 560

Ala Ile Glu Gly Pro
                565


<210> SEQ ID NO 11
<211> LENGTH: 396
<212> TYPE: PRT
<213> ORGANISM: Bacillus subtilis

<400> SEQUENCE: 11

Ser Arg Thr Pro Ser Ala Ala Ala Thr Ser Val Thr Val Asp Pro Ser
1               5                   10                  15

Ala Thr Arg Gln Thr Ile Arg Gly Phe Gly Gly Met Asn His Pro Leu
            20                  25                  30

Trp Ile Gly Asp Leu Thr Pro Ala Gln Arg Asp Thr Ala Phe Gly Asn
        35                  40                  45

Gly Glu Gly Gln Leu Gly Phe Ser Val Leu Arg Ile Pro Val Ser Glu
    50                  55                  60

Asp Arg Ala Asn Trp Ser Arg Glu Val Ala Thr Ala Lys Arg Ala Thr
65                  70                  75                  80

Glu Leu Gly Ala Ile Val Phe Ala Ser Pro Trp Asn Pro Pro Ala Asn
                85                  90                  95

Met Val Glu Thr Phe Val Arg Gly Gln Gln Thr Asp Ala Lys Arg Leu
            100                 105                 110

Arg His Ser Met Tyr Gly Ala Tyr Ala Gln His Leu Asn Asp Phe Val
        115                 120                 125

Ala Phe Met Lys Ser Asn Gly Val Asn Leu Tyr Ala Ile Ser Val Gln
    130                 135                 140

Asn Glu Pro Asp Tyr Ala His Asp Trp Thr Trp Trp Thr Pro Ser Glu
145                 150                 155                 160

Met Thr Arg Phe Leu Arg Glu Asn Ala Gly Ser Ile Ser Thr Lys Val
                165                 170                 175

Ile Ala Pro Glu Ser Phe Gln Tyr Val Lys Thr Phe Ser Asp Pro Ile
            180                 185                 190
```

```
Leu Asn Asp Ala Ala Ala Leu Ala Asn Leu Asp Ile Leu Gly Ala His
        195                 200                 205

Leu Tyr Gly Thr Ser Phe Gln Asn Phe Pro Tyr Pro Leu Phe Lys Gln
    210                 215                 220

Lys Gly Gly Gly Lys Glu Leu Trp Met Thr Glu Val Tyr His Pro Asn
225                 230                 235                 240

Ser Ser Asp Ser Ala Asp Leu Trp Pro Gln Ala Leu Asp Val Ala Glu
                245                 250                 255

His Ile His Arg Ala Met Val Asp Ala Glu Phe Gln Ala Tyr Val Trp
            260                 265                 270

Trp Tyr Ile Arg Arg Gly Tyr Gly Pro Met Arg Glu Asp Gly Arg Ile
        275                 280                 285

Ser Lys Arg Gly Ala Gly Met Ala His Phe Ser Lys Phe Val Arg Pro
    290                 295                 300

Gly His Val Arg Val Ala Val Thr Pro Ala Pro Gln Pro Asn Val Tyr
305                 310                 315                 320

Leu Ser Ala Tyr Lys Gly Gly Gly Ser Arg Val Val Val Val Ala Val
                325                 330                 335

Asn Lys Gly Ala Ser Pro Val Ser Gln Gln Phe Thr Leu Asn Asn Asn
            340                 345                 350

Asn Ser Ser Gly Val Ser Ser Trp Val Thr Asp Ala Ser Arg Asn Leu
        355                 360                 365

Ala Ser Gln Gly Arg Ile Thr Val Ala Asn Gly Ala Phe Thr Ala Arg
    370                 375                 380

Leu Pro Ala Gln Ser Val Thr Thr Leu Val Thr Gly
385                 390                 395


<210> SEQ ID NO 12
<211> LENGTH: 392
<212> TYPE: PRT
<213> ORGANISM: Bacillus subtilis

<400> SEQUENCE: 12

Ala Ser Asn Ala Thr Ile Asn Leu Ser Ala Gln Lys Gln Val Ile Arg
1               5                   10                  15

Gly Phe Gly Gly Ile Asn Leu Pro Ala Trp Ala Gly Asp Leu Thr Ala
            20                  25                  30

Ala Gln Arg Glu Thr Ala Phe Gly Asn Gly Asp Asn Gln Leu Gly Leu
        35                  40                  45

Ser Val Leu Arg Ile Tyr Val Asp Asp Asn Lys Asn Asn Trp Tyr Lys
    50                  55                  60

Glu Leu Ala Thr Ala Lys Lys Ala Ile Glu His Gly Ala Ile Val Phe
65                  70                  75                  80

Ala Thr Pro Trp Asn Pro Pro Ala Tyr Met Thr Glu Lys Phe Asn Arg
                85                  90                  95

Asn Gly Asp Thr Asn Ala Lys Arg Leu Arg Tyr Asp Lys Tyr Ala Ala
            100                 105                 110

Tyr Ala Gln His Leu Asn Asp Phe Val Ser Tyr Met Lys Asn Asn Gly
        115                 120                 125

Val Asn Leu Tyr Ala Ile Ser Val Gln Asn Glu Pro Asp Tyr Gly Lys
    130                 135                 140

Glu Trp Thr Trp Trp Thr Pro Gln Glu Ile Leu Arg Phe Ile Lys Glu
145                 150                 155                 160

Asn Ala Gly Ser Ile Asn Cys Arg Val Met Ser Pro Glu Ser Phe Ser
                165                 170                 175
```

```
Tyr Gln Lys Asn Met Tyr Asp Pro Ile Leu Asn Asn Pro Gln Ala Leu
            180                 185                 190

Ala Asn Met Asp Ile Leu Gly Thr His Thr Tyr Gly Thr Arg Val Asn
        195                 200                 205

Asp Phe Ala Tyr Pro Leu Phe Lys Gln Lys Gly Ala Gly Lys Glu Leu
    210                 215                 220

Trp Met Thr Glu Val Tyr Val Pro Asn Ser Asp Thr Asn Ser Ala Asp
225                 230                 235                 240

Arg Trp Pro Glu Ala Leu Asp Val Ala Asp His Ile Asn Asn Ala Met
                245                 250                 255

Val Glu Gly Asp Phe Gln Ala Tyr Val Trp Trp Tyr Ile Arg Arg Ser
            260                 265                 270

Tyr Gly Phe Ile Lys Glu Asp Gly Asn Val Ser Lys Arg Gly Tyr Met
        275                 280                 285

Met Ala His Phe Ser Lys Phe Val Arg Pro Gly Tyr Val Arg Val Asp
    290                 295                 300

Ala Thr Lys Asn Pro Thr Pro Asn Val Tyr Leu Ser Ala Tyr Lys Gly
305                 310                 315                 320

Asn Asn Lys Val Val Ile Ile Ala Ile Asn Lys Gly Thr Ser Asp Val
                325                 330                 335

Lys Gln Ser Phe Thr Met Pro Asn Ser Lys Val Ser Ser Val Ser Ser
            340                 345                 350

Trp Gln Thr Thr Ala Thr Ala Asn Leu Ala Lys Ser Ala Ser Asn Thr
        355                 360                 365

Asn Val Tyr Asn Gly Asn Phe Thr Ala Thr Leu Pro Ala Gln Ser Val
    370                 375                 380

Thr Thr Phe Val Gly Asp Ile Lys
385                 390


<210> SEQ ID NO 13
<211> LENGTH: 413
<212> TYPE: PRT
<213> ORGANISM: Bacillus subtilis

<400> SEQUENCE: 13

Ala Ser Asp Ala Val Ile Asn Leu Ser Ala Gln Lys Gln Val Ile Arg
1               5                   10                  15

Gly Phe Gly Gly Ile Asn His Pro Ala Trp Ile Gly Asp Leu Thr Ala
            20                  25                  30

Ala Gln Arg Glu Thr Ala Phe Gly Asn Gly Gln Asn Gln Leu Gly Phe
        35                  40                  45

Ser Ile Leu Arg Val Tyr Ile Asp Pro Asp Arg Asn Asn Trp Ser Arg
    50                  55                  60

Glu Val Ala Thr Ala Lys Lys Ala Ile Glu Lys Gly Ala Leu Val Phe
65                  70                  75                  80

Ala Ser Pro Trp Asn Pro Pro Ser Ser Met Val Glu Thr Phe Asn Arg
                85                  90                  95

Asn Gly Asp Arg Asn Ala Lys Arg Leu Arg Tyr Asp Lys Tyr Ala Ala
            100                 105                 110

Tyr Ala Gln His Leu Asn Asp Phe Val Thr Tyr Met Lys Asn Asn Gly
        115                 120                 125

Val Asn Leu Tyr Ala Ile Ser Val Gln Asn Glu Pro Asp Tyr Ala His
    130                 135                 140

Glu Trp Thr Trp Trp Thr Pro Gln Glu Ile Leu Arg Phe Met Lys Glu
```

```
145                 150                 155                 160

Asn Ala Gly Ser Ile Asn Cys Lys Val Met Ala Pro Glu Ser Phe Gln
                165                 170                 175

Tyr Leu Lys Asn Ile Ser Asp Pro Ile Leu Asn Asp Pro Gln Ala Leu
            180                 185                 190

Ala Asn Met Asp Ile Leu Gly Ala His Leu Tyr Gly Thr Gln Val Ser
        195                 200                 205

Asn Phe Ala Tyr Pro Leu Phe Lys Gln Lys Gly Ala Gly Lys Glu Leu
    210                 215                 220

Trp Met Thr Glu Val Tyr Tyr Pro Asn Ser Asp Asn Asn Ser Ala Asp
225                 230                 235                 240

Arg Trp Pro Glu Ala Leu Glu Val Ser His His Met His Asn Ala Met
                245                 250                 255

Val Glu Gly Asp Phe Gln Ala Tyr Val Trp Trp Tyr Ile Arg Arg Ser
            260                 265                 270

Tyr Gly Pro Met Lys Glu Asp Gly Thr Ile Ser Lys Arg Gly Tyr Asn
        275                 280                 285

Met Ala His Phe Ser Lys Phe Ile Arg Pro Gly Tyr Val Arg Val Asp
    290                 295                 300

Ala Thr Lys Asn Pro Asp Thr Asn Val His Val Ser Ala Tyr Lys Gly
305                 310                 315                 320

Asn Asn Lys Val Val Ile Val Ala Ile Asn Arg Gly Thr Thr Ala Val
                325                 330                 335

Asn Gln Asn Phe Val Leu Gln Asn Gly Arg Ala Ala Thr Leu Ser Arg
            340                 345                 350

Trp Ile Thr Asp Ala Asn Arg Asn Leu Ala Pro Glu Ser Asn Leu Asn
        355                 360                 365

Ala Ser Ser Gly Ser Phe Phe Ala His Leu Pro Ala Lys Ser Val Thr
    370                 375                 380

Thr Phe Val Gly Asp Leu Thr Gly Ser Thr Leu Asn Ile Glu Asp Ala
385                 390                 395                 400

Ala Leu Thr Asn Ser Val Thr Gln Asp Thr Tyr Ser Lys
                405                 410


<210> SEQ ID NO 14
<211> LENGTH: 398
<212> TYPE: PRT
<213> ORGANISM: Bacillus subtilis

<400> SEQUENCE: 14

Ala Gln Ala Ala Ser Asp Ala Val Ile Asn Leu Asn Asn Thr His Gln
1               5                   10                  15

Glu Ile Met Gly Phe Gly Gly Met Asn His Pro Thr Trp Ala Gly Asp
            20                  25                  30

Leu Thr Ser Ser Gln Arg Glu Thr Ala Phe Gly Asn Gly Thr Asn Gln
        35                  40                  45

Leu Gly Phe Gln Val Leu Arg Ile Trp Val Asp Ser Asp Arg Asn Asn
    50                  55                  60

Trp Tyr Lys Glu Leu Ala Thr Ala Lys Ala Ala Leu Ala Lys Gly Ala
65                  70                  75                  80

Ile Val Phe Ala Thr Pro Trp Asn Pro Pro Ser Asn Leu Cys Glu Thr
                85                  90                  95

Phe Tyr Lys Asn Gly Ser Ala Asn Ala Lys Arg Leu Lys His Asp Lys
            100                 105                 110
```

```
Tyr Ala Ala Tyr Ala Gln His Leu Asn Asp Phe Val Thr Tyr Met Arg
        115                 120                 125

Asn Asn Gly Val Glu Leu Tyr Gly Ile Ser Val Cys Asn Glu Pro Asp
    130                 135                 140

Tyr Gly His Asp Trp Thr Trp Trp Thr Glu Ser Glu Val Val Thr Phe
145                 150                 155                 160

Leu Lys Tyr Tyr Ala Gly Ser Ile Asn Cys Arg Ile Ile Ala Pro Glu
                165                 170                 175

Ser Phe Ser Tyr Gln Lys Ser Tyr Tyr Asp Ala Ile Ile Asn Asp Ser
            180                 185                 190

Gln Ala Leu Ala Gln Val Asp Ile Ile Gly Thr His Leu Tyr Gly Thr
        195                 200                 205

Ser Tyr Asn Asn Phe Ser Tyr Pro Leu Tyr His Gln Lys Ala Ser Ser
    210                 215                 220

Lys Gln Leu Trp Met Thr Glu Val Tyr Thr Pro Asn Ser Thr Ser Ser
225                 230                 235                 240

Ala Asp Lys Trp Pro Glu Ala Ile Asn Val Ala Glu His Ile His Lys
                245                 250                 255

Ala Met Val Asn Asp Phe Gln Thr Tyr Val Trp Trp Tyr Ile Arg Arg
            260                 265                 270

Ser Tyr Gly Pro Met Lys Glu Asp Gly Thr Leu Ser Lys Arg Gly Tyr
        275                 280                 285

Cys Met Ala Gln Phe Ser Lys Phe Ile Arg Arg Gly Tyr Lys Arg Val
    290                 295                 300

Asp Ala Thr Glu Asn Pro Asn Asn Gly Val Tyr Val Ser Ala Tyr Thr
305                 310                 315                 320

Gly Asp Gly Lys Ala Val Ile Val Ala Val Asn Ser Gly Ser Ser Asp
                325                 330                 335

Cys Ser Gln Ser Phe Thr Ile Lys Gly Lys Thr Leu Lys Asn Val Asp
            340                 345                 350

Arg Tyr Arg Thr Ser Gly Ser Glu Asn Leu Ala Lys Thr Ser Asn Leu
        355                 360                 365

Glu Leu Ser Gly Asn Gly Phe Trp Ala Tyr Leu Pro Ala Asn Ser Val
    370                 375                 380

Ser Thr Phe Val Cys Thr Val Glu Asn Ser Ser Ser Asn Pro
385                 390                 395


<210> SEQ ID NO 15
<211> LENGTH: 382
<212> TYPE: PRT
<213> ORGANISM: Bacillus subtilis

<400> SEQUENCE: 15

Gly Ser Val Tyr Ile Asn Phe Asn Thr Glu Tyr Gln Glu Ile Asp Gly
1               5                   10                  15

Phe Gly Ala Met Asn Ala Pro Gly Trp Val Asn Asp Leu Thr Ser Ala
            20                  25                  30

Gln Ala Thr Lys Ala Phe Gly Asn Gly Asp Gly Gln Met Gly Leu Ser
        35                  40                  45

Ile Met Arg Met Arg Ile Asp Pro Asp Ser Asn Gln Trp Tyr Arg Gln
    50                  55                  60

Val Pro Thr Ala Gln Ile Ala Tyr Ser Tyr Gly Ala Lys Leu Leu Ala
65                  70                  75                  80

Thr Pro Trp Ser Pro Pro Ala Tyr Met Lys Thr Asn Asn Asn Val Asn
                85                  90                  95
```

```
Asn Gly Gly Lys Leu Lys Lys Glu His Tyr Trp Gly Tyr Thr Asp His
            100                 105                 110

Leu Met Asp Phe Thr Asn Tyr Met Ala Gly Lys Asn Ala Pro Ile Tyr
        115                 120                 125

Ala Leu Ser Ile Gln Asn Glu Pro Asp Trp His Pro Asn Tyr Glu Ser
    130                 135                 140

Cys Asp Trp Ser Gly Ala Asp Phe Val Asn Tyr Leu Asn Asp Gln Gly
145                 150                 155                 160

Trp Arg Leu Asp Ser Ser Leu Lys Ile Leu Ala Pro Glu Ser Leu Gly
                165                 170                 175

Phe Asn Pro Ala Leu Ser Asp Pro Ile Leu Lys Asp Ser Val Ala Ser
            180                 185                 190

Ser His Ile Asp Ile Ile Gly Gly His Leu Tyr Gly Val Gln Pro Arg
        195                 200                 205

Asn Tyr Pro Leu Ala Leu Gln Lys Gly Lys Lys Leu Trp Met Thr Glu
    210                 215                 220

His Tyr Thr Asp Thr Asp Asn Ala Asn Ile Trp Asp Lys Ala Met Asn
225                 230                 235                 240

Val Gly Leu Glu Leu His Gln Ser Met Val Ser Asn Tyr Ser Ala Tyr
                245                 250                 255

Ile Trp Trp Tyr Leu Arg Arg Ser Tyr Gly Met Leu Thr Glu Asp Gly
            260                 265                 270

Asn Ile Ser Lys Arg Gly Tyr Ile Met Ser Gln Phe Ser Lys Phe Ile
        275                 280                 285

Arg Pro Gly Asp Val Arg Ile Ala Ala Thr Glu Val Pro Glu Ser Asn
    290                 295                 300

Val Tyr Val Thr Ala Tyr Lys Asn Arg Ser Gly Lys Leu Val Ile Ala
305                 310                 315                 320

Val Val Asn Lys Thr Asn Ser His Lys Lys Leu Asp Phe Thr Leu Gln
                325                 330                 335

Asn Gly Thr Val Gly Ser Met Thr Lys Tyr Val Thr Ser Ala Ser Gln
            340                 345                 350

Asn Val Gly Tyr Ala Gly Lys Tyr Ala Val Ser Asn Asn Arg Phe Thr
        355                 360                 365

Ala Tyr Ala Asp Pro Leu Ser Val Gln Thr Phe Val Ser Glu
    370                 375                 380


<210> SEQ ID NO 16
<211> LENGTH: 391
<212> TYPE: PRT
<213> ORGANISM: Bacillus subtilis

<400> SEQUENCE: 16

Ala Ala Ser Asp Val Thr Val Asn Val Ser Ala Glu Lys Gln Val Ile
1               5                   10                  15

Arg Gly Phe Gly Gly Met Asn His Pro Ala Trp Ala Gly Asp Leu Thr
            20                  25                  30

Ala Ala Gln Arg Glu Thr Ala Phe Gly Asn Gly Gln Asn Gln Leu Gly
        35                  40                  45

Phe Ser Ile Leu Arg Ile His Val Asp Glu Asn Arg Asn Asn Trp Tyr
    50                  55                  60

Lys Glu Val Glu Thr Ala Lys Ser Ala Val Lys His Gly Ala Ile Val
65                  70                  75                  80

Phe Ala Ser Pro Trp Asn Pro Pro Ser Asp Met Val Glu Thr Phe Asn
```

```
                85                  90                  95

Arg Asn Gly Asp Thr Ser Ala Lys Arg Leu Lys Tyr Asn Lys Tyr Ala
            100                 105                 110

Ala Tyr Ala Gln His Leu Asn Asp Phe Val Thr Phe Met Lys Asn Asn
        115                 120                 125

Gly Val Asn Leu Tyr Ala Ile Ser Val Gln Asn Glu Pro Asp Tyr Ala
    130                 135                 140

His Glu Trp Thr Trp Trp Thr Pro Gln Glu Ile Leu Arg Phe Met Arg
145                 150                 155                 160

Glu Asn Ala Gly Ser Ile Asn Ala Arg Val Ile Ala Pro Glu Ser Phe
                165                 170                 175

Gln Tyr Leu Lys Asn Leu Ser Asp Pro Ile Leu Asn Asp Pro Gln Ala
            180                 185                 190

Leu Ala Asn Met Asp Ile Leu Gly Thr His Leu Tyr Gly Thr Gln Val
        195                 200                 205

Ser Gln Phe Pro Tyr Pro Leu Phe Lys Gln Lys Gly Ala Gly Lys Asp
    210                 215                 220

Leu Trp Met Thr Glu Val Tyr Tyr Pro Asn Ser Asp Thr Asn Ser Ala
225                 230                 235                 240

Asp Arg Trp Pro Glu Ala Leu Asp Val Ser Gln His Ile His Asn Ala
                245                 250                 255

Met Val Glu Gly Asp Phe Gln Ala Tyr Val Trp Trp Tyr Ile Arg Arg
            260                 265                 270

Ser Tyr Gly Pro Met Lys Glu Asp Gly Thr Ile Ser Lys Arg Gly Tyr
        275                 280                 285

Asn Met Ala His Phe Ser Lys Phe Val Arg Pro Gly Tyr Val Arg Ile
    290                 295                 300

Asp Ala Thr Lys Asn Pro Asn Ala Asn Val Tyr Val Ser Ala Tyr Lys
305                 310                 315                 320

Gly Asp Asn Lys Val Val Ile Val Ala Ile Asn Lys Ser Asn Thr Gly
                325                 330                 335

Val Asn Gln Asn Phe Val Leu Gln Asn Gly Ser Ala Ser Asn Val Ser
            340                 345                 350

Arg Trp Ile Thr Ser Ser Ser Ser Asn Leu Gln Pro Gly Thr Asn Leu
        355                 360                 365

Thr Val Ser Gly Asn His Phe Trp Ala His Leu Pro Ala Gln Ser Val
    370                 375                 380

Thr Thr Phe Val Val Asn Arg
385                 390
```

```
<210> SEQ ID NO 17
<211> LENGTH: 810
<212> TYPE: PRT
<213> ORGANISM: Bacillus subtilis

<400> SEQUENCE: 17

Asn Arg Asn Thr Phe Phe Val Leu Phe Leu Leu Ile Ser Asn Leu Val
1               5                   10                  15

Ser Gly Gln Asp Leu Lys Leu Trp Tyr Ser Gln Pro Ala Gln Asn Trp
            20                  25                  30

Ser Glu Ala Leu Pro Ile Gly Asn Ser Arg Leu Gly Ala Met Val Tyr
        35                  40                  45

Gly Gly Ile Glu Arg Glu Glu Leu Gln Leu Asn Glu Glu Thr Phe Trp
    50                  55                  60
```

-continued

```
Ala Gly Ser Pro Tyr Asn Asn Asn Asn Pro Asn Ala Val His Val Leu
65                  70                  75                  80

Pro Val Val Arg Lys Leu Ile Phe Glu Gly Arg Asn Lys Glu Ala Gln
                85                  90                  95

Arg Leu Ile Asp Ala Asn Phe Leu Thr Gln Gln His Gly Met Ser Tyr
            100                 105                 110

Leu Thr Leu Gly Ser Leu Tyr Leu Glu Phe Pro Glu His Gln Asn Gly
        115                 120                 125

Ser Gly Phe Tyr Arg Asp Leu Asn Leu Glu Asn Ala Thr Thr Thr Thr
    130                 135                 140

Arg Tyr Gln Val Asp Asp Val Thr Tyr Thr Arg Thr Thr Phe Ala Ser
145                 150                 155                 160

Phe Thr Asp Asn Val Ile Ile Met His Ile Lys Ala Ser Lys Ala Asn
                165                 170                 175

Ala Leu Asn Phe Thr Ile Ala Tyr Asn Cys Pro Leu Val His Lys Val
            180                 185                 190

Asn Val Gln Asn Asp Gln Leu Thr Val Thr Cys Gln Gly Lys Glu Gln
        195                 200                 205

Glu Gly Leu Lys Ala Ala Leu Arg Ala Glu Cys Gln Ile Gln Val Lys
    210                 215                 220

Thr Asn Gly Thr Leu Arg Pro Ala Gly Asn Thr Leu Gln Ile Asn Glu
225                 230                 235                 240

Gly Thr Glu Ala Thr Leu Tyr Ile Ser Ala Ala Thr Asn Tyr Val Asn
                245                 250                 255

Tyr Gln Asp Val Ser Ala Asp Glu Ser His Arg Thr Ser Glu Tyr Leu
            260                 265                 270

Lys Arg Ala Met Gln Ile Pro Tyr Glu Lys Ala Leu Lys Asn His Ile
        275                 280                 285

Ala Tyr Tyr Lys Lys Gln Phe Asp Arg Val Arg Leu Thr Leu Pro Ala
    290                 295                 300

Gly Lys Ala Ser Gln Leu Glu Thr Pro Lys Arg Ile Glu Asn Phe Gly
305                 310                 315                 320

Asn Gly Glu Asp Met Ala Met Ala Ala Leu Leu Phe His Tyr Gly Arg
                325                 330                 335

Tyr Leu Leu Ile Ser Ser Ser Gln Pro Gly Gly Gln Pro Ala Asn Leu
            340                 345                 350

Gln Gly Ile Trp Asn Asn Ser Thr His Ala Pro Trp Asp Ser Lys Tyr
        355                 360                 365

Thr Ile Asn Ile Asn Thr Glu Met Asn Tyr Trp Pro Ala Glu Val Thr
    370                 375                 380

Asn Leu Ser Glu Thr His Ser Pro Leu Phe Ser Met Leu Lys Asp Leu
385                 390                 395                 400

Ser Val Thr Gly Ala Glu Thr Ala Arg Thr Met Tyr Asp Cys Arg Gly
                405                 410                 415

Trp Val Ala His His Asn Thr Asp Leu Trp Arg Ile Cys Gly Val Val
            420                 425                 430

Asp Phe Ala Ala Ala Gly Met Trp Pro Ser Gly Gly Ala Trp Leu Ala
        435                 440                 445

Gln His Ile Trp Gln His Tyr Leu Phe Thr Gly Asn Lys Glu Phe Leu
    450                 455                 460

Lys Glu Tyr Tyr Pro Ile Leu Lys Gly Thr Ala Gln Phe Tyr Met Asp
465                 470                 475                 480

Phe Leu Val Glu His Pro Val Tyr Lys Trp Leu Val Val Ser Pro Ser
```

-continued

```
                485                 490                 495

Val Ser Pro Glu His Gly Pro Ile Thr Ala Gly Cys Thr Met Asp Asn
            500                 505                 510

Gln Ile Ala Phe Asp Ala Leu His Asn Thr Leu Leu Ala Ser Tyr Ile
        515                 520                 525

Ala Gly Glu Ala Pro Ser Phe Gln Asp Ser Leu Lys Gln Thr Leu Glu
    530                 535                 540

Lys Leu Pro Pro Met Gln Ile Gly Lys His Asn Gln Leu Gln Glu Trp
545                 550                 555                 560

Leu Glu Asp Ile Asp Asn Pro Lys Asp Glu His Arg His Ile Ser His
                565                 570                 575

Leu Tyr Gly Leu Tyr Pro Ser Asn Gln Ile Ser Pro Tyr Ser Asn Pro
            580                 585                 590

Glu Leu Phe Gln Ala Ala Arg Asn Thr Leu Leu Gln Arg Gly Asp Lys
        595                 600                 605

Ala Thr Gly Trp Ser Ile Gly Trp Lys Val Asn Phe Trp Ala Arg Met
    610                 615                 620

Leu Asp Gly Asn His Ala Phe Gln Ile Ile Lys Asn Met Ile Gln Leu
625                 630                 635                 640

Leu Pro Asn Asp His Leu Ala Lys Glu Tyr Pro Asn Gly Arg Thr Tyr
                645                 650                 655

Pro Asn Met Leu Asp Ala His Pro Pro Phe Gln Ile Asp Gly Asn Phe
            660                 665                 670

Gly Tyr Thr Ala Gly Val Ala Glu Met Leu Leu Gln Ser His Asp Gly
        675                 680                 685

Ala Val His Leu Leu Pro Ala Leu Pro Asp Ala Trp Glu Glu Gly Ser
    690                 695                 700

Val Lys Gly Leu Val Ala Arg Gly Asn Phe Thr Val Asp Met Asp Trp
705                 710                 715                 720

Lys Asn Asn Val Leu Asn Lys Ala Ile Ile Arg Ser Asn Ile Gly Ser
                725                 730                 735

Thr Leu Arg Ile Arg Ser Tyr Val Pro Leu Lys Gly Lys Gly Leu Lys
            740                 745                 750

Gln Val Asn Gly Lys Glu Cys Ser Asn Arg Leu Phe Ala Thr Thr Pro
        755                 760                 765

Ile Lys Gln Pro Leu Val Ala Lys Gly Val Ser Ala Gln Ser Pro Lys
    770                 775                 780

Leu Gln Lys Val Tyr Glu Tyr Asp Ile Glu Thr Lys Ala Gly Lys Thr
785                 790                 795                 800

Tyr Ile Val Asn Thr Ile Glu Gly Lys Gln
                805                 810
```